(12) United States Patent
Vondrell et al.

(10) Patent No.: US 12,421,917 B2
(45) Date of Patent: Sep. 23, 2025

(54) GAS TURBINE ENGINE WITH THIRD STREAM

(71) Applicant: General Electric Company, Evendale, OH (US)

(72) Inventors: Randy M. Vondrell, Newport, KY (US); Alexander Kimberley Simpson, Cincinnati, OH (US); David Marion Ostdiek, Liberty Township, OH (US); Craig William Higgins, Liberty Township, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/975,350

(22) Filed: Dec. 10, 2024

(65) Prior Publication Data

US 2025/0129756 A1    Apr. 24, 2025

Related U.S. Application Data

(63) Continuation-in-part of application No. 18/888,873, filed on Sep. 18, 2024, and a continuation-in-part of
(Continued)

(51) Int. Cl.
*F02K 3/065* (2006.01)
*F02C 3/06* (2006.01)

(52) U.S. Cl.
CPC ............... *F02K 3/065* (2013.01); *F02C 3/06* (2013.01)

(58) Field of Classification Search
CPC . F02K 3/02; F02K 3/025; F02K 3/065; F02C 3/06; F02C 3/107; F02C 7/36
See application file for complete search history.

(56) References Cited

U.S. PATENT DOCUMENTS

| 2,999,630 A | 9/1961 | Warren et al. |
| 3,528,250 A | 9/1970 | Johnson |

(Continued)

FOREIGN PATENT DOCUMENTS

| CN | 1204005 A | 1/1999 |
| CN | 101657607 A | 2/2010 |

(Continued)

OTHER PUBLICATIONS

Crigler, Application of Theodorsen's Theory to Propeller Design, NACA (National Advisory Committee for Aeronautics) Report 924, 1948, pp. 83-99.

(Continued)

*Primary Examiner* — Steven M Sutherland
(74) *Attorney, Agent, or Firm* — Dority & Manning, P.A.

(57) ABSTRACT

A gas turbine engine includes a turbomachine defining an engine inlet to an inlet duct, a fan duct inlet to a fan duct, and a core inlet to a core duct, a primary fan driven by the turbomachine, a secondary fan located downstream of the primary fan within the inlet duct, and a booster located downstream of the secondary fan and comprising a booster rotor blade, an inlet guide vane, and booster cowl, the booster cowl separating an upstream portion of the fan duct into an upper fan duct having an upper fan duct inlet and a lower fan duct having a lower fan duct inlet, the upper fan duct inlet and lower fan duct inlet collectively forming the fan duct inlet, the inlet guide vane located forward of the booster rotor blade.

20 Claims, 42 Drawing Sheets

Related U.S. Application Data application No. 18/740,613, filed on Jun. 12, 2024, said application No. 18/888,873 is a continuation-in-part of application No. 18/675,270, filed on May 28, 2024, which is a continuation of application No. 17/879,384, filed on Aug. 2, 2022, now Pat. No. 12,031,504, said application No. 18/740,613 is a continuation-in-part of application No. 17/879,384, filed on Aug. 2, 2022, now Pat. No. 12,031,504.

(56) References Cited

U.S. PATENT DOCUMENTS

| | | |
|---|---|---|
| 3,540,682 A | 11/1970 | Dibble et al. |
| 3,542,152 A | 11/1970 | Adamson et al. |
| 3,750,402 A | 8/1973 | Vdoviak et al. |
| 4,010,608 A | 3/1977 | Simmons |
| 4,043,121 A | 8/1977 | Thomas et al. |
| 4,446,696 A | 5/1984 | Sargisson et al. |
| 4,486,146 A | 12/1984 | Campion |
| 4,569,199 A | 2/1986 | Klees et al. |
| 4,607,657 A | 8/1986 | Hirschkron |
| 4,784,575 A | 11/1988 | Nelson et al. |
| 4,860,537 A | 8/1989 | Taylor |
| 4,892,269 A | 1/1990 | Greco et al. |
| 4,907,946 A | 3/1990 | Ciokajlo et al. |
| 4,916,894 A | 4/1990 | Adamson et al. |
| 4,976,102 A | 12/1990 | Taylor |
| 5,054,998 A | 10/1991 | Davenport |
| 5,190,441 A | 3/1993 | Murphy et al. |
| 5,197,855 A | 3/1993 | Magliozzi et al. |
| 5,259,187 A | 11/1993 | Dunbar et al. |
| 5,261,227 A | 11/1993 | Giffin, III |
| 5,345,760 A | 9/1994 | Giffin, III |
| 5,457,346 A | 10/1995 | Blumberg et al. |
| 5,950,308 A | 9/1999 | Koff et al. |
| 6,339,927 B1 | 1/2002 | DiPietro, Jr. |
| 6,547,518 B1 | 4/2003 | Czachor et al. |
| 6,763,654 B2 | 7/2004 | Orlando et al. |
| 6,792,758 B2 | 9/2004 | Dowman |
| 7,559,191 B2 | 7/2009 | Parks |
| 7,658,063 B1 | 2/2010 | Matheny |
| 7,762,766 B2 | 7/2010 | Shteyman et al. |
| 8,256,202 B1 | 9/2012 | Paulino |
| 8,276,392 B2 | 10/2012 | van der Woude |
| 8,382,430 B2 | 2/2013 | Parry et al. |
| 8,459,035 B2 | 6/2013 | Smith et al. |
| 8,689,538 B2 | 4/2014 | Sankrithi et al. |
| 8,762,766 B2 | 6/2014 | Ferguson et al. |
| 8,876,465 B2 | 11/2014 | Stretton |
| 8,910,465 B2 | 12/2014 | Snyder |
| 8,943,796 B2 | 2/2015 | McCaffrey |
| 8,967,967 B2 | 3/2015 | Stretton et al. |
| 9,017,028 B2 | 4/2015 | Fabre |
| 9,045,996 B2 | 6/2015 | Anghel et al. |
| 9,057,328 B2 | 6/2015 | Kupratis |
| 9,096,312 B2 | 8/2015 | Moxon |
| 9,097,134 B2 | 8/2015 | Ferch et al. |
| 9,534,538 B1 | 1/2017 | Cerny |
| 9,677,501 B2 | 6/2017 | Pierluissi et al. |
| 9,759,160 B2 | 9/2017 | Sankrithi et al. |
| 9,845,768 B2 | 12/2017 | Pesyna et al. |
| 9,982,555 B2 | 5/2018 | Thet et al. |
| 9,995,314 B2 | 6/2018 | Miller et al. |
| 10,077,660 B2 | 9/2018 | Hoefer et al. |
| 10,090,676 B2 | 10/2018 | Knowles et al. |
| 10,126,062 B2 | 11/2018 | Cerny et al. |
| 10,184,400 B2 | 1/2019 | Cerny et al. |
| 10,202,865 B2 | 2/2019 | Breeze-Stringfellow et al. |
| 10,253,648 B2 | 4/2019 | Bentley et al. |
| 10,260,419 B2 | 4/2019 | Cerny et al. |
| 10,263,550 B2 | 4/2019 | Thet et al. |
| 10,344,674 B2 | 7/2019 | Cerny et al. |
| 10,364,750 B2 | 7/2019 | Rambo |
| 10,443,436 B2 | 10/2019 | Miller et al. |
| 10,487,739 B2 | 11/2019 | Miller et al. |
| 10,644,630 B2 | 5/2020 | Smith et al. |
| 10,787,996 B2 | 9/2020 | Kupratis et al. |
| 2004/0197187 A1 | 10/2004 | Usab et al. |
| 2004/0234372 A1 | 11/2004 | Shahpar |
| 2005/0109012 A1 | 5/2005 | Johnson |
| 2005/0241292 A1 | 11/2005 | Taylor et al. |
| 2007/0186535 A1 | 8/2007 | Powell et al. |
| 2007/0251212 A1 | 11/2007 | Tester |
| 2009/0078819 A1 | 3/2009 | Guering et al. |
| 2009/0090096 A1 | 4/2009 | Sheridan |
| 2010/0014977 A1 | 1/2010 | Shattuck |
| 2010/0111674 A1 | 5/2010 | Sparks |
| 2010/0251726 A1 | 10/2010 | Jones et al. |
| 2010/0326050 A1 | 12/2010 | Schilling et al. |
| 2010/0329856 A1 | 12/2010 | Hofer et al. |
| 2011/0150659 A1 | 6/2011 | Micheli et al. |
| 2011/0192166 A1 | 8/2011 | Mulcaire |
| 2012/0177493 A1 | 7/2012 | Fabre |
| 2013/0098050 A1 | 4/2013 | Kupratis |
| 2013/0104521 A1 | 5/2013 | Kupratis |
| 2013/0104522 A1 | 5/2013 | Kupratis |
| 2013/0104560 A1 | 5/2013 | Kupratis |
| 2014/0133982 A1 | 5/2014 | Dejeu et al. |
| 2014/0345253 A1 | 11/2014 | Dawson et al. |
| 2014/0345254 A1 | 11/2014 | Dawson et al. |
| 2015/0003993 A1 | 1/2015 | Kim et al. |
| 2015/0098813 A1 | 4/2015 | Jarrett, Jr. |
| 2015/0121893 A1 | 5/2015 | Kupratis |
| 2015/0284070 A1 | 10/2015 | Breeze-Stringfellow et al. |
| 2015/0291276 A1 | 10/2015 | Zatorski et al. |
| 2016/0010487 A1 | 1/2016 | Breeze-Stringfellow et al. |
| 2016/0053692 A1 | 2/2016 | Izquierdo |
| 2016/0090863 A1 | 3/2016 | Diaz et al. |
| 2016/0160647 A1 | 6/2016 | Hofer et al. |
| 2016/0230658 A1 | 8/2016 | Hanlon et al. |
| 2016/0298550 A1 | 10/2016 | Kupratis et al. |
| 2016/0333734 A1 | 11/2016 | Bowden et al. |
| 2016/0347463 A1 | 12/2016 | Negulescu |
| 2017/0051678 A1 | 2/2017 | Becker, Jr. |
| 2017/0051680 A1 | 2/2017 | Becker, Jr. et al. |
| 2017/0102006 A1 | 4/2017 | Miller et al. |
| 2017/0114721 A1 | 4/2017 | Miller et al. |
| 2017/0167382 A1 | 6/2017 | Miller et al. |
| 2017/0184027 A1 | 6/2017 | Moniz et al. |
| 2017/0198719 A1 | 7/2017 | Cerny et al. |
| 2018/0065727 A1 | 3/2018 | Gruber et al. |
| 2018/0118364 A1 | 5/2018 | Golshany et al. |
| 2018/0215475 A1 | 8/2018 | Hurt et al. |
| 2018/0283795 A1 | 10/2018 | Cerny et al. |
| 2019/0136710 A1 | 5/2019 | Breeze-Stringfellow et al. |
| 2019/0153952 A1 | 5/2019 | Niergarth et al. |
| 2019/0153953 A1 | 5/2019 | Niergarth et al. |
| 2019/0218971 A1 | 7/2019 | Niergarth et al. |
| 2019/0249599 A1 | 8/2019 | Sen et al. |
| 2019/0257247 A1 | 8/2019 | Pal et al. |
| 2019/0360401 A1 | 11/2019 | Rambo et al. |
| 2020/0025109 A1 | 1/2020 | Stieger et al. |
| 2020/0095939 A1 | 3/2020 | Epstein |
| 2020/0116104 A1 | 4/2020 | Levisse et al. |
| 2020/0332718 A1 | 10/2020 | Rambo |
| 2021/0108573 A1 | 4/2021 | Sibbach et al. |
| 2021/0108595 A1 | 4/2021 | Khalid et al. |
| 2021/0108597 A1 | 4/2021 | Ostdiek et al. |
| 2022/0056811 A1 | 2/2022 | Molesini et al. |

FOREIGN PATENT DOCUMENTS

| | | |
|---|---|---|
| DE | 1081277 B | 5/1960 |
| EP | 0385913 A1 | 9/1990 |
| EP | 0887259 A2 | 12/1998 |
| EP | 1493900 A2 | 1/2005 |
| EP | 1988274 A2 | 11/2008 |
| EP | 2540989 A2 | 1/2013 |
| EP | 2562082 A2 | 2/2013 |
| EP | 3093443 A1 | 11/2016 |
| GB | 2100799 A | 1/1983 |
| GB | 2196390 A | 4/1988 |
| GB | 2461811 A | 1/2010 |
| JP | H0370698 A | 3/1991 |

(56) References Cited

FOREIGN PATENT DOCUMENTS

| JP | 2006123880 A | 5/2006 |
|----|----|----|
| JP | 2009508748 A | 3/2009 |
| JP | 2011527263 A | 10/2011 |
| KR | 101179277 B1 | 9/2012 |
| WO | WO2004/033295 A1 | 4/2004 |
| WO | WO2005/111413 A1 | 11/2005 |
| WO | WO2011/020458 A2 | 2/2011 |
| WO | WO2011/094477 A2 | 8/2011 |
| WO | WO2011/107320 A1 | 9/2011 |
| WO | WO2014/143248 A1 | 9/2014 |

OTHER PUBLICATIONS

Naveen et al., CFD Analysis of Low Pressure Turbine Blade Using Vortex Generator Jets, Proceedings of $7^{th}$ International Conference on Intelligent Systems and Control (ISCO 2013) IEEE Explore, Coimbatore, Tamil Nadu, India, Jan. 4-5, 2013, pp. 541-544. https://ieeexplore.ieee.org/document/6481213.

Smith Jr, Unducted Fan Aerodynamic Design, Journal of Turbomachinery, vol. 109, Jul. 1987, pp. 313-324.

Theodorsen, Theory of Propellers, Wartime Report, NACA (National Advisory Committee for Aeronautics), Aug. 1944, pp. 1-53.

Yamamoto et al., Numerical Calculation of Propfan/Swirl Recovery Vane Flow Field, AIAA-92-3771, AIAA//SAE/ASME/ASEE 28th Joint Propulsion Conference and Exhibit, Jul. 6-8, 1992, Nashville TN, pp. 1-9.

| R1/R3 | TPAR | CBR | RqRPrim.-FAN | RqRSec.-FAN |
|---|---|---|---|---|
| 1.489 | 4.7 | 1.41 | 0.25 | 0.60 |
| 1.581 | 4.9 | 1.01 | 0.25 | 0.60 |
| 1.663 | 5.1 | 0.65 | 0.25 | 0.60 |
| 1.758 | 5.2 | 0.35 | 0.25 | 0.60 |
| 1.420 | 7.6 | 2.31 | 0.25 | 0.60 |
| 1.508 | 7.8 | 1.63 | 0.25 | 0.60 |
| 1.587 | 8.0 | 1.04 | 0.25 | 0.60 |
| 1.677 | 8.1 | 0.56 | 0.25 | 0.60 |
| 1.930 | 8.2 | 0.11 | 0.25 | 0.60 |
| 1.330 | 12.2 | 3.82 | 0.25 | 0.60 |
| 1.412 | 12.4 | 2.66 | 0.25 | 0.60 |
| 1.486 | 12.6 | 1.68 | 0.25 | 0.60 |
| 1.581 | 12.7 | 0.99 | 0.30 | 0.60 |
| 1.610 | 12.7 | 0.99 | 0.35 | 0.60 |
| 1.610 | 12.7 | 0.99 | 0.35 | 0.60 |
| 1.812 | 12.7 | 0.99 | 0.25 | 0.55 |
| 1.839 | 12.7 | 0.99 | 0.30 | 0.55 |
| 1.873 | 12.7 | 0.99 | 0.35 | 0.55 |
| 1.873 | 12.7 | 0.99 | 0.35 | 0.55 |
| 1.223 | 12.7 | 0.99 | 0.25 | 0.65 |
| 1.242 | 12.7 | 0.99 | 0.30 | 0.65 |
| 1.264 | 12.7 | 0.99 | 0.35 | 0.65 |
| 1.264 | 12.7 | 0.99 | 0.35 | 0.65 |
| 1.570 | 12.7 | 0.91 | 0.25 | 0.60 |
| 1.628 | 12.7 | 0.71 | 0.30 | 0.60 |
| 1.658 | 12.7 | 0.71 | 0.35 | 0.60 |
| 1.658 | 12.7 | 0.71 | 0.35 | 0.60 |
| 1.876 | 12.7 | 0.71 | 0.25 | 0.55 |
| 1.904 | 12.7 | 0.71 | 0.30 | 0.55 |
| 1.939 | 12.7 | 0.71 | 0.35 | 0.55 |
| 1.939 | 12.7 | 0.71 | 0.35 | 0.55 |
| 1.242 | 12.7 | 0.71 | 0.25 | 0.65 |
| 1.260 | 12.7 | 0.71 | 0.30 | 0.65 |
| 1.283 | 12.7 | 0.71 | 0.35 | 0.65 |
| 1.283 | 12.7 | 0.71 | 0.35 | 0.65 |
| 1.702 | 12.8 | 0.42 | 0.30 | 0.60 |
| 1.733 | 12.8 | 0.42 | 0.35 | 0.60 |
| 1.733 | 12.8 | 0.42 | 0.35 | 0.60 |
| 1.973 | 12.8 | 0.42 | 0.25 | 0.55 |
| 2.003 | 12.8 | 0.42 | 0.30 | 0.55 |
| 2.039 | 12.8 | 0.42 | 0.35 | 0.55 |
| 2.039 | 12.8 | 0.42 | 0.35 | 0.55 |
| 1.278 | 12.8 | 0.42 | 0.25 | 0.65 |
| 1.298 | 12.8 | 0.42 | 0.30 | 0.65 |

FIG. 4A

| R1/R3 | TPAR | CBR | RqRPrim.-FAN | RqRSec.-FAN |
|---|---|---|---|---|
| 1.321 | 12.8 | 0.42 | 0.35 | 0.65 |
| 1.321 | 12.8 | 0.42 | 0.35 | 0.65 |
| 1.812 | 12.8 | 0.17 | 0.25 | 0.60 |
| 1.839 | 12.8 | 0.17 | 0.30 | 0.60 |
| 1.873 | 12.8 | 0.17 | 0.35 | 0.60 |
| 1.873 | 12.8 | 0.17 | 0.35 | 0.60 |
| 2.144 | 12.8 | 0.17 | 0.25 | 0.55 |
| 2.176 | 12.8 | 0.17 | 0.30 | 0.55 |
| 2.216 | 12.8 | 0.17 | 0.35 | 0.55 |
| 2.216 | 12.8 | 0.17 | 0.35 | 0.55 |
| 1.362 | 12.8 | 0.17 | 0.25 | 0.65 |
| 1.383 | 12.8 | 0.17 | 0.30 | 0.65 |
| 1.408 | 12.8 | 0.17 | 0.35 | 0.65 |
| 1.408 | 12.8 | 0.17 | 0.35 | 0.65 |
| 2.492 | 13.2 | 2.84 | 0.25 | 0.60 |
| 2.295 | 13.3 | 2.99 | 0.25 | 0.60 |
| 2.010 | 13.5 | 3.26 | 0.25 | 0.60 |
| 1.788 | 13.7 | 3.55 | 0.25 | 0.60 |
| 2.671 | 13.8 | 2.11 | 0.30 | 0.60 |
| 2.720 | 13.8 | 2.11 | 0.35 | 0.60 |
| 2.720 | 13.8 | 2.11 | 0.35 | 0.60 |
| 2.969 | 13.8 | 2.11 | 0.25 | 0.55 |
| 3.013 | 13.8 | 2.11 | 0.30 | 0.55 |
| 3.068 | 13.8 | 2.11 | 0.35 | 0.55 |
| 3.068 | 13.8 | 2.11 | 0.35 | 0.55 |
| 2.209 | 13.8 | 2.11 | 0.25 | 0.65 |
| 2.242 | 13.8 | 2.11 | 0.30 | 0.65 |
| 2.283 | 13.8 | 2.11 | 0.35 | 0.65 |
| 2.283 | 13.8 | 2.11 | 0.35 | 0.65 |
| 2.647 | 13.9 | 2.03 | 0.25 | 0.60 |
| 2.780 | 14.2 | 1.54 | 0.30 | 0.60 |
| 2.831 | 14.2 | 1.54 | 0.35 | 0.60 |
| 2.831 | 14.2 | 1.54 | 0.35 | 0.60 |
| 3.129 | 14.2 | 1.54 | 0.25 | 0.55 |
| 3.176 | 14.2 | 1.54 | 0.30 | 0.55 |
| 3.234 | 14.2 | 1.54 | 0.35 | 0.55 |
| 3.234 | 14.2 | 1.54 | 0.35 | 0.55 |
| 2.239 | 14.2 | 1.54 | 0.25 | 0.65 |
| 2.273 | 14.2 | 1.54 | 0.30 | 0.65 |
| 2.314 | 14.2 | 1.54 | 0.35 | 0.65 |
| 2.314 | 14.2 | 1.54 | 0.35 | 0.65 |
| 2.783 | 14.4 | 1.32 | 0.25 | 0.60 |
| 2.920 | 14.6 | 0.93 | 0.30 | 0.60 |
| 2.973 | 14.6 | 0.93 | 0.35 | 0.60 |

FIG. 4B

| R1/R3 | TPAR | CBR | RqRPrim.-FAN | RqRSec.-FAN |
|---|---|---|---|---|
| 2.973 | 14.6 | 0.93 | 0.35 | 0.60 |
| 3.334 | 14.6 | 0.93 | 0.25 | 0.55 |
| 3.384 | 14.6 | 0.93 | 0.30 | 0.55 |
| 3.446 | 14.6 | 0.93 | 0.35 | 0.55 |
| 3.446 | 14.6 | 0.93 | 0.35 | 0.55 |
| 2.277 | 14.6 | 0.93 | 0.25 | 0.65 |
| 2.311 | 14.6 | 0.93 | 0.30 | 0.65 |
| 2.354 | 14.6 | 0.93 | 0.35 | 0.65 |
| 2.354 | 14.6 | 0.93 | 0.35 | 0.65 |
| 2.942 | 14.8 | 0.72 | 0.25 | 0.60 |
| 3.376 | 15.1 | 0.14 | 0.25 | 0.60 |
| 3.427 | 15.1 | 0.14 | 0.30 | 0.60 |
| 3.490 | 15.1 | 0.14 | 0.35 | 0.60 |
| 3.490 | 15.1 | 0.14 | 0.35 | 0.60 |
| 3.994 | 15.1 | 0.14 | 0.25 | 0.55 |
| 4.054 | 15.1 | 0.14 | 0.30 | 0.55 |
| 4.129 | 15.1 | 0.14 | 0.35 | 0.55 |
| 4.129 | 15.1 | 0.14 | 0.35 | 0.55 |
| 2.540 | 15.1 | 0.14 | 0.25 | 0.65 |
| 2.625 | 15.1 | 0.14 | 0.35 | 0.65 |
| 1.271 | 15.5 | 4.98 | 0.25 | 0.60 |
| 1.348 | 15.7 | 3.46 | 0.25 | 0.60 |
| 1.419 | 15.8 | 2.18 | 0.25 | 0.60 |
| 1.499 | 15.9 | 1.17 | 0.25 | 0.60 |
| 1.735 | 16.0 | 0.21 | 0.25 | 0.60 |
| 2.703 | 16.6 | 3.32 | 0.25 | 0.60 |
| 2.476 | 16.7 | 3.51 | 0.25 | 0.60 |
| 2.146 | 16.9 | 3.86 | 0.25 | 0.60 |
| 2.833 | 17.0 | 2.84 | 0.30 | 0.60 |
| 2.885 | 17.0 | 2.84 | 0.35 | 0.60 |
| 2.885 | 17.0 | 2.84 | 0.35 | 0.60 |
| 3.126 | 17.0 | 2.84 | 0.25 | 0.55 |
| 3.173 | 17.0 | 2.84 | 0.30 | 0.55 |
| 3.232 | 17.0 | 2.84 | 0.35 | 0.55 |
| 3.232 | 17.0 | 2.84 | 0.35 | 0.55 |
| 2.373 | 17.0 | 2.84 | 0.25 | 0.65 |
| 2.408 | 17.0 | 2.84 | 0.30 | 0.65 |
| 2.453 | 17.0 | 2.84 | 0.35 | 0.65 |
| 2.453 | 17.0 | 2.84 | 0.35 | 0.65 |
| 1.888 | 17.2 | 4.23 | 0.25 | 0.60 |
| 2.869 | 17.3 | 2.38 | 0.25 | 0.60 |
| 3.318 | 17.6 | 2.08 | 0.25 | 0.55 |
| 3.368 | 17.6 | 2.08 | 0.30 | 0.55 |
| 3.430 | 17.6 | 2.08 | 0.35 | 0.55 |

FIG. 4C

| R1/R3 | TPAR | CBR | RqRPrim.-FAN | RqRSec.-FAN |
|---|---|---|---|---|
| 3.430 | 17.6 | 2.08 | 0.35 | 0.55 |
| 2.415 | 17.6 | 2.08 | 0.25 | 0.65 |
| 2.452 | 17.6 | 2.08 | 0.30 | 0.65 |
| 2.497 | 17.6 | 2.08 | 0.35 | 0.65 |
| 2.497 | 17.6 | 2.08 | 0.35 | 0.65 |
| 3.019 | 17.9 | 1.54 | 0.25 | 0.60 |
| 3.123 | 18.1 | 1.26 | 0.30 | 0.60 |
| 3.181 | 18.1 | 1.26 | 0.35 | 0.60 |
| 3.181 | 18.1 | 1.26 | 0.35 | 0.60 |
| 3.554 | 18.1 | 1.26 | 0.25 | 0.55 |
| 3.607 | 18.1 | 1.26 | 0.30 | 0.55 |
| 3.673 | 18.1 | 1.26 | 0.35 | 0.55 |
| 3.673 | 18.1 | 1.26 | 0.35 | 0.55 |
| 2.457 | 18.1 | 1.26 | 0.25 | 0.65 |
| 2.494 | 18.1 | 1.26 | 0.30 | 0.65 |
| 2.540 | 18.1 | 1.26 | 0.35 | 0.65 |
| 2.540 | 18.1 | 1.26 | 0.35 | 0.65 |
| 3.190 | 18.4 | 0.84 | 0.25 | 0.60 |
| 3.376 | 18.6 | 0.52 | 0.30 | 0.60 |
| 3.962 | 18.6 | 0.52 | 0.30 | 0.55 |
| 4.034 | 18.6 | 0.52 | 0.35 | 0.55 |
| 4.034 | 18.6 | 0.52 | 0.35 | 0.55 |
| 2.555 | 18.6 | 0.52 | 0.25 | 0.65 |
| 2.593 | 18.6 | 0.52 | 0.30 | 0.65 |
| 2.641 | 18.6 | 0.52 | 0.35 | 0.65 |
| 2.641 | 18.6 | 0.52 | 0.35 | 0.65 |
| 3.579 | 18.8 | 0.26 | 0.30 | 0.60 |
| 3.645 | 18.8 | 0.26 | 0.35 | 0.60 |
| 3.645 | 18.8 | 0.26 | 0.35 | 0.60 |
| 4.162 | 18.8 | 0.26 | 0.25 | 0.55 |
| 4.225 | 18.8 | 0.26 | 0.30 | 0.55 |
| 4.302 | 18.8 | 0.26 | 0.35 | 0.55 |
| 4.302 | 18.8 | 0.26 | 0.35 | 0.55 |
| 2.668 | 18.8 | 0.26 | 0.25 | 0.65 |
| 2.708 | 18.8 | 0.26 | 0.30 | 0.65 |
| 2.757 | 18.8 | 0.26 | 0.35 | 0.65 |
| 2.757 | 18.8 | 0.26 | 0.35 | 0.65 |
| 3.683 | 18.8 | 0.16 | 0.25 | 0.60 |
| 3.797 | 18.8 | 0.13 | 0.30 | 0.60 |
| 3.867 | 18.8 | 0.13 | 0.35 | 0.60 |
| 3.867 | 18.8 | 0.13 | 0.35 | 0.60 |
| 4.578 | 18.8 | 0.13 | 0.35 | 0.55 |
| 4.578 | 18.8 | 0.13 | 0.35 | 0.55 |
| 2.807 | 18.8 | 0.13 | 0.25 | 0.65 |

FIG. 4D

| R1/R3 | TPAR | CBR | RqRPrim.-FAN | RqRSec.-FAN |
|---|---|---|---|---|
| 2.849 | 18.8 | 0.13 | 0.30 | 0.65 |
| 2.902 | 18.8 | 0.13 | 0.35 | 0.65 |
| 2.902 | 18.8 | 0.13 | 0.35 | 0.65 |
| 3.018 | 21.8 | 3.94 | 0.25 | 0.60 |
| 2.746 | 21.9 | 4.17 | 0.25 | 0.60 |
| 2.349 | 22.1 | 4.63 | 0.25 | 0.60 |
| 2.039 | 22.4 | 5.12 | 0.25 | 0.60 |
| 3.205 | 22.6 | 2.80 | 0.25 | 0.60 |
| 3.372 | 23.3 | 1.80 | 0.25 | 0.60 |
| 3.563 | 23.9 | 0.99 | 0.25 | 0.60 |
| 4.108 | 24.4 | 0.19 | 0.25 | 0.60 |
| 3.273 | 26.1 | 4.35 | 0.25 | 0.60 |
| 2.965 | 26.2 | 4.63 | 0.25 | 0.60 |
| 2.515 | 26.4 | 5.16 | 0.25 | 0.60 |
| 2.162 | 26.7 | 5.75 | 0.25 | 0.60 |
| 3.473 | 27.0 | 3.10 | 0.25 | 0.60 |
| 3.656 | 27.8 | 1.99 | 0.25 | 0.60 |
| 3.867 | 28.4 | 1.07 | 0.25 | 0.60 |
| 4.428 | 28.9 | 0.22 | 0.25 | 0.60 |
| 2.674 | 30.5 | 5.59 | 0.25 | 0.60 |
| 2.281 | 30.8 | 6.27 | 0.25 | 0.60 |
| 3.732 | 31.2 | 3.32 | 0.25 | 0.60 |
| 3.927 | 32.0 | 2.13 | 0.25 | 0.60 |
| 4.150 | 32.7 | 1.16 | 0.25 | 0.60 |
| 4.788 | 33.3 | 0.22 | 0.25 | 0.60 |
| 3.799 | 35.1 | 5.03 | 0.25 | 0.60 |
| 3.420 | 35.2 | 5.35 | 0.25 | 0.60 |
| 2.862 | 35.4 | 6.02 | 0.25 | 0.60 |
| 3.959 | 35.5 | 4.41 | 0.30 | 0.60 |
| 4.032 | 35.5 | 4.41 | 0.35 | 0.60 |
| 4.032 | 35.5 | 4.41 | 0.35 | 0.60 |
| 4.362 | 35.5 | 4.41 | 0.25 | 0.55 |
| 4.427 | 35.5 | 4.41 | 0.30 | 0.55 |
| 4.508 | 35.5 | 4.41 | 0.35 | 0.55 |
| 4.508 | 35.5 | 4.41 | 0.35 | 0.55 |
| 3.327 | 35.5 | 4.41 | 0.25 | 0.65 |
| 3.377 | 35.5 | 4.41 | 0.30 | 0.65 |
| 3.439 | 35.5 | 4.41 | 0.35 | 0.65 |
| 3.439 | 35.5 | 4.41 | 0.35 | 0.65 |
| 2.422 | 35.7 | 6.79 | 0.25 | 0.60 |
| 4.035 | 36.2 | 3.55 | 0.25 | 0.60 |
| 4.682 | 36.5 | 3.02 | 0.25 | 0.55 |
| 4.752 | 36.5 | 3.02 | 0.30 | 0.55 |
| 4.839 | 36.5 | 3.02 | 0.35 | 0.55 |

FIG. 4E

| R1/R3 | TPAR | CBR | RqRPrim.-FAN | RqRSec.-FAN |
|---|---|---|---|---|
| 4.839 | 36.5 | 3.02 | 0.35 | 0.55 |
| 3.400 | 36.5 | 3.02 | 0.25 | 0.65 |
| 3.451 | 36.5 | 3.02 | 0.30 | 0.65 |
| 3.514 | 36.5 | 3.02 | 0.35 | 0.65 |
| 3.514 | 36.5 | 3.02 | 0.35 | 0.65 |
| 4.245 | 37.0 | 2.27 | 0.25 | 0.60 |
| 4.464 | 37.5 | 1.55 | 0.30 | 0.60 |
| 4.546 | 37.5 | 1.55 | 0.35 | 0.60 |
| 4.546 | 37.5 | 1.55 | 0.35 | 0.60 |
| 5.101 | 37.5 | 1.55 | 0.25 | 0.55 |
| 5.177 | 37.5 | 1.55 | 0.30 | 0.55 |
| 5.272 | 37.5 | 1.55 | 0.35 | 0.55 |
| 5.272 | 37.5 | 1.55 | 0.35 | 0.55 |
| 3.477 | 37.5 | 1.55 | 0.25 | 0.65 |
| 3.529 | 37.5 | 1.55 | 0.30 | 0.65 |
| 3.594 | 37.5 | 1.55 | 0.35 | 0.65 |
| 3.594 | 37.5 | 1.55 | 0.35 | 0.65 |
| 4.487 | 37.7 | 1.23 | 0.25 | 0.60 |
| 5.162 | 38.3 | 0.24 | 0.25 | 0.60 |
| 6.208 | 38.4 | 0.20 | 0.25 | 0.55 |
| 6.301 | 38.4 | 0.20 | 0.30 | 0.55 |
| 6.417 | 38.4 | 0.20 | 0.35 | 0.55 |
| 6.417 | 38.4 | 0.20 | 0.35 | 0.55 |
| 3.936 | 38.4 | 0.20 | 0.25 | 0.65 |
| 3.995 | 38.4 | 0.20 | 0.30 | 0.65 |
| 4.069 | 38.4 | 0.20 | 0.35 | 0.65 |
| 4.069 | 38.4 | 0.20 | 0.35 | 0.65 |
| 4.185 | 41.8 | 5.36 | 0.25 | 0.60 |
| 3.754 | 41.9 | 5.73 | 0.25 | 0.60 |
| 3.118 | 42.1 | 6.48 | 0.25 | 0.60 |
| 2.616 | 42.5 | 7.36 | 0.25 | 0.60 |
| 4.446 | 42.9 | 3.77 | 0.25 | 0.60 |
| 4.677 | 43.8 | 2.41 | 0.25 | 0.60 |
| 4.943 | 44.5 | 1.30 | 0.25 | 0.60 |
| 5.664 | 45.2 | 0.26 | 0.25 | 0.60 |
| 4.577 | 48.6 | 5.59 | 0.25 | 0.60 |
| 4.092 | 48.7 | 5.99 | 0.25 | 0.60 |
| 3.378 | 48.9 | 6.81 | 0.25 | 0.60 |
| 2.814 | 49.3 | 7.77 | 0.25 | 0.60 |
| 4.859 | 49.7 | 3.92 | 0.25 | 0.60 |
| 5.112 | 50.7 | 2.50 | 0.25 | 0.60 |
| 5.158 | 56.5 | 6.05 | 0.35 | 0.60 |
| 5.158 | 56.5 | 6.05 | 0.35 | 0.60 |
| 5.528 | 56.5 | 6.05 | 0.25 | 0.55 |

FIG. 4F

| R1/R3 | TPAR | CBR | RqRPrim.-FAN | RqRSec.-FAN |
|---|---|---|---|---|
| 5.611 | 56.5 | 6.05 | 0.30 | 0.55 |
| 5.713 | 56.5 | 6.05 | 0.35 | 0.55 |
| 5.713 | 56.5 | 6.05 | 0.35 | 0.55 |
| 4.331 | 56.5 | 6.05 | 0.25 | 0.65 |
| 4.396 | 56.5 | 6.05 | 0.30 | 0.65 |
| 4.477 | 56.5 | 6.05 | 0.35 | 0.65 |
| 4.477 | 56.5 | 6.05 | 0.35 | 0.65 |
| 5.048 | 56.7 | 5.75 | 0.25 | 0.60 |
| 4.502 | 56.8 | 6.17 | 0.25 | 0.60 |
| 3.696 | 57.1 | 7.05 | 0.25 | 0.60 |
| 3.057 | 57.5 | 8.10 | 0.25 | 0.60 |
| 5.359 | 57.9 | 4.02 | 0.25 | 0.60 |
| 5.524 | 58.2 | 3.56 | 0.30 | 0.60 |
| 5.626 | 58.2 | 3.56 | 0.35 | 0.60 |
| 5.626 | 58.2 | 3.56 | 0.35 | 0.60 |
| 6.179 | 58.2 | 3.56 | 0.25 | 0.55 |
| 6.272 | 58.2 | 3.56 | 0.30 | 0.55 |
| 6.387 | 58.2 | 3.56 | 0.35 | 0.55 |
| 6.387 | 58.2 | 3.56 | 0.35 | 0.55 |
| 4.659 | 58.2 | 3.56 | 0.35 | 0.65 |
| 4.659 | 58.2 | 3.56 | 0.35 | 0.65 |
| 5.638 | 58.8 | 2.56 | 0.25 | 0.60 |
| 5.907 | 59.3 | 1.81 | 0.30 | 0.60 |
| 6.015 | 59.3 | 1.81 | 0.35 | 0.60 |
| 6.015 | 59.3 | 1.81 | 0.35 | 0.60 |
| 6.743 | 59.3 | 1.81 | 0.25 | 0.55 |
| 6.844 | 59.3 | 1.81 | 0.30 | 0.55 |
| 6.970 | 59.3 | 1.81 | 0.35 | 0.55 |
| 6.970 | 59.3 | 1.81 | 0.35 | 0.55 |
| 4.611 | 59.3 | 1.81 | 0.25 | 0.65 |
| 4.680 | 59.3 | 1.81 | 0.30 | 0.65 |
| 4.766 | 59.3 | 1.81 | 0.35 | 0.65 |
| 4.766 | 59.3 | 1.81 | 0.35 | 0.65 |
| 5.959 | 59.6 | 1.38 | 0.25 | 0.60 |
| 6.766 | 60.2 | 0.37 | 0.30 | 0.60 |
| 6.890 | 60.2 | 0.37 | 0.35 | 0.60 |
| 6.890 | 60.2 | 0.37 | 0.35 | 0.60 |
| 7.874 | 60.2 | 0.37 | 0.25 | 0.55 |
| 7.993 | 60.2 | 0.37 | 0.30 | 0.55 |
| 8.139 | 60.2 | 0.37 | 0.35 | 0.55 |
| 8.139 | 60.2 | 0.37 | 0.35 | 0.55 |
| 5.201 | 60.2 | 0.37 | 0.35 | 0.65 |
| 6.863 | 60.2 | 0.26 | 0.25 | 0.60 |
| 5.856 | 70.3 | 5.79 | 0.25 | 0.60 |

FIG. 4G

| R1/R3 | TPAR | CBR | RqRPrim.-FAN | RqRSec.-FAN |
|---|---|---|---|---|
| 5.205 | 70.4 | 6.24 | 0.25 | 0.60 |
| 4.245 | 70.7 | 7.16 | 0.25 | 0.60 |
| 3.483 | 71.2 | 8.29 | 0.25 | 0.60 |
| 6.217 | 71.4 | 4.04 | 0.25 | 0.60 |
| 6.541 | 72.3 | 2.55 | 0.25 | 0.60 |
| 6.913 | 73.0 | 1.38 | 0.25 | 0.60 |
| 7.962 | 73.7 | 0.26 | 0.25 | 0.60 |

FIG. 4H

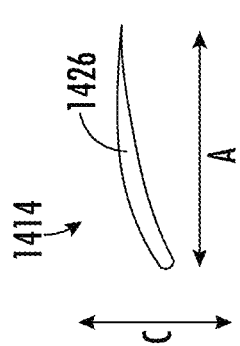
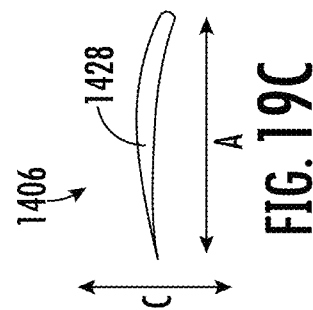
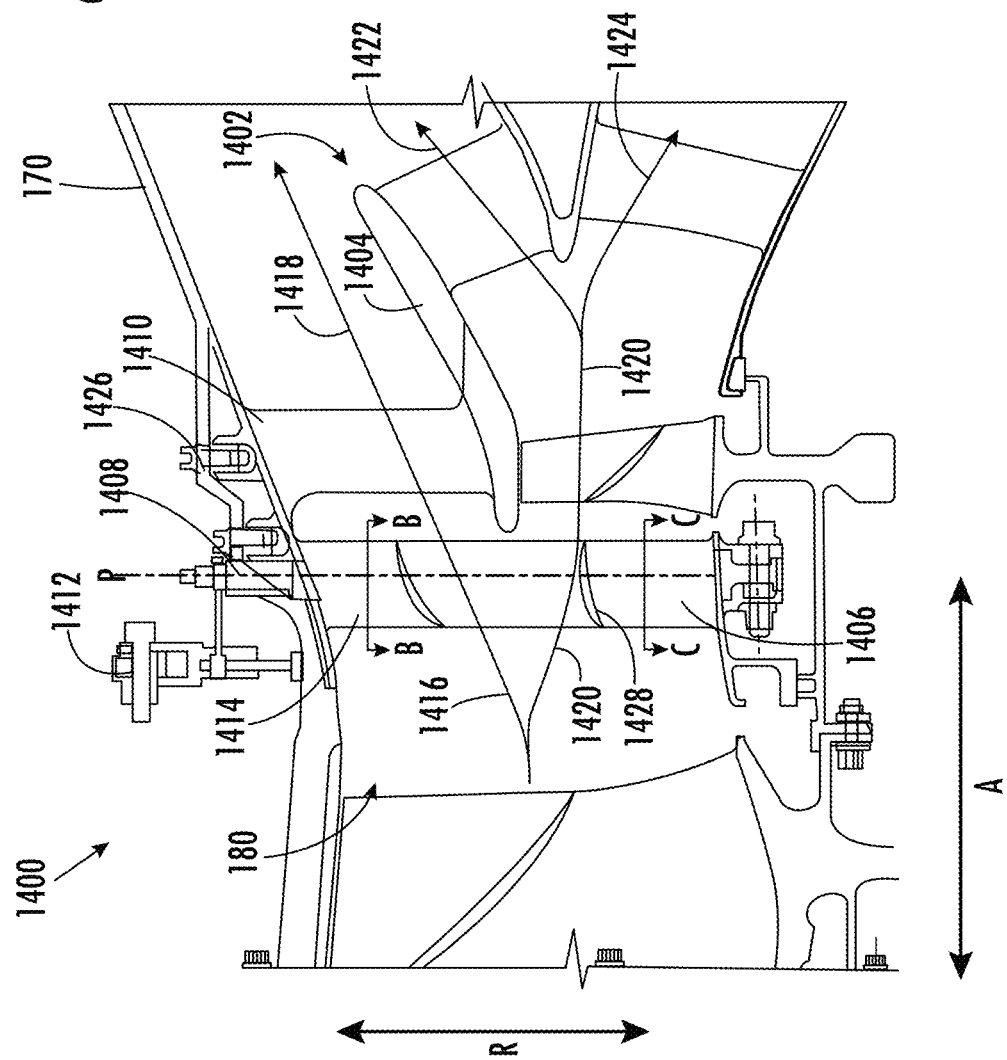

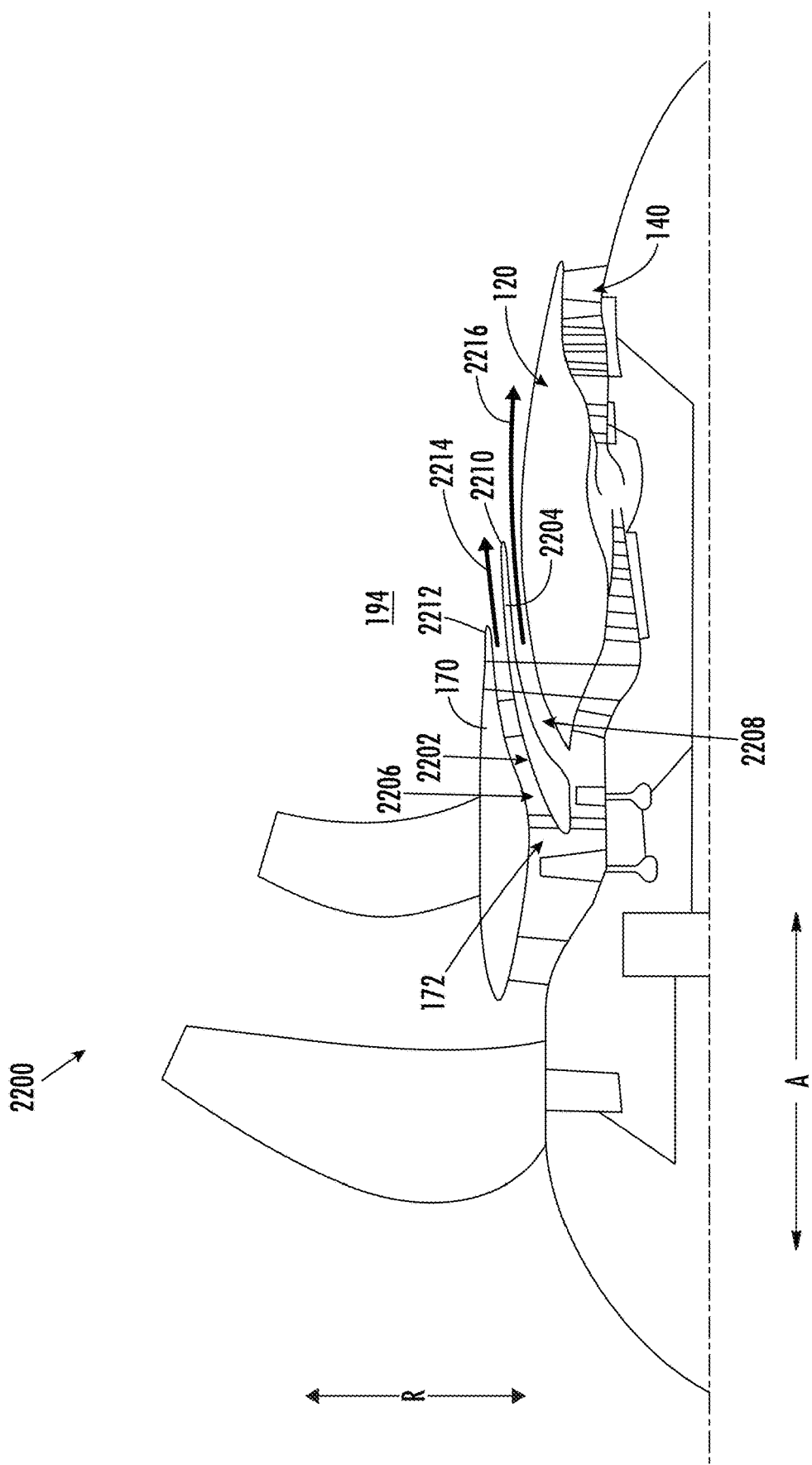

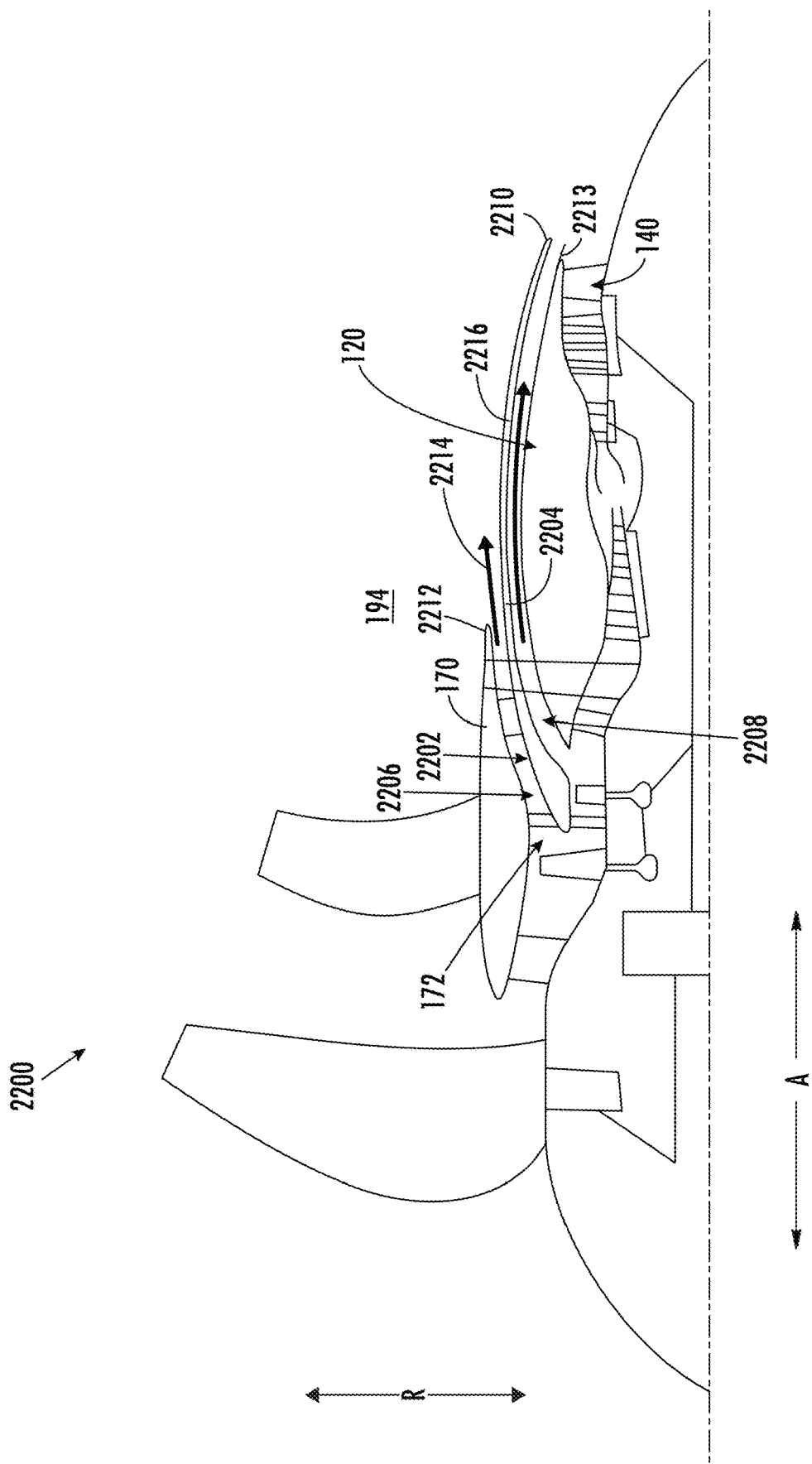

| TPAR | FIXED EXHAUST BOOSTER BLEED RATIO | VARIABLE EXHAUST BOOSTER BLEED RATIO |
|---|---|---|
| 30 | 0.250 | 0.053 |
| 50 | 0.429 | 0.111 |
| 100 | 0.667 | 0.176 |

FIG. 29

GAS TURBINE ENGINE WITH THIRD STREAM

CROSS-REFERENCE TO RELATED APPLICATIONS

This application is a continuation-in-part of U.S. application Ser. No. 18/740,613, filed Jun. 12, 2024, which is a continuation-in-part of U.S. application Ser. No. 17/879,384, filed Aug. 2, 2022. This application is also a continuation-in-part of U.S. application Ser. No. 18/888,873, filed Sep. 18, 2024, which is a continuation-in-part of U.S. application Ser. No. 18/675,270, filed May 28, 2024, which is a continuation of U.S. application Ser. No. 17/879,384, filed Aug. 2, 2022. Each of these cases is hereby incorporated by reference in their entireties.

FIELD

The present disclosure relates to a gas turbine engine with a third stream.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight. The turbomachine is mechanically coupled to the fan for driving the fan during operation.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIGS. 4A through 4H are tables depicting numerical values showing the relationships between various parameters in accordance with various example embodiments of the present disclosure.

FIGS. 19A through 19C are schematic, cross-sectional views of a gas turbine engine with a booster including an outlet guide vane integrated with an inlet guide vane.

FIGS. 27A, 27B, and 27C are schematic, cross-sectional views of gas turbine engines with a booster defining a fourth stream.

FIG. 29 is a table including numerical values corresponding to several of the plotted gas turbine engines in FIG. 30.

DETAILED DESCRIPTION

Figure 1:
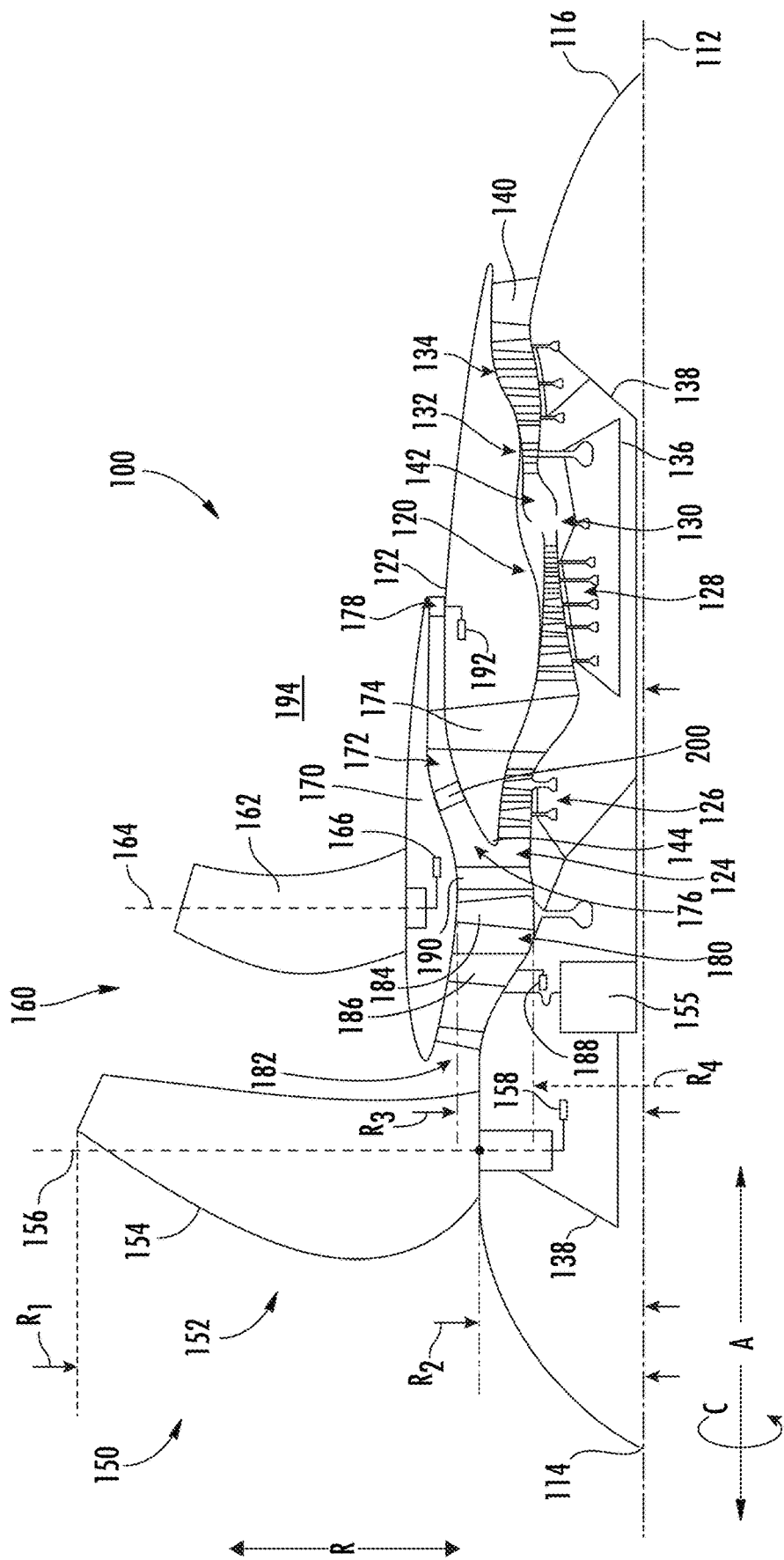
FIG. 1 is a schematic cross-sectional view of a three-stream engine in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The phrases "from X to Y" and "between X and Y" each refers to a range of values inclusive of the endpoints (i.e., refers to a range of values that includes both X and Y).

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

As used herein, the terms "integral", "unitary", or "monolithic" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

The term "unitary" as used herein denotes that the final component has a construction in which the integrated portions are inseparable and is different from a component comprising a plurality of separate component pieces that have been joined together but remain distinct and the single component is not inseparable (i.e., the pieces may be re-separated). Thus, unitary components may comprise generally substantially continuous pieces of material or may comprise a plurality of portions that are permanently bonded to one another. In any event, the various portions forming a unitary component are integrated with one another such that the unitary component is a single piece with inseparable portions.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "disk loading" refers to an average pressure change across a plurality of rotor blades of a rotor assembly, such as the average pressure change across a plurality of fan blades of a fan.

The term "rated speed" refers to an operating condition of an engine at which the engine is operating in the maximum, full load operating condition that is rated by the manufacturer.

The term "standard day operating condition" refers to ambient conditions of sea level altitude, 59 degrees Fahrenheit, and 60 percent relative humidity.

The term "propulsive efficiency" refers to an efficiency with which the energy contained in an engine's fuel is converted into kinetic energy for the vehicle incorporating the engine, to accelerate it, or to replace losses due to aerodynamic drag or gravity.

Generally, an aeronautical gas turbine engine includes a fan to provide a desired amount of thrust without overloading the fan blades (i.e., without increasing a disk loading of the fan blades of the fan beyond a certain threshold), and therefore to maintain a desired overall propulsive efficiency for the gas turbine engine. Conventional gas turbine engine design practice has been to provide an outer nacelle surrounding the fan to provide relatively efficient thrust for the gas turbine engine. Such a configuration, sometimes referred to as a turbofan engine configuration, may generally limit a permissible size of the fan (i.e., a diameter of the fan). However, the inventors of the present disclosure have found that gas turbine engine design is now driving the diameter of the fan higher to provide as much thrust for the gas turbine engine as possible from the fan to improve an overall propulsive efficiency of the gas turbine engine.

By increasing the fan diameter, an installation of the gas turbine engine becomes more difficult. In addition, if an outer nacelle is maintained, the outer nacelle may become weight prohibitive with some larger diameter fans. Further, as the need for gas turbine engines to provide more thrust continues, the thermal demands on the gas turbine engines correspondingly increases.

The inventors of the present disclosure found that for a three stream gas turbine engine having a primary fan and a secondary fan, with the secondary fan being a ducted fan providing an airflow to a third stream of the gas turbine engine, an overall propulsive efficiency of the gas turbine engine that results from providing a high diameter fan may be maintained at a high level, while reducing the size of the primary fan. Such a configuration may maintain a desired overall propulsive efficienly for the gas turbine engine, or unexpectedly may in fact increase the overall propulsive efficiency of the gas turbine engine.

The inventors proceeded in the manner of designing a gas turbine engine with given primary fan characteristics, secondary fan characteristics, and turbomachine characteristics; checking the propulsive efficiency of the designed gas turbine engine; redesigning the gas turbine engine with varying primary fan, secondary fan, and turbomachine characteristics; rechecking the propulsive efficiency of the redesigned gas turbine engine; etc. during the design of several different types of gas turbine engines, including the gas turbine engines described below with reference to FIGS. 1 and 6 through 10. During the course of this practice of studying/evaluating various primary fan characteristics, secondary fan characteristics, and turbomachine characteristics considered feasible for best satisfying mission requirements, it was discovered that certain relationships exist between a ratio of an airflow through the bypass passage and the third stream to an airflow through a core duct (referred to hereinbelow as a thrust to power airflow ratio), as well as between a ratio of an airflow through the third steam to the airflow through the core duct (referred to hereinbelow as a core bypass ratio). In particular, the inventors of the present disclosure have found that these ratios can be thought of as an indicator of the ability of a gas turbine engine to maintain or even improve upon a desired propulsive efficiency via the third stream and, additionally, indicating an improvement in the gas turbine engine's packaging concerns and weight concerns, and thermal management capabilities.

Referring now to FIG. 1, a schematic cross-sectional view of a gas turbine engine 100 is provided according to an example embodiment of the present disclosure. Particularly, FIG. 1 provides a gas turbine engine having a rotor assembly with a single stage of unducted rotor blades. In such a manner, the rotor assembly may be referred to herein as an "unducted fan," or the entire engine 100 may be referred to as an "unducted gas turbine engine." In addition, the engine 100 of FIG. 1 includes a third stream extending from the compressor section to a rotor assembly flowpath over the turbomachine, as will be explained in more detail below.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

The engine 100 includes a turbomachine 120 and a rotor assembly, also referred to a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. As will be appreciated, the high pressure compressor 128, the combustor 130, and the high pressure turbine 132 may collectively be referred to as the "core" of the engine 100. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the engine 100 may be referred to as an open rotor engine.

As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween. Further, each fan blade 154 defines a fan blade tip radius $R_1$ along the radial direction R from the longitudinal axis 112 to the tip, and a hub radius (or inner radius) $R_2$ along the radial direction R from the longitudinal axis 112 to the base of each fan blade 154 (i.e., from the longitudinal axis 112 to a radial location where each fan blade 154 meets a front hub of the gas turbine engine 100 at a leading edge of the respective fan blade 154). As will be appreciated, a distance from the base of each fan blade 154 to a tip of the respective fan blade 154 is referred to as a span of the respective fan blade 154. Further, the fan 152, or rather each fan blade 154 of the fan 152, defines a fan radius ratio, RqR, equal to $R_1$ divided by $R_2$. As the fan 152 is the primary fan of the engine 100, the fan radius ratio, RqR, of the fan 152 may be referred to as the primary fan radius ratio, $RqR_{Prim.-Fan}$.

Moreover, each fan blade 154 defines a central blade axis 156. For this embodiment, each fan blade 154 of the fan 152 is rotatable about their respective central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the low pressure turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1; see fan blades 185 labeled in FIG. 2) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween. Further, each fan blade of the ducted fan 184 defines a fan blade tip radius $R_3$ along the radial direction R from the longitudinal axis 112 to the tip, and a hub radius (or inner radius) $R_4$ along the radial direction R from the longitudinal axis 112 to the base of the respective fan blades of the ducted fan 184 (i.e., a location where the respective fan blades of the ducted fan 184 meet an inner flowpath liner at a leading edge of the respective fan blades of the ducted fan 184). As will be appreciated, a distance from the base of each fan blade of the ducted fan 184 to a tip of the respective fan blade is referred to as a span of the respective fan blade. Further, the ducted fan 184, or rather each fan blade of the ducted fan 184, defines a fan radius ratio, RqR, equal to $R_3$ divided by $R_4$. As the ducted fan 184 is the secondary fan of the engine 100, the fan radius ratio, RqR, of the ducted fan 184 may be referred to as the secondary fan radius ratio, $RqR_{Sec.-Fan}$.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. The inlet duct 180 is wider than the core duct 142 along the radial direction R. The inlet duct 180 is also wider than the fan duct 172 along the radial direction R. The secondary fan 184 is positioned at least partially in the inlet duct 180.

Notably, for the embodiment depicted, the engine 100 includes one or more features to increase an efficiency of a third stream thrust, $Fn_{3S}$ (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vane 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust, $Fn_{3S}$, during one or more engine operating conditions. Further, by introducing a variability in the geometry of the inlet guide vanes 186 and the fan exhaust nozzle 178, the engine 100 may be capable of generating more efficient third stream thrust, $Fn_{3S}$, across a relatively wide array of engine operating conditions, including takeoff and climb (where a maximum total engine thrust $Fn_{Total}$, is generally needed) as well as cruise (where a lesser amount of total engine thrust, $Fn_{Total}$, is generally needed).

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 200 may be positioned in thermal communication with the fan duct 172. For example, one or more heat exchangers 200 may be disposed within the fan duct 172 and utilized to cool one or more fluids from the core engine with the air passing through the fan duct 172, as a resource for removing heat from a fluid, e.g., compressor bleed air, oil or fuel.

Although not depicted, the heat exchanger 200 may be an annular heat exchanger extending substantially 360 degrees in the fan duct 172 (e.g., at least 30 degrees, such as at least 330 degrees). In such a manner, the heat exchanger 200 may effectively utilize the air passing through the fan duct 172 to cool one or more systems of the engine 100 (e.g., lubrication oil systems, compressor bleed air, electrical components, etc.). The heat exchanger 200 uses the air passing through duct 172 as a heat sink and correspondingly increases the temperature of the air downstream of the heat exchanger 200 and exiting the fan exhaust nozzle 178.

Figure 2:
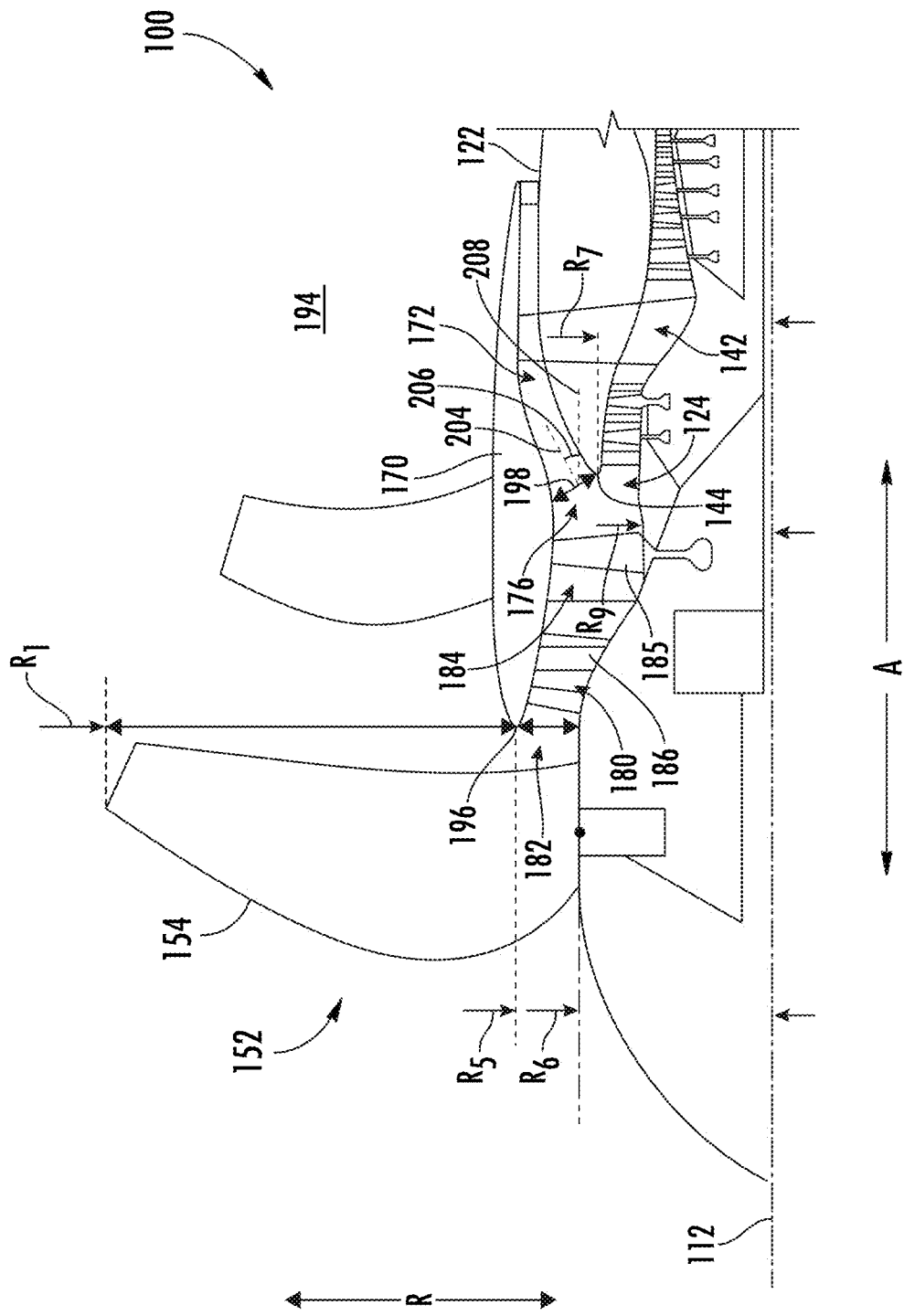
FIG. 2 is a close-up, schematic view of the exemplary three-stream engine of FIG. 1.

Referring now to FIG. 2, a close-up, simplified, schematic view of the gas turbine engine 100 of FIG. 1 is provided. The gas turbine engine 100, as noted above, includes a primary fan, or rather fan 152 having fan blades 154, and a secondary fan, or rather ducted fan 184 having fan blades 185. Airflow from the fan 152 is split between a bypass region 194 and the inlet duct 180 by an inlet splitter 196. Airflow from the ducted fan 184 is split between the fan duct 172 and the core duct 142 by the leading edge 144 (sometimes also referred to as a fan duct splitter).

The exemplary gas turbine engine 100 depicted in FIG. 2 further defines a primary fan outer fan area, $A_{P\_Out}$, a primary fan inner fan area, $A_{P\_In}$, a secondary fan outer fan area, $A_{S\_Out}$, and a secondary fan inner fan area, $A_{S\_In}$.

The primary fan outer fan area, $A_{P\_Out}$, refers to an area defined by an annulus representing a portion of the fan 152 located outward of the inlet splitter 196 of the fan cowl 170. In particular, the gas turbine engine 100 further defines a fan cowl splitter radius, $R_5$. The fan cowl splitter radius, $R_5$, is defined along the radial direction R from the longitudinal axis 112 to the inlet splitter 196. The primary fan outer fan area, $A_{P\_Out}$, refers to an area defined by the formula: $\pi R_1^2 - \pi R_5^2$.

The primary fan inner fan area, $A_{P\_In}$, refers to an area defined by an annulus representing a portion of the fan 152 located inward of the inlet splitter 196 of the fan cowl 170. In particular, the gas turbine engine 100 further defines an engine inlet inner radius, $R_6$. The engine inlet inner radius, $R_6$, is defined along the radial direction R from the longitudinal axis 112 to an inner casing defining the engine inlet 182 directly inward along the radial direction R from the inlet splitter 196. The primary fan inner fan area, $A_{P\_In}$, refers to an area defined by the formula: $\pi R_5^2 - \pi R_6^2$.

The secondary fan outer fan area, $A_{S\_Out}$, refers to an area representing a portion of an airflow from the ducted fan 184 that is provided to the fan duct 172. In particular, the leading edge 144 defines a leading edge radius, $R_7$, and the gas turbine engine 100 defines an effective fan duct inlet outer radius, $R_8$ (see FIG. 3). The leading edge radius, $R_7$, is defined along the radial direction R from the longitudinal axis 112 to the leading edge 144.

Figure 3:
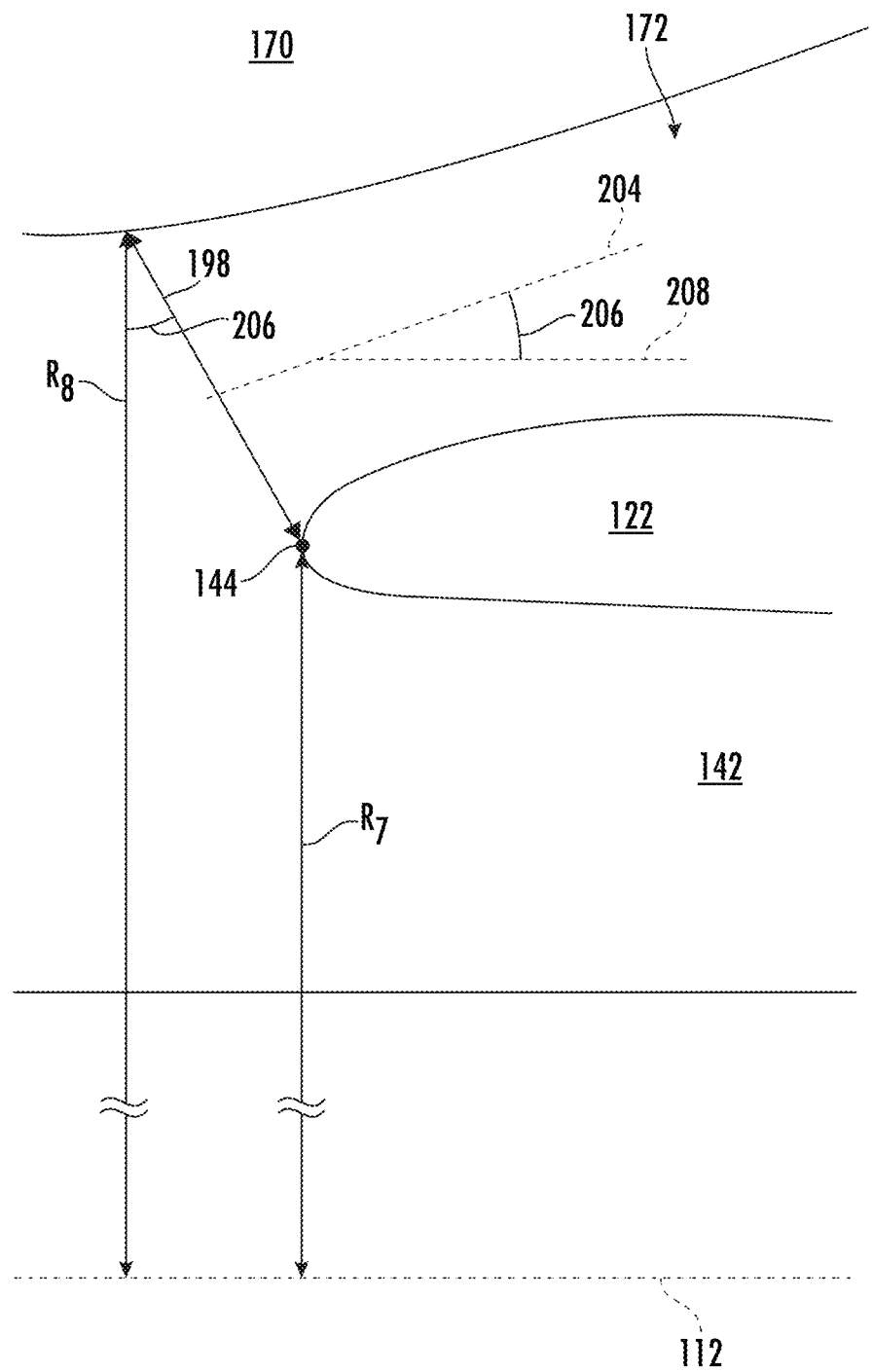
FIG. 3 is a close-up view of an area surrounding a leading edge of a core cowl of the exemplary three-stream engine of FIG. 2.

Referring briefly to FIG. 3, providing a close-up view of an area surrounding the leading edge 144, the fan duct 172 defines a cross-wise height 198 measured from the leading edge 144 to the fan cowl 170 in a direction perpendicular to a mean flow direction 204 of an airflow through a forward 10% of the fan duct 172. An angle 206 is defined by the mean flow direction 204 relative to a reference line 208 extending parallel to the longitudinal axis 112. The angle 206 is referred to as θ. In certain embodiments, the angle 206 may be between 5 degrees and 80 degrees, such as between 10 degrees and 60 degrees (an increased angle is a counterclockwise rotation in FIG. 3). The effective fan duct inlet outer radius, $R_8$, is defined along the radial direction R from the longitudinal axis 112 to where the cross-wise height 198 meets the fan cowl 170. The secondary fan outer fan area, $A_{S\_Out}$, refers to an area defined by the formula:

$$\frac{\pi(R_8^2 - R_7^2)}{\cos(\theta)}.$$

Referring back to FIG. 2, the secondary fan inner fan area, $A_{S\_In}$, refers to an area defined by an annulus representing a portion of the ducted fan 184 located inward of the leading edge 144 of the core cowl 122. In particular, the gas turbine engine 100 further defines a core inlet inner radius, $R_9$. The core inlet inner radius, $R_9$, is defined along the radial direction R from the longitudinal axis 112 to an inner casing defining the core inlet 124 directly inward along the radial direction R from the leading edge 144. The secondary fan inner fan area, $A_{S\_In}$, refers to an area defined by the formula: $\pi R_7^2 - \pi R_9^2$.

The primary fan outer fan area, $A_{P\_Out}$, the primary fan inner fan area, $A_{P\_In}$, the secondary fan outer fan area, $A_{S\_Out}$, and the secondary fan inner fan area, $A_{S\_In}$, may be used in defining various airflow ratios for the engine 100. In particular, it will be appreciated that the exemplary engine 100 of FIGS. 1 through 3 further defines a thrust to power airflow ratio and a core bypass ratio, which as discussed herein are used to define an engine in accordance with the present disclosure. The thrust to power airflow ratio is a ratio of an airflow through the bypass passage of the engine 100 (a passage within the bypass region 194, as defined below) and through the fan duct 172 to an airflow through the core duct 142. Further, the core bypass ratio is a ratio of an airflow through the fan duct 172 to the airflow through the core duct 142. These ratios are calculated while the engine 100 is operating at a rated speed during standard day operating conditions, and the amounts of airflow used to calculate these ratios are each expressed as a mass flowrate in the same units (mass per unit time).

More specifically, the amount of airflow through the engine's bypass passage can be determined using a fan pressure ratio for the fan 152, a rotational speed of the fan 152, or both while the engine is operating at the rated speed during standard day operating conditions, and the primary fan outer fan area, $A_{P\_Out}$. The amount of airflow through the inlet duct 180 can be determined using a fan pressure ratio for the fan 152, a rotational speed of the fan 152, or both while operating at a rated speed during standard day operating conditions, and the primary fan inner fan area, $A_{P\_In}$. The amount of airflow through the fan duct 172 and the amount of airflow through the core duct 142 can be determined based on the amount of airflow through the inlet duct 180 while the engine is operating at the rated speed during standard day operating conditions; a fan pressure ratio, a rotational speed, or both of the ducted fan 184 while the engine is operating at the rated speed during standard day operating conditions; and the secondary fan outer fan area, $A_{S\_Out}$, and the secondary fan inner fan area, $A_{S\_In}$.

As alluded to earlier, the inventors discovered, unexpectedly during the course of gas turbine engine design—i.e., designing gas turbine engines (e.g., both ducted and unducted gas turbine engines and turboprop engines) having a variety of different primary fan and secondary fan characteristics—and evaluating an overall propulsive efficiency, significant relationships exist in a ratio of an airflow through a bypass passage and through a third stream to an airflow through a core duct (referred to herein as a thrust to power airflow ratio), as well as in a ratio of an airflow through the third steam to the airflow through the core duct (referred to herein as a core bypass ratio). These relationships can be thought of as an indicator of the ability of a gas turbine engine to maintain or even improve upon a desired propulsive efficiency via the third stream and, additionally, indicating an improvement in the gas turbine engine's packaging concerns and weight concerns, and thermal management capabilities.

As will be appreciated, it may generally be desirable to increase a fan diameter in order to provide a higher thrust to power airflow ratio, which typically correlates to a higher overall propulsive efficiency. However, increasing the fan diameter too much may actually result in a decrease in propulsive efficiency at higher speeds due to a drag from the fan blades. Further, increasing the fan diameter too much may also create prohibitively heavy fan blades, creating installation problems due to the resulting forces on the supporting structure (e.g., frames, pylons, etc.), exacerbated by a need to space the engine having such fan blades further from a mounting location on the aircraft to allow the engine to fit, e.g., under/over the wing, adjacent to the fuselage, etc.

Similarly, it may generally be desirable to increase an airflow through the fan duct relative to the core duct in order to provide a higher core bypass ratio, as such may also generally correlate to a higher overall propulsive efficiency. Notably, however, the higher the core bypass ratio, the less airflow provided to the core of the gas turbine engine. For a given amount of power needed to drive, e.g., a primary fan and a secondary fan of the gas turbine engine, if less airflow is provided, either a maximum temperature of the core needs to be increased or a size of the primary fan or secondary fan needs to be decreased. Such a result can lead to either premature wear of the core or a reduction in propulsive efficiency of the gas turbine engine.

As noted above, the inventors of the present disclosure discovered bounding the relationships defined by the thrust to power airflow ratio and core bypass ratio can result in a gas turbine engine maintaining or even improving upon a desired propulsive efficiency, while also taking into account the gas turbine engine's packaging concerns and weight concerns, and also providing desired thermal management capabilities. The relationship discovered, infra, can identify an improved engine configuration suited for a particular mission requirement, one that takes into account installation, packaging and loading, thermal sink needs and other factors influencing the optimal choice for an engine configuration.

In addition to yielding an improved gas turbine engine, as explained in detail above, utilizing this relationship, the inventors found that the number of suitable or feasible gas turbine engine designs incorporating a primary fan and a secondary fan, and defining a third stream, capable of meeting both the propulsive efficiency requirements and packaging, weight, and thermal sink requirements could be greatly diminished, which facilitates a more rapid down selection of designs to consider as a gas turbine engine is being developed. Such a benefit provides more insight into the requirements for a given gas turbine engine well before specific technologies, integration and system requirements are developed fully. Such a benefit avoids late-stage redesign.

The desired relationships providing for the improved gas turbine engine, discovered by the inventors, are expressed as:

$$TPAR = (A_B + A_{3S})/A_C \qquad (1)$$

$$CBR = A_{3S}/A_C \qquad (2)$$

where TPAR is a thrust to power airflow ratio, CBR is a core bypass ratio, $A_B$ is an airflow through a bypass passage of the gas turbine engine while the engine is operated at a rated speed during standard day operating conditions, $A_{3S}$ is an airflow through a third stream of the gas turbine engine while the engine is operated at the rated speed during standard day operating conditions, and $A_C$ is an airflow through a core of the gas turbine engine while the engine is operated at the rated speed during standard day operating conditions. The airflow through the core of the gas turbine engine may refer to an airflow through an upstream end of the core (e.g., an airflow through a first stage of a high pressure compressor of the core). $A_B$, $A_{3S}$, and $A_C$ are each expressed as mass flowrate, with the same units as one another.

Values for various parameters of the influencing characteristics of an engine defined by Expressions (1) and (2) are set forth below in TABLE 1:

TABLE 1

| Symbol | Description | Ranges appropriate for using Expression (1) |
|---|---|---|
| $R_1/R_3$ | Tip radius ratio | 1.35 to 10, such as 2 to 7, such as 3 to 5, such as at least 3.5, such as at least 3.7, such as at least 4, such as up to 10, such as up to 7 |
| $RqR_{Sec.-Fan}$ | Secondary fan radius ratio | 0.2 to 0.9, such as 0.2 to 0.7, such as 0.57 to 0.67 |
| $RqR_{Prim.-Fan}$ | Primary fan radius ratio | 0.2 to 0.4, such as 0.25 to 0.35 |
| TPAR | Thrust to power airflow ratio | 3.5 to 100, such as 4 to 75 (see also, TABLE 2, below) |
| CBR | Core Bypass Ratio | 0.1 to 10, such as 0.3 to 5 (see also, TABLE 2, below) |

Referring now to FIGS. 4A through 4H and 5A through 5D, the relationships between the various parameters of Expressions (1) and (2) of exemplary gas turbine engines are illustrated in accordance with one or more exemplary embodiments of the present disclosure. In particular, FIGS. 4A through 4H provide a table including numerical values corresponding to several of the plotted gas turbine engines in FIGS. 5A through 5D. FIGS. 5A through 5D are plots of gas turbine engines in accordance with one or more exemplary embodiments of the present disclosure, showing the TPAR (Y-Axis) and the CBR (X-axis). FIGS. 5A through 5D highlight preferred subranges, including subranges for unducted engines, ducted engines, and turboprop engines, as discussed hereinbelow.

Figure 5A:
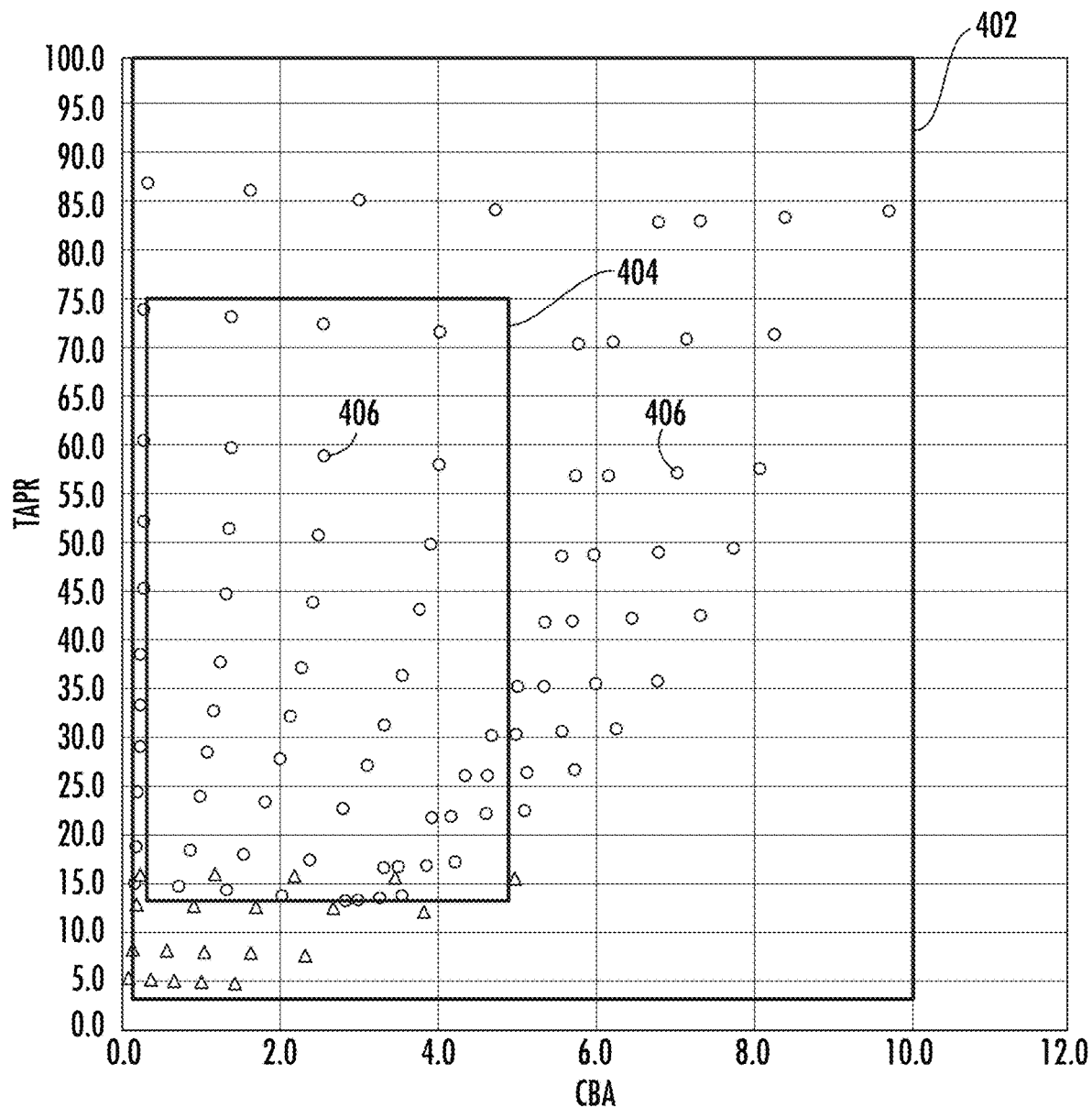
FIGS. 5A through 5D are graphs depicting a range of thrust to power airflow ratios and core bypass ratios in accordance with various example embodiments of the present disclosure.

Referring particularly to FIG. 5A, a first range 402 and a second range 404 are provided, and exemplary embodiments 406 are plotted. The exemplary embodiments 406 include a variety of gas turbine engine types in accordance with aspects of the present disclosure, including unducted gas turbine engines, ducted gas turbine engines (turbofan engines), and turboprop engines. The first range 402 corresponds to a TPAR between 3.5 and 100 and a CBR between 0.1 and 10. The first range 402 captures the benefits of the present disclosure across the variety of engine types. The second range 404 corresponds to a TPAR between 14 and 75 and a CBR between 0.3 and 5. The second range 404 may provide more desirable TPAR and CBR relationships across the variety of engine types to achieve propulsive efficiency, while still providing packaging and weight benefits, thermal benefits, etc.

Figure 5B:
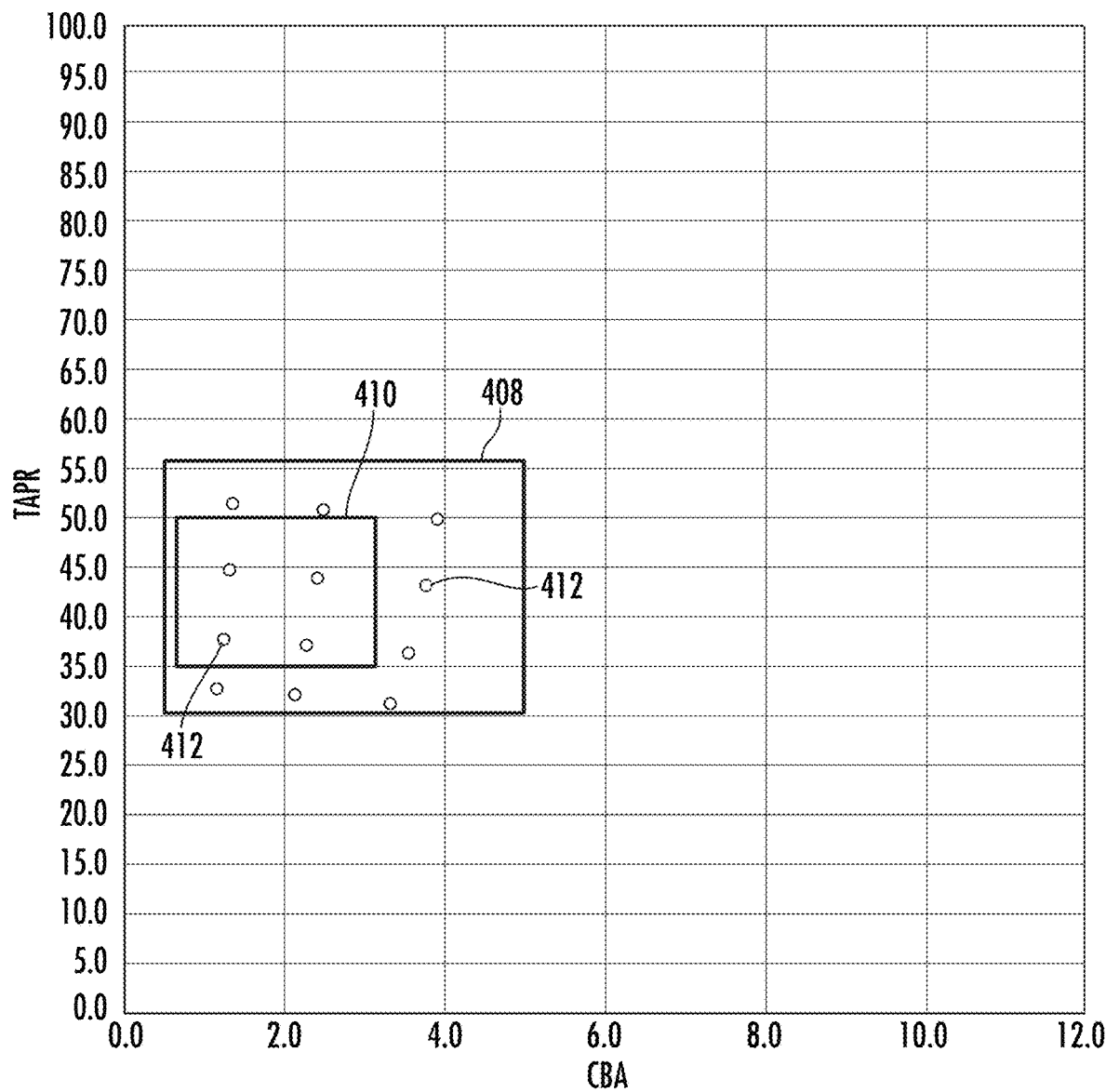

Referring particularly to FIG. 5B, a third range 408 and a fourth range 410 are provided, and exemplary embodiments 412 are plotted. The exemplary embodiments 412 include a variety of unducted gas turbine engines in accordance with aspects of the present disclosure. In particular, the exemplary embodiments 412 include a variety of gas turbine engines having an unducted primary fan, similar to the exemplary embodiments described herein with reference to FIGS. 1 and 10. The third range 408 corresponds to a TPAR between 30 and 56 and a CBR between 0.3 and 5. The third range 408 captures the benefits of the present disclosure for unducted gas turbine engines. The fourth range 410 corresponds to a TPAR between 35 and 50 and a CBR between 0.5 and 3. The fourth range 410 may provide more desirable TPAR and CBR relationships for the unducted gas turbine engines to achieve propulsive efficiency, while still providing packaging and weight benefits, thermal benefits, etc.

As will be appreciated, the unducted gas turbine engines may have, on the whole, a higher TPAR as compared to the ducted gas turbine engines (see FIG. 5C), enabled by a lack of an outer nacelle or other casing surrounding a primary fan. The range of CBR values in the fourth range 410 isn't as large as the range of CBR values in the third range 408, as in the embodiments with a higher TPAR, the CBR needs to be lower to provide a necessary amount of airflow to a core of the engine without exceeding temperature thresholds or requiring an undesired reduction in a size of the primary fan.

The inventors of the present disclosure have found that the TPAR values and CBR values in the third and fourth ranges 408, 410 shown may provide a desirable propulsive benefit, while still enabling operation of the core in a reasonable manner, and balancing installation and thermal load considerations.

Figure 5C:
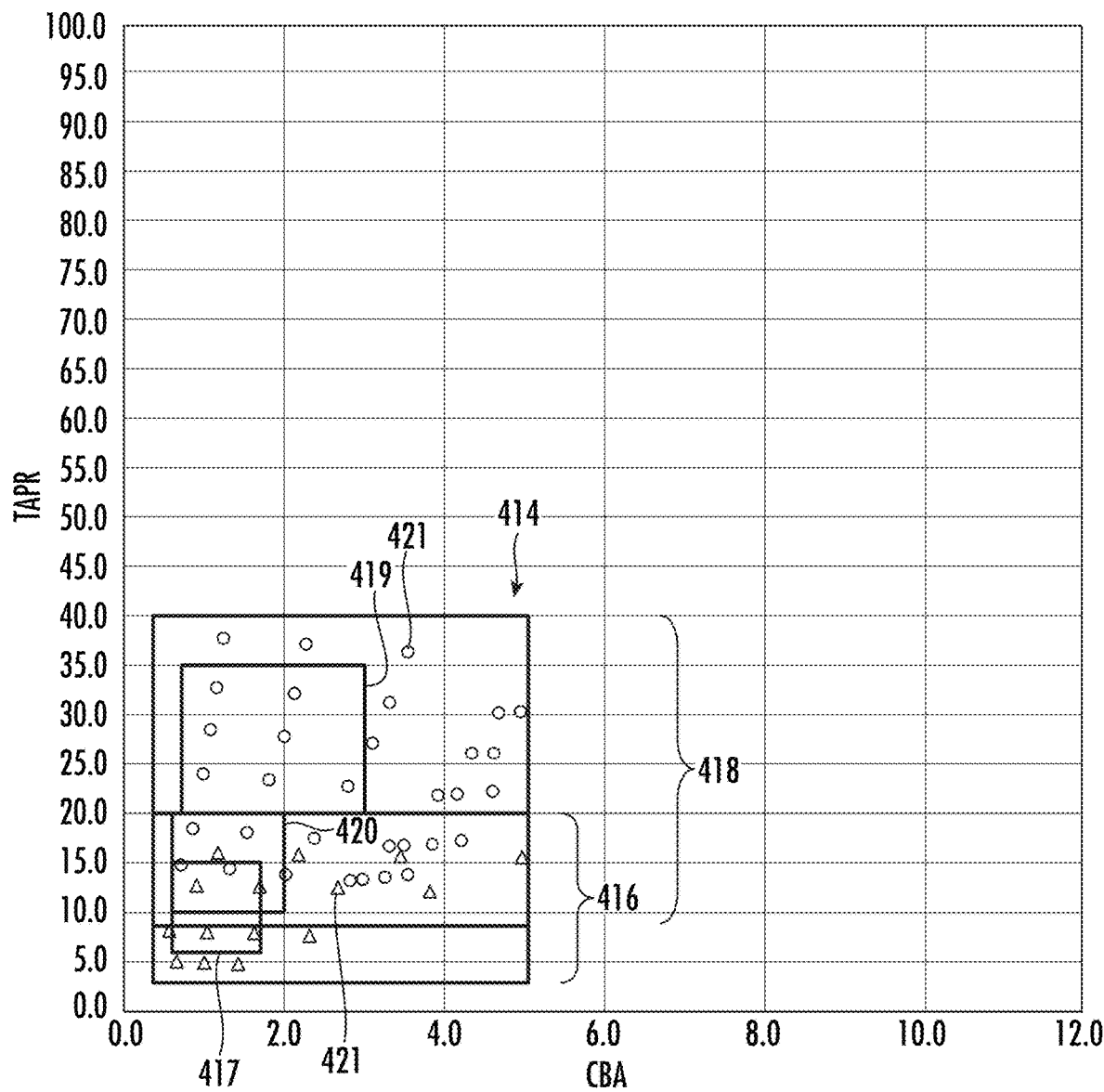

Referring particularly to FIG. 5C, a fifth range 414, a sixth range 416, a seventh range 417, an eighth range 418, a ninth range 419, and a tenth range 420 are provided, and exemplary embodiments 421 are plotted. The exemplary embodiments 421 include a variety of ducted gas turbine engines in accordance with aspects of the present disclosure. In particular, the exemplary embodiments 421 include a variety of gas turbine engines having a ducted primary fan, similar to the exemplary embodiments described herein with reference to FIGS. 7 through 9. The fifth range 414 corresponds to a TPAR between 3.5 and 40 and a CBR between 0.3 and 5. The fifth range 414 captures the benefits of the present disclosure for ducted gas turbine engines.

The sixth range 416 corresponds to a TPAR between 3.5 and 20 and a CBR between 0.2 and 5. The sixth range 416 captures the benefits of the present disclosure for ducted gas turbine engines in a direct drive configuration (see, e.g., FIG. 7). As will be appreciated, with a ducted, direct drive gas turbine engine a primary fan may be smaller, limiting a TPAR. The seventh range 417, which also corresponds to ducted gas turbine engines in a direct drive configuration, corresponds to a TPAR between 6 and 15 and a CBR between 0.3 and 1.8, and may represent a more preferable range.

The eighth range 418 corresponds to a TPAR between 8 and 40 and a CBR between 0.2 and 5. The eighth range 418 captures the benefits of the present disclosure for ducted gas turbine engines in a geared configuration (see, e.g., FIGS. 8 and 9). As will be appreciated, with a ducted, geared gas turbine engine, a primary fan may be larger as compared to a ducted, direct drive gas turbine engine, allowing for a larger TPAR. TPAR is, in turn, limited by an allowable nacelle drag and fan operability.

The ninth range 419 corresponds to ducted gas turbine engines in a geared configuration having a variable pitch primary fan (see FIGS. 8 and 9) and the tenth range 420 corresponds to ducted gas turbine engines in a geared configuration having a fixed pitch primary fan. Inclusion of a variable pitch primary fan may allow for a larger fan, but may also necessitate higher heat rejection abilities for the gas turbine engine, which may, in turn increase a CBR. The ninth range 419 corresponds to a TPAR between 20 and 35 and a CBR between 0.5 and 3, and the tenth range 420 corresponds to a TPAR between 10 and 20 and a CBR between 0.3 and 2. It will be appreciated that in other exemplary aspects, a gas turbine engine of the present disclosure in a ducted, geared, variable pitch configuration may have TPAR between 15 and 40 and a CBR between 0.3 and 5, and a gas turbine engine in a ducted, geared, fixed pitch configuration may have TPAR between 8 and 25 and a CBR between 0.3 and 5.

As will be appreciated, the ducted gas turbine engines may have, on the whole, a lower TPAR than the unducted gas turbine engines as a result of an outer nacelle surrounding a primary fan (the outer nacelle becoming prohibitively heavy with higher diameter primary fans). Further, it will be appreciated that the TPAR values for geared engines may be higher than the TPAR values for direct drive engines, as inclusion of the gearbox allows the primary fan to rotate more slowly than the driving turbine, enabling a comparatively larger primary fan without overloading the primary fan or generating shock losses at a tip of the primary fan. The range of CBR values may generally be relatively high given the relatively low TPAR values (since a relatively high amount of airflow is provided to a secondary fan through an engine inlet when the TPAR values are low), as a necessary amount of airflow to a core of the ducted gas turbine engine may still be provided with a relatively high CBR without exceeding temperature thresholds or requiring a reduction in a size of the primary fan.

The inventors of the present disclosure have found that the TPAR values and CBR values in the fifth, sixth, seventh, eighth, ninth, and tenth ranges 414, 416, 417, 418, 419, 420 shown may provide a desirable propulsive benefit, while still enabling operation of the core in a reasonable manner, and balancing installation and thermal load considerations.

Figure 5D:
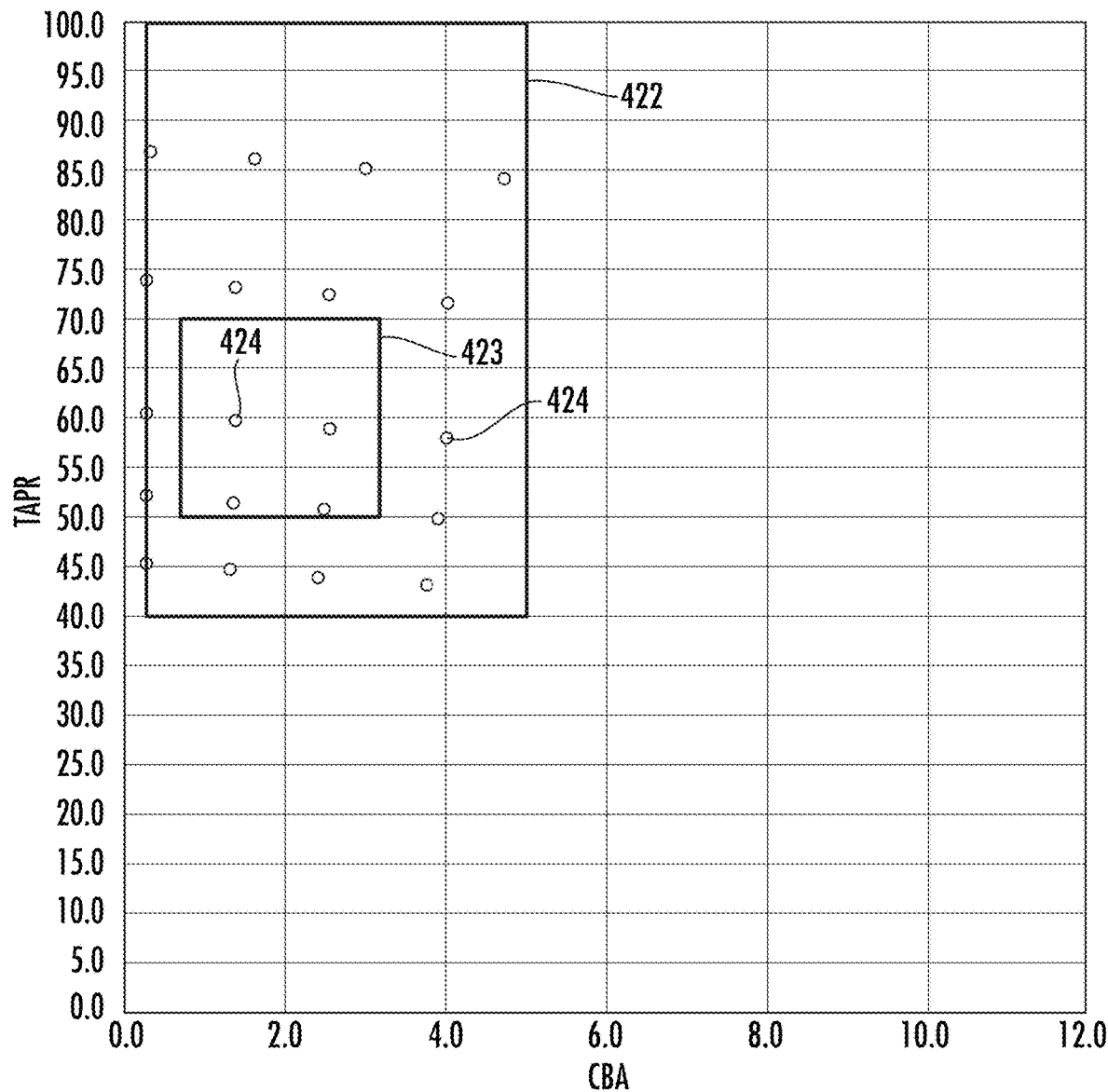

Referring particularly to FIG. 5D, an eleventh range 422 and a twelfth range 423 are provided, and exemplary embodiments 424 are plotted. The exemplary embodiments 424 include a variety of turboprop gas turbine engines in accordance with aspects of the present disclosure. In particular, the exemplary embodiments 424 include a variety of turboprop gas turbine engine similar to the exemplary embodiment described herein with reference to FIG. 6. The eleventh range 422 corresponds to a TPAR between 40 and 100 and a CBR between 0.3 and 5. The eleventh range 422 captures the benefits of the present disclosure for turboprop gas turbine engines. The twelfth range 423 corresponds to a TPAR between 50 and 70 and a CBR between 0.5 and 3, and may represent a more preferable range.

As will be appreciated, the turboprop gas turbine engines may have, on the whole, higher TPAR values than turbofan engines, enabled by the lack of an outer nacelle or other casing surrounding a primary fan and a relatively slow operational speed of the primary fan and aircraft incorporating the turboprop gas turbine engine. The range of CBR values in the eleventh range 422 and the twelfth range 423 may be relatively small, as less air may be provided through a third stream with such a high TPAR without compromising operation of a core of the gas turbine engine.

The inventors of the present disclosure have found that the TPAR values and CBR values in the eleventh range 422 and twelfth range 423 shown may provide a desirable propulsive benefit, while still enabling operation of the core in a reasonable manner, and balancing installation and thermal load considerations.

TABLE 2, below provides a summary of TPAR values and CBR values for various gas turbine engines in accordance with one or more exemplary aspects of the present disclosure.

TABLE 2

| Engine Type | TPAR Value | CBR Value |
|---|---|---|
| All Aeronautical Gas Turbine Engines ("GTE") | 3.5 to 100 | 0.1 to 10 |
| All Aeronautical GTE | 4 to 75 | 0.3 to 5 |
| Open Rotor GTE | 30 to 60 | 0.3 to 5 |
| Open Rotor GTE | 35 to 50 | 0.5 to 3 |
| Ducted Gas GTE | 3.5 to 40 | 0.2 to 5 |
| Ducted, Geared GTE | 8 to 40 | 0.2 to 5 |
| Ducted, Geared, Variable Pitch GTE | 15 to 40 | 0.3 to 5 |
| Ducted, Geared, Variable Pitch GTE | 20 to 35 | 0.5 to 3 |
| Ducted, Geared, Fixed-Pitch GTE | 8 to 25 | 0.2 to 5 |
| Ducted, Geared, Fixed-Pitch GTE | 10 to 20 | 0.3 to 2 |
| Ducted, Direct Drive GTE | 3.5 to 20 | 0.2 to 5 |
| Ducted, Direct Drive GTE (lower flight speed) | 6 to 20 | 0.2 to 5 |
| Ducted, Direct Drive GTE (lower flight speed) | 8 to 15 | 0.3 to 1.8 |
| Ducted, Direct Drive GTE (higher flight speed) | 3.5 to 10 | 0.2 to 2 |
| Ducted, Direct Drive GTE (higher flight speed) | 3.5 to 6 | 0.3 to 1.5 |
| Turboprop GTE | 40 to 100 | 0.3 to 5 |
| Turboprop GTE | 50 to 70 | 0.5 to 3 |

Figure 6:
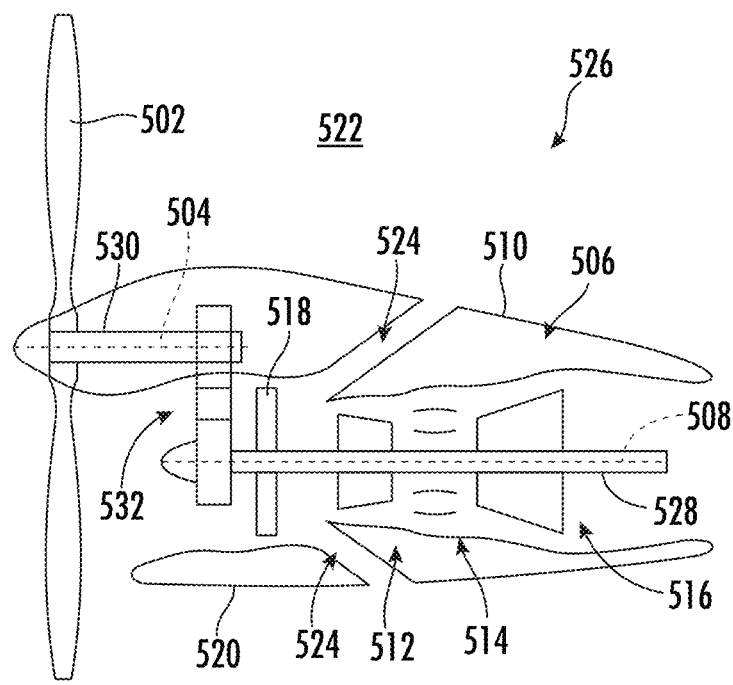
FIG. 6 is a schematic view of a turboprop engine in accordance with an exemplary aspect of the present disclosure.
Figure 7:
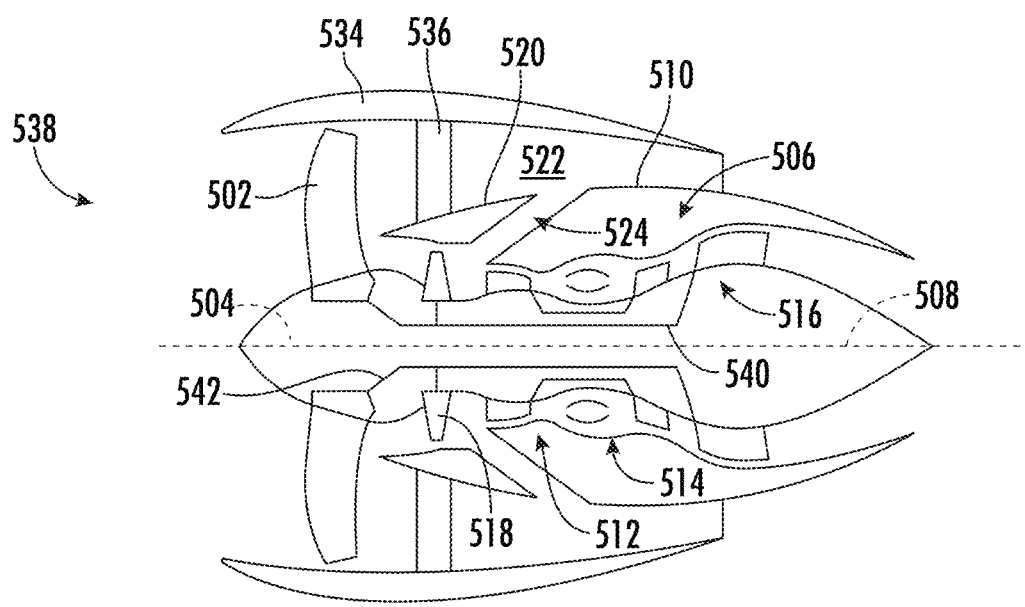
FIG. 7 is a schematic view of a direct drive, ducted, turbofan engine in accordance with an exemplary aspect of the present disclosure.
Figure 8:
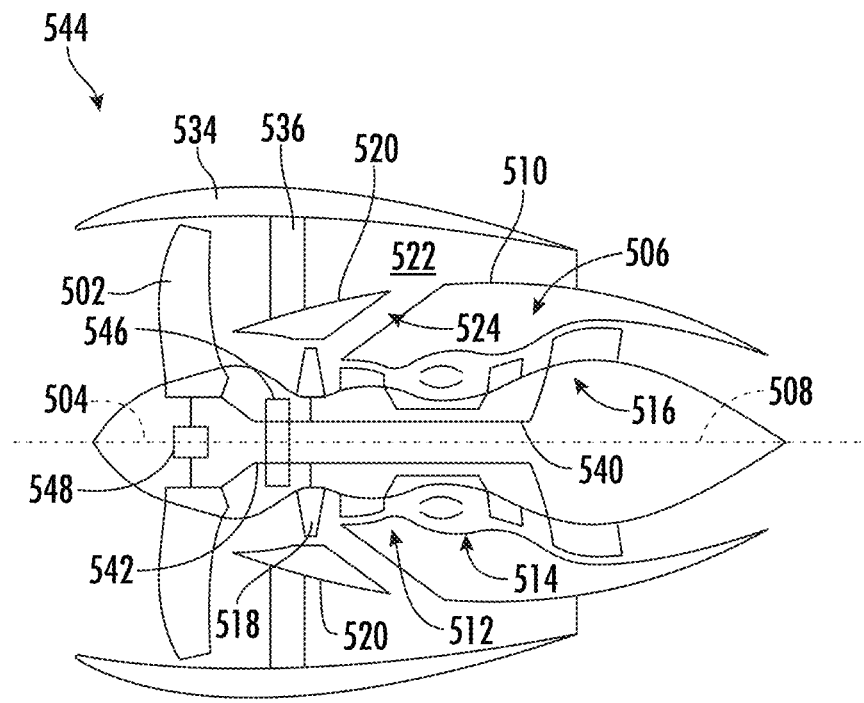
FIG. 8 is a schematic view of a geared, ducted, turbofan engine in accordance with an exemplary aspect of the present disclosure.
Figure 9:
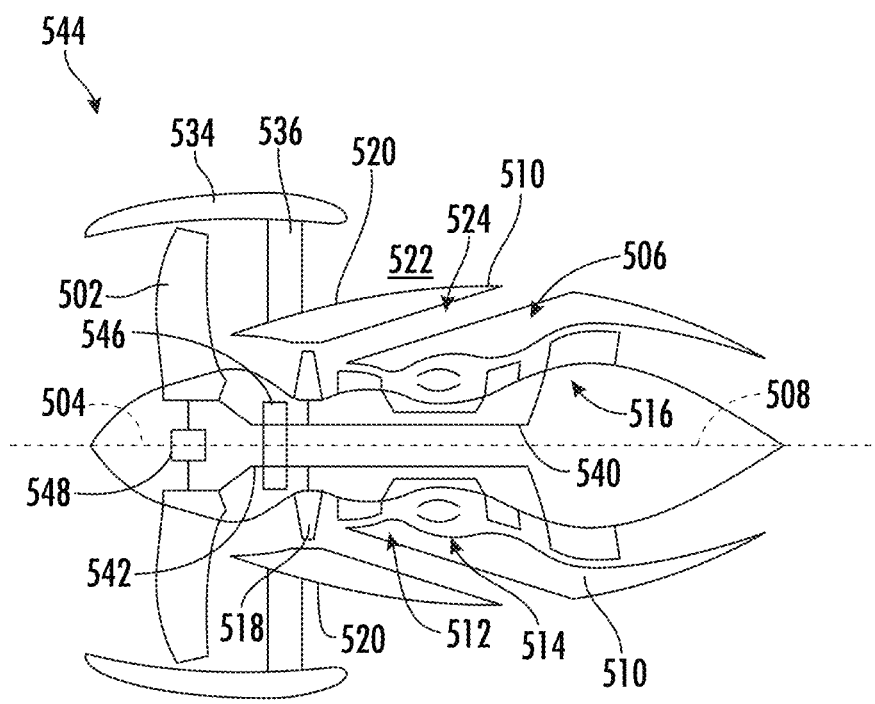
FIG. 9 is a schematic view of a geared, ducted, turbofan engine in accordance with another exemplary aspect of the present disclosure.

For the purposes of Table 2, the term "Ducted" refers to inclusion of an outer nacelle around a primary fan (see, e.g., FIGS. 7 to 9); "Open Rotor" refers to inclusion of an unducted primary fan (see, e.g., FIGS. 1, 10); "Geared" refers to inclusion of a reduction gearbox between the primary fan and a driving turbine (see, e.g., FIGS. 8 to 10); "Direct Drive" refers to exclusion of a reduction gearbox between the primary fan and a driving turbine (see, e.g., FIG. 7); "Variable Pitch" refers to inclusion of a pitch change mechanism for changing a pitch of fan blades on a primary fan (see, e.g., FIGS. 1, 8, 9); "Fixed Pitch" refers to exclusion of a pitch change mechanism for changing a pitch of fan blades on a primary fan (see, e.g., FIGS. 6 to 7); "lower flight speed" refers to an engine designed to operate at a flight speed less than 0.85 Mach; and "higher flight speed" refers to an engine designed to operate at a flight speed higher than 0.85 Mach.

It will be appreciated that although the discussion above is generally relating to the open rotor engine 100 described above with reference to FIGS. 1 and 2, in various embodiments of the present disclosure, the relationships outlined above with respect to, e.g., Expressions (1) and (2) may be applied to any other suitable engine architecture. For example, reference will now be made to FIGS. 6 through 10, each depicting schematically an engine architecture associated with the present disclosure.

Each of the gas turbine engines of FIGS. 6 through 9 generally include a rotor 502 rotatable about a rotor axis 504 and a turbomachine 506 rotatable about a longitudinal axis 508. The rotor 502 corresponds to the "primary fan" described herein. The turbomachine 506 is surrounded at least in part by a core cowl 510 and includes a compressor section 512, a combustion section 514, and a turbine section 516 in serial flow order. In addition to the rotor 502, the gas turbine engines of FIGS. 7 through 9 each also include a ducted mid-fan or secondary fan 518. The gas turbine engines each include a fan cowl 520 surrounding the secondary fan 518.

Referring still to the gas turbine engines of FIGS. 6 through 9, the gas turbine engines each also define a bypass passage 522 downstream of the respective rotor 502 and over the respective fan cowl 520 and core cowl 510, and further define a third stream 524 extending from a location downstream of the respective secondary fan 518 to the respective bypass passage 522 (at least in the embodiments depicted; in other embodiments, the third stream 524 may instead extend to a location downstream of the bypass passage 522).

Referring particularly to FIG. 6, the exemplary gas turbine engine depicted is configured as a turboprop engine 526. In such a manner, the rotor 502 (or primary fan) is configured as a propeller, defining a relatively large diameter. Further, the turboprop engine 526 includes an engine shaft 528 driven by the turbomachine 506, a fan shaft 530 rotatable with the rotor 502, and a gearbox 532 mechanically coupling the engine shaft 528 with the fan shaft 530. The gearbox 532 is an offset gearbox such that the rotor axis 504 is radially offset from the longitudinal axis 508 of the turboprop engine 526.

Notably, in other embodiments of the present disclosure, a turboprop engine may be provided with a reverse flow combustor.

Referring to FIGS. 7 through 9, the gas turbine engines are each configured as turbofan engines, and more specifically as ducted turbofan engines. In such a manner, the gas turbine engines each include an outer nacelle 534 surrounding the rotor 502, and the rotor 502 (or primary fan) of each is therefore configured as a ducted fan. Further, each of the gas turbine engines includes outlet guide vanes 536 extending through the bypass passage 522 to the outer nacelle 534 from the fan cowl 520, the core cowl 510, or both.

More specifically, still, the gas turbine engine of FIG. 7 is configured as a direct drive, ducted, turbofan engine 538. In particular, the direct drive, ducted, turbofan engine 538 includes an engine shaft 540 driven by the turbine section 516 and a fan shaft 542 rotatable with the rotor 502. The fan shaft 542 is configured to rotate directly with (i.e., at the same speed as) the engine shaft 540.

By contrast, the gas turbine engine of FIG. 8 is configured as a geared, ducted, turbofan engine 544. In particular, the geared, ducted, turbofan engine 544 includes the engine shaft 540 driven by the turbine section 516 and the fan shaft 542 rotatable with the rotor 502. However, the exemplary geared, ducted, turbofan engine 544 further includes a gearbox 546 mechanically coupling the engine shaft 540 to the fan shaft 542. The gearbox 546 allows the rotor 502 to rotate at a slower speed than the engine shaft 540, and thus at a slower speed than the secondary fan 518.

Notably, the exemplary geared, ducted, turbofan engine 544 of FIG. 8 further includes a pitch change mechanism 548 operable with the rotor 502 to change a pitch of the rotor blades of the rotor 502. Such may allow for an increased efficiency of the gas turbine engine.

Further, the exemplary gas turbine engine of FIG. 9 is again configured as a direct drive, ducted, turbofan engine 538. However, by contrast to the embodiment of FIG. 8 where a fan duct outlet defined by the fan duct is upstream of a bypass passage outlet defined by the bypass passage, in the embodiment of FIG. 9, the fan duct outlet defined by the fan duct is downstream of the bypass passage outlet defined by the bypass passage.

Moreover, in other exemplary embodiments, other suitable gas turbine engines may be provided. For example, referring now to FIG. 10, a gas turbine engine in accordance with yet another exemplary embodiment of the present disclosure is provided. The exemplary gas turbine engine of FIG. 10 may be configured in a similar manner as the exemplary gas turbine engines described above with reference to FIGS. 7 and 8.

Figure 10:
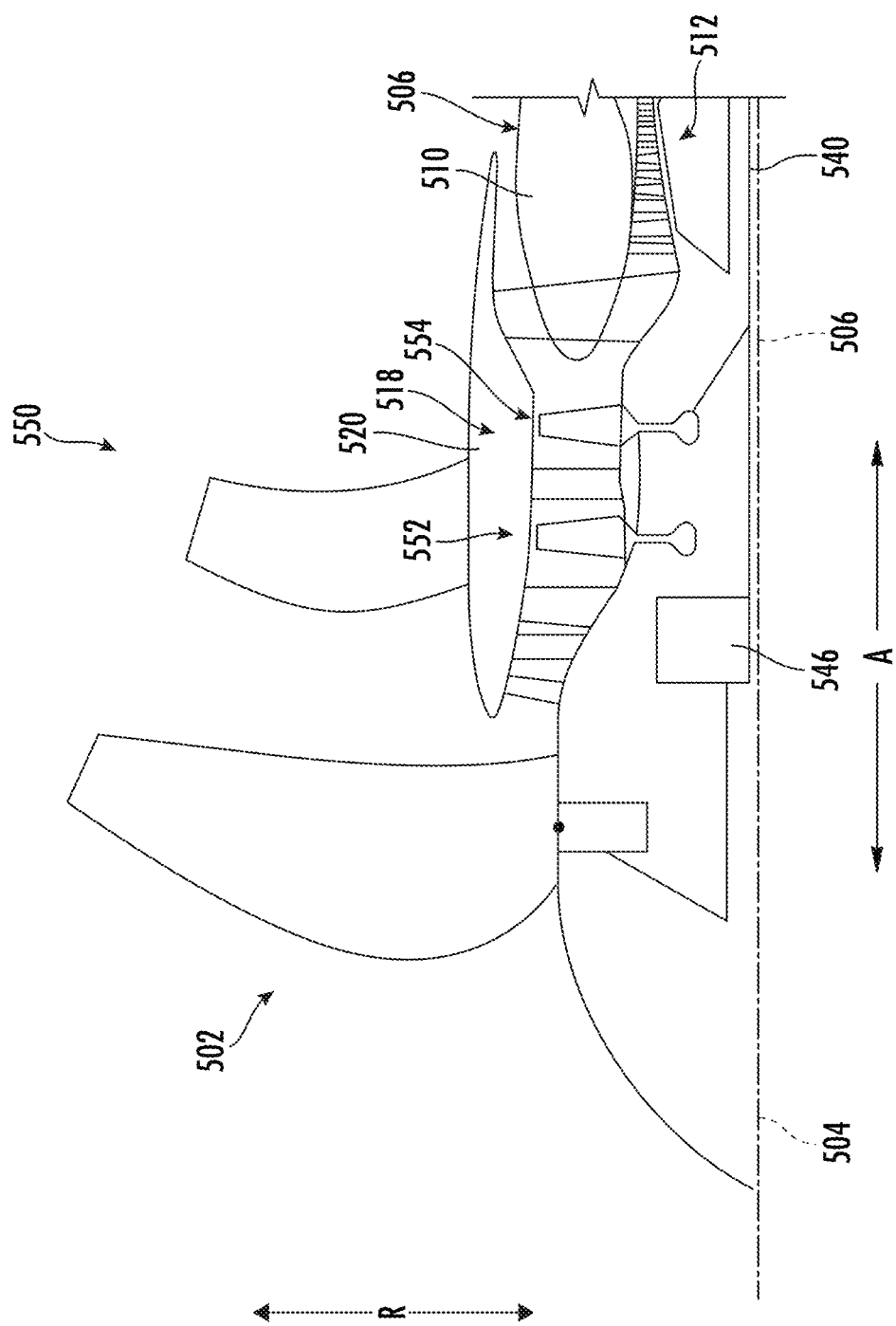
FIG. 10 is a schematic view of an unducted gas turbine engine in accordance with another exemplary aspect of the present disclosure.

For example, the exemplary gas turbine engine of FIG. 10 includes a rotor 502 rotatable about a rotor axis 504 and a turbomachine 506 rotatable about a longitudinal axis 508. The rotor axis 504 and the longitudinal axis 508 are aligned in the embodiment of FIG. 10. The rotor 502 corresponds to the "primary fan" described herein. The turbomachine 506 is surrounded at least in part by a core cowl 510 and includes a compressor section 512 (and, not shown, a combustion section and a turbine section in serial flow order with the compressor section 512). In addition to the rotor 502, the gas turbine engine also includes a ducted mid-fan or secondary fan 518 and a fan cowl 520 surrounding the secondary fan 518.

However, for the embodiment of FIG. 10, the gas turbine engine is configured as an unducted gas turbine engine 550 (see, e.g., FIG. 1), and the secondary fan 518 is not configured as a single stage fan (see fan 184 of FIG. 1). Instead, for the embodiment of FIG. 10, the secondary fan 518 is configured as a multi-stage secondary fan, and more specifically still as a two-stage secondary fan having a total of two stages of rotating compressor rotor blades, and more specifically having a first stage 552 of secondary fan rotor blades and a second stage 554 of secondary fan rotor blades. Notably, with such a configuration, the turbomachine 506 does not include a separate low pressure compressor.

Further, it will be appreciated that in at least certain exemplary embodiments of the present disclosure, a method of operating a gas turbine engine is provided. The method may be utilized with one or more of the exemplary gas turbine engines discussed herein, such as in FIGS. 1 through 10. The method includes operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5. For the exemplary method, the thrust to power airflow ratio is a ratio of an airflow through a bypass passage over a turbomachine of the gas turbine engine plus an airflow through a fan duct to an airflow through a core duct, and the core bypass ratio is a ratio of the airflow through the fan duct to the airflow through the core duct.

As will be appreciated from the description herein, various embodiments of a gas turbine engine are provided. Certain of these embodiments may be an unducted, single rotor gas turbine engine (see FIGS. 1 and 2), a turboprop engine (see FIG. 6), or a ducted turbofan engine (see FIGS. 7 through 9). Another example of a ducted turbofan engine can be found in U.S. patent application Ser. No. 16/811,368 (Published as U.S. Patent Application Publication No. 2021/0108597), filed Mar. 6, 2020 (FIG. 10, Paragraph [0062], et al.; including an annular fan case 13 surrounding the airfoil blades 21 of rotating element 20 and surrounding vanes 31 of stationary element 30; and including a third stream/fan duct 73 (shown in FIG. 10, described extensively throughout the application)). Various additional aspects of one or more of these embodiments are discussed below. These exemplary aspects may be combined with one or more of the exemplary gas turbine engine(s) discussed above with respect to the figures.

For example, in some embodiments of the present disclosure, the engine may include a heat exchanger located in an annular duct, such as in a third stream. The heat exchanger may extend substantially continuously in a circumferential direction of the gas turbine engine (e.g., at least 300 degrees, such as at least 330 degrees).

In one or more of these embodiments, a threshold power or disk loading for a fan (e.g., an unducted single rotor or primary forward fan) may range from 25 horsepower per square foot ($hp/ft^2$) or greater at cruise altitude during a cruise operating mode. In particular embodiments of the engine, structures and methods provided herein generate power loading between 80 hp/ft² and 160 hp/ft² or higher at cruise altitude during a cruise operating mode, depending on whether the engine is an open rotor or ducted engine.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

As such, it will be appreciated that an engine of such a configuration may be configured to generate at least 25,000 pounds and less than 80,000 of thrust during operation at a rated speed, such as between 25,000 and 50,000 pounds of thrust during operation at a rated speed, such as between 25,000 and 40,000 pounds of thrust during operation at a rated speed. Alternatively, in other exemplary aspects, an engine of the present disclosure may be configured to generate much less power, such as at least 2,000 pounds of thrust during operation at a rated speed.

In various exemplary embodiments, the fan (or rotor) may include twelve (12) fan blades. From a loading standpoint, such a blade count may allow a span of each blade to be reduced such that the overall diameter of the primary fan may also be reduced (e.g., to twelve feet in one exemplary embodiment). That said, in other embodiments, the fan may have any suitable blade count and any suitable diameter. In certain suitable embodiments, the fan includes at least eight (8) blades. In another suitable embodiment, the fan may have at least twelve (12) blades. In yet another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades. Alternatively, in certain suitable embodiments, the fan may only include at least four (4) blades, such as with a fan of a turboprop engine.

Further, in certain exemplary embodiments, the rotor assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet.

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

Additionally, in certain exemplary embodiments, where the engine includes the third stream and a mid-fan (a ducted fan aft of the primary, forward fan; also referred to herein as a secondary fan), a ratio R1/R2 may be between 1 and 10, or 2 and 7, or at least 3.3, at least 3.5, at least 4 and less than or equal to 7, where R1 is the radius of the primary fan and R2 is the radius of the mid-fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps. Alternatively, in certain suitable embodiments, the engine allows for normal aircraft operation of at least Mach 0.3, such as with turboprop engines.

A fan pressure ratio (FPR) for the primary fan of the fan assembly can be 1.04 to 2.20, or in some embodiments 1.05 to 1.2, or in some embodiments less than 1.08, as measured across the fan blades of the primary fan at a cruise flight condition.

In order for the gas turbine engine to operate with a fan having the above characteristics to define the above FPR, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed is between 3.0 and 4.0, between 3.2 and 3.5, or between 3.5 and 4.5. In some embodiments, a gear ratio of the input rotational speed to the output rotational speed is greater than 4.1. For example, in particular embodiments, the gear ratio is within a range of 4.0 to 4.5, within a range of 4.1 to 14.0, within a range of 4.5 to 14.0, or within a range of 6.0 to 14.0. In certain embodiments, the gear ratio is within a range of 4.5 to 12 or within a range of 6.0 to 11.0.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 4 to 15 stages, a high-pressure turbine may include 1 to 2 stages, and/or a low pressure turbine (LPT) may include 1 to 7 stages. In particular, the LPT may have 4 stages, or between 4 and 7 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

A core engine is generally encased in an outer casing defining one half of a core diameter (Dcore), which may be thought of as the maximum extent from a centerline axis (datum for R). In certain embodiments, the engine includes a length (L) from a longitudinally (or axial) forward end to a longitudinally aft end. In various embodiments, the engine defines a ratio of L/Dcore that provides for reduced installed drag. In one embodiment, L/Dcore is at least 2. In another embodiment, L/Dcore is at least 2.5. In some embodiments, the L/Dcore is less than 5, less than 4, and less than 3. In various embodiments, it should be appreciated that the L/Dcore is for a single unducted rotor engine.

The reduced installed drag may further provide for improved efficiency, such as improved specific fuel consumption. Additionally, or alternatively, the reduced installed drag may provide for cruise altitude engine and aircraft operation at the above describe Mach numbers at cruise altitude. Still particular embodiments may provide such benefits with reduced interaction noise between the blade assembly and the vane assembly and/or decreased overall noise generated by the engine by virtue of structures located in an annular duct of the engine.

Additionally, it should be appreciated that ranges of power loading and/or rotor blade tip speed may correspond to certain structures, core sizes, thrust outputs, etc., or other structures of the core engine. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

Although depicted above as an unshrouded or open rotor engine in the embodiments depicted above, it should be appreciated that aspects of the disclosure provided herein may be applied to shrouded or ducted engines, partially ducted engines, aft-fan engines, or other gas turbine engine configurations, including those for marine, industrial, or aero-propulsion systems. Certain aspects of the disclosure may be applicable to turbofan, turboprop, or turboshaft engines. However, it should be appreciated that certain aspects of the disclosure may address issues that may be particular to unshrouded or open rotor engines, such as, but not limited to, issues related to gear ratios, fan diameter, fan speed, length (L) of the engine, maximum diameter of the core engine (Dcore) of the engine, L/Dcore of the engine, desired cruise altitude, and/or desired operating cruise speed, or combinations thereof.

In an extension of the concepts disclosed hereinabove, also provided herein is a gas turbine engine having a turbomachine, a primary fan driven by the turbomachine, a secondary fan downstream of the primary fan within an inlet duct of the turbomachine, and a booster. The booster is located downstream of the secondary fan and includes a booster rotor blade and booster cowl. The booster cowl is located outward of the booster rotor blade and at least partially within a fan duct of the turbomachine at a fan duct inlet. The booster cowl separates an upstream portion of the fan duct into an upper fan duct having an upper fan duct inlet and a lower fan duct having a lower fan duct inlet. The upper fan duct inlet and lower fan duct inlet collectively form the fan duct inlet.

Such a configuration may allow for a desirable range of airflow through the fan duct in a variety of operating conditions of the gas turbine engine. In particular, it is desirable to have the upper fan duct inlet and lower fan duct inlet (collectively forming the fan duct inlet) sized to provide a thrust to power airflow ratio (TPAR) and a core bypass ratio (CBR) within the ranges set forth above to achieve a gas turbine engine maintaining or even improving upon a desired propulsive efficiency, while also taking into account the gas turbine engine's packaging concerns and weight concerns, and also providing desired thermal management capabilities for, e.g., a heat exchanger in the fan duct. Notably, inclusion of the booster having the booster cowl with the booster rotor blade located inward of the booster cowl (and upstream of the lower fan duct inlet) may allow for the fan duct to provide additional thermal management benefits and thrust benefits by virtue of an increase in a total pressure of the airflow through the fan duct. For example, with a higher total pressure, the airflow through the fan duct may accommodate a heat exchanger designed to have a higher pressure drop (and thus increased heat transfer capabilities), may provide increased thrust, etc.

The inventors of the present disclosure found that inclusion of the booster as set forth herein and bounding the relationships defined by the TPAR and CBR can result in a gas turbine engine maintaining or even improving upon a desired propulsive efficiency, while also taking into account the gas turbine engine's packaging concerns and weight concerns, and also providing desired thermal management and/or thrust capabilities.

Moreover, the inventors discovered, unexpectedly, in the course of designing the gas turbine engine having the booster with the booster cowl separating the upstream portion of the fan duct into the upper fan duct having the upper fan duct inlet and the lower fan duct having the lower fan duct inlet, that an operability of the core and efficiency of the fan duct operations can be improved through the design of upper fan duct inlet, the lower fan duct inlet, and a core inlet. In particular, the inventors discovered during the course of designing several gas turbine engines having such a booster and booster cowl (including the configurations illustrated and described in detail herein), a relationship exists among the TPAR, an airflow through the lower fan duct inlet, $A_{3S\_Lower}$, and an airflow through the core, $A_C$, of the gas turbine engine while the engine is operated at the rated speed during standard day operating conditions, such that including a booter and booster cowl in accordance with one or more of the exemplary aspects described herein results in a net benefit to the overall engine design.

With a goal of arriving at an improved gas turbine engine capable of providing an improved operability of the core and efficiency of the fan duct operations, the inventors proceeded in the manner of designing gas turbine engines having a booster with various TPAR, $A_{3S\_Lower}$, and $A_C$; checking an operability and efficiency of the fan duct operations of the designed gas turbine engines; redesigning the gas turbine engines to vary the noted parameters based on the impact on other aspects of the gas turbine engines; and rechecking the operability and efficiency of the fan duct operations of the redesigned gas turbine engines; etc., which are described below in greater detail.

As will be appreciated from the embodiments of FIGS. 11 through 27, various embodiments can include a booster to further control flow in the fan duct and the core duct. A typical multi-stage booster may provide an excessive pressure ratio for lower thrust requirements. Space constraints within the envelope of the engine further limit operation of such a multi-stage booster.

For high bypass turbofan configurations, a single stage booster (sometimes referred to as a "quarter-stage booster") may be useful for these lower thrust requirements. In particular, a single row booster stage with a portion of air bypassing the core and exiting into the fan stream allows the use of a high pressure core at different thrust class levels.

This single stage booster allows the flow to self-correct at different engine operating conditions, reducing or eliminating the need for other active operability control systems, such as variable bleed valves. The booster can be integrally attached to a vaned fan frame, reducing the need for additional structure and fitting within the envelope with minimal change to common core hardware.

In particular, air flow in the fan duct may be split by the booster into an outer stream and an inner stream. The outer stream flows into the fan duct as a first fan stream, and the core cowl splits the inner stream into a second fan stream flowing into the fan duct and a core stream flowing into the core duct. Because the booster can control the amount of air of the second fan stream and the core stream, the booster controls the amount of air flowing in the fan duct and flowing in the core duct. Because the TPAR and the CBR depend on the relative amounts of the air flowing in the fan duct and into the core duct, the booster can play a role in adjusting these ratios.

Figure 11:
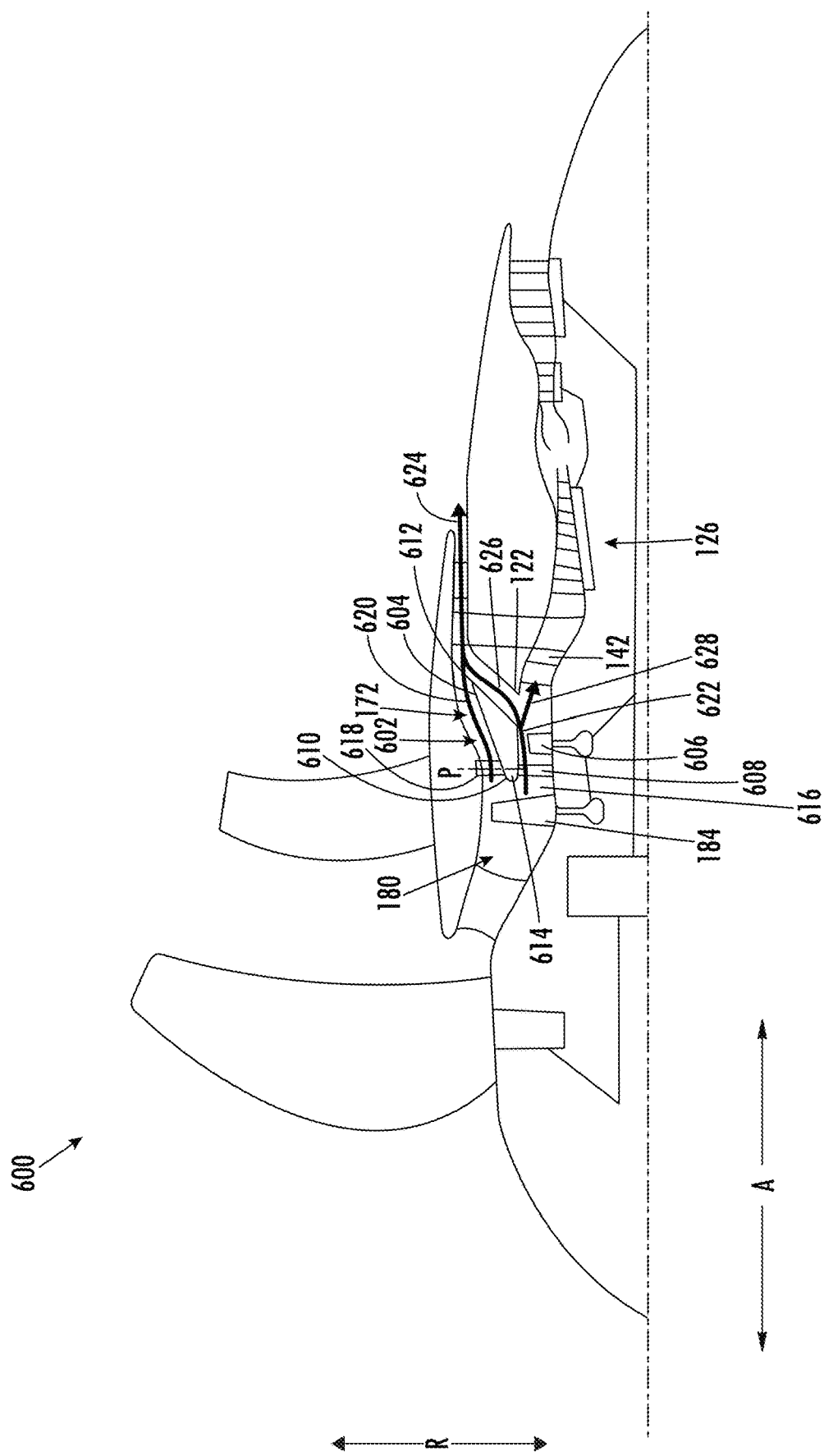
FIG. 11 is a schematic, cross-sectional view of a gas turbine engine with a booster.

Now referring to FIG. 11, a cross-sectional view of a gas turbine engine 600 is shown. As described above, the gas turbine engine 600 includes an inlet duct 180, a fan duct 172, and a core duct 142. The inlet duct 180 houses a ducted fan 184 that provides a stream of air to the fan duct 172 and the core duct 142. The inlet duct 180 extends in the radial direction R inward from a fan cowl 170. The core duct 142 is directs a portion of the stream to a compressor, such as the LP compressor 126 described above; the portion intended for the core duct 142 is a "core stream." The remaining portion of the stream flows into the fan duct 172, and this portion is a "fan stream."

The gas turbine engine 600 includes a booster 602 disposed in the inlet duct 180 and the fan duct 172. The booster 602 includes a booster cowl 604, a booster rotor blade 606, and an inlet guide vane 608. The booster cowl 604 supports the other components of the booster 602. Specifically, the booster cowl 604 is integrally attached to the fan cowl 170, a core cowl 122, or both, with a suitable attachment such as a strut. The booster cowl 604 extends from leading edge 610 to a trailing edge 612, and the booster cowl 604 may include a flow splitter 614 at the leading edge 610. The leading edge 610 of the booster cowl 604 is disposed in the inlet duct 180 upstream of the core cowl 122, and the trailing edge 612 of the booster cowl 604 is disposed the fan duct 172.

The booster rotor blade 606 is disposed upstream of the core cowl 122 and inward in the radial direction R from the booster cowl 604. More specifically, the booster cowl 604 defines a booster passage 616, and the booster rotor blade 606 is disposed in the booster passage 616. The booster rotor blade 606 provides additional power to air in the booster passage 616, increasing a temperature, a pressure, or both, of the air. The air is thus "boosted" by the booster rotor blade 606.

The inlet guide vane 608 is disposed in the booster passage 616 upstream of the booster rotor blade 606 and the core cowl 122 and downstream of the leading edge 610 of the booster cowl 604. Specifically, the inlet guide vane 608 extends inward in the radial direction R from the booster cowl 604. The inlet guide vane 608 directs air to the booster rotor blade 606. As described above with respect to the inlet guide vanes 186, the inlet guide vane 608 may be rotatable about a pitch axis P to a specified pitch angle, i.e., an angle defined between the longitudinal axis 112 and a chord extending from a leading edge of the inlet guide vane 608 to a trailing edge of the inlet guide vane 608. That is, the booster 602 may include an actuator 618 supported by the fan cowl 170 that is configured to rotate the inlet guide vane 608 to the specified pitch angle. Alternatively, the inlet guide vane 608 may be fixed to a specified pitch angle.

During operation, the booster 602 is configured to separate the stream of air between an outer stream 620 and an inner stream 622. Specifically, the flow splitter 614 at the leading edge 610 of the booster cowl 604 separates the stream such that the outer stream 620 flows outward of the booster cowl 604 in the radial direction R and the inner stream 622 flows inward of the booster cowl 604 in the radial direction R. The outer stream 620 flows into a fan duct inlet 176, and the outer stream 620 may become a first fan stream 624.

The inner stream 622 flows in the booster passage 616, boosted by the booster rotor blade 606, toward a core inlet 124 of the core duct 142. The core cowl 122 is arranged to separate the inner stream 622 into a second fan stream 626 flowing into the fan duct inlet 176 and the core stream 628 flowing into the core inlet 124. Specifically, the core cowl 122 may include a core flow splitter 630 that is arranged to separate the inner stream 622 into the second fan stream 626 and the core stream 628. As described above, the core stream 628 flows through the core duct 142 to a compressor, such as the LP compressor 126.

The first fan stream 624 and the second fan stream 626 may merge at a merging zone 632 downstream of the booster in the fan duct 172 to form a unified fan stream 634. Because the second fan stream 626 has a higher temperature, air pressure, or both than the first fan stream 624, merging the first fan stream 624 and the second fan stream 626 provides the unified fan stream 634 with more power than an unboosted stream while maintaining substantially uniform properties for the unified fan stream 634.

Figure 12:
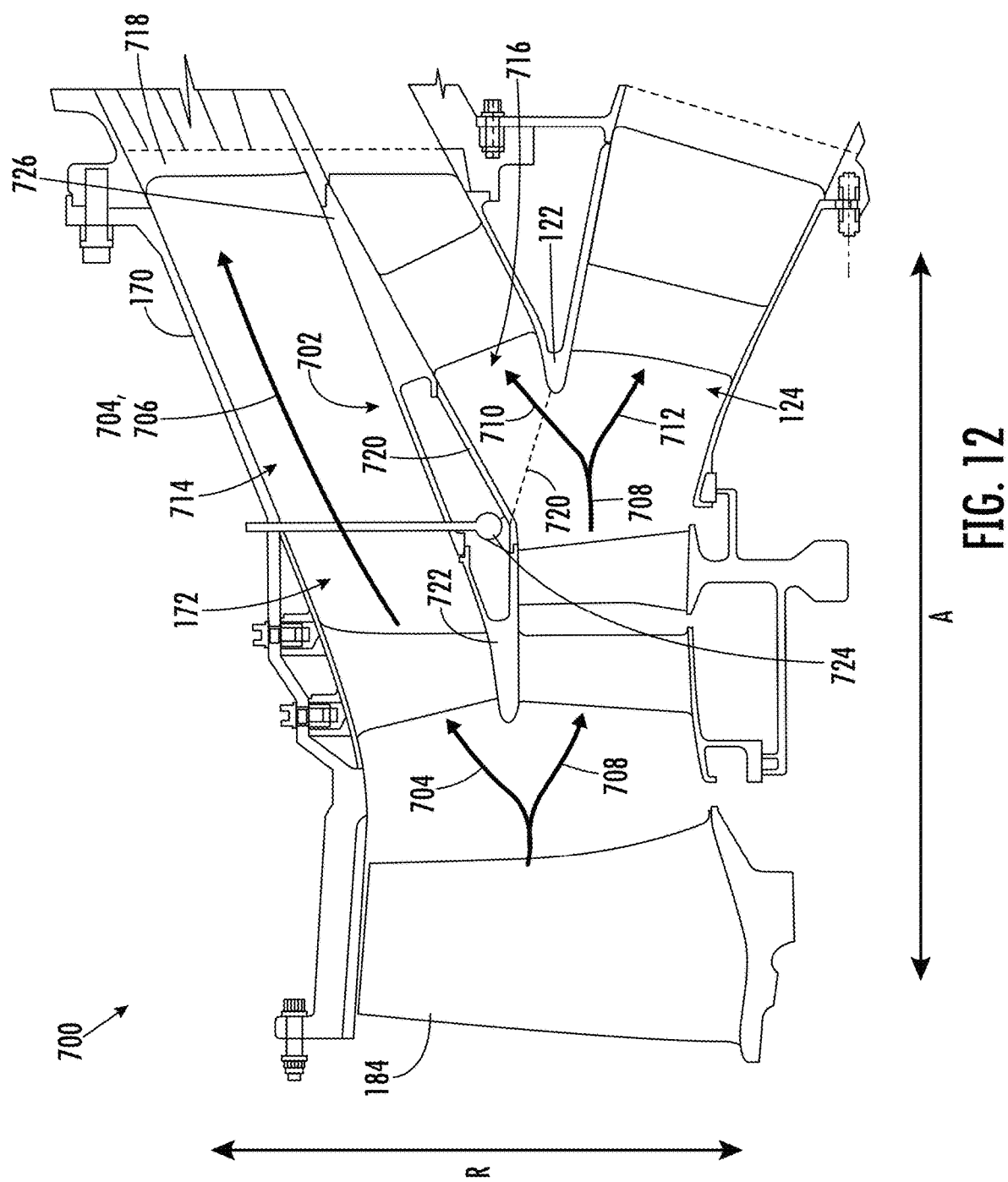
FIG. 12 is a schematic, cross-sectional view of a gas turbine engine with a booster and a flow blocker.

Now referring to FIG. 12, a cross-sectional view of a gas turbine engine 700 with a booster 702 is shown. As described above, the booster 702 separates a stream of air between an outer stream 704 (that becomes a first fan stream 706) and an inner stream 708, and the inner stream 708 is separated by a core cowl 122 between a second fan stream 710 and a core stream 712. The fan duct inlet 176 of the fan duct 172 may include an upper fan duct 714 through which the first fan stream 706 flows and a lower fan duct 716 through which the second fan stream 710 flows. The booster 702 may extend to a wall 718 in the fan duct 172 to separate the upper fan duct 714 from the lower fan duct 716, reducing or inhibiting merging of the first fan stream 706 and the second fan stream 710.

Alternatively, not shown in FIG. 12, the booster 702 may end prior to reaching the wall 718. In such a form, the fan duct 172 may include a merging zone in which the first fan stream 706 merges with the second fan stream 710.

In certain operations, the second fan stream 710 may be unnecessary, and the entire inner stream 708 should flow into the core inlet 124 as the core stream 712. To redirect the inner stream 708 entirely into the core inlet 124, the gas turbine engine 700 may include a flow blocker 720 that blocks at least a portion of the second fan stream 710, directing the air into the core inlet 124. The flow blocker 720 is movable from an open position that allows the second fan stream 710 to enter the fan duct 172 at the lower fan duct 716 and a closed position that blocks the lower fan duct 716. In FIG. 12, the flow blocker 720 in the open position is shown in a solid outline and the flow blocker 720 in the closed position is shown in a dashed outline. The flow blocker 720 extends from a booster cowl 722 of the booster 702 across the lower fan duct 716 to the core cowl 122 in the closed position. More specifically, the flow blocker 720 is a door hingedly supported by the booster cowl 722 that rotates to the core cowl 122. The flow blocker 720 may include a plurality of overlapping panels forming an annular door that extends across the lower fan duct 716.

An actuator 724 rotates the flow blocker 720 between the open position and the closed position. The actuator 724 may be supported by a fan cowl 170 and may extend inward in the radial direction R to the flow blocker 720. The actuator 724 may be any suitable type, such as a cam actuator.

Figure 13:
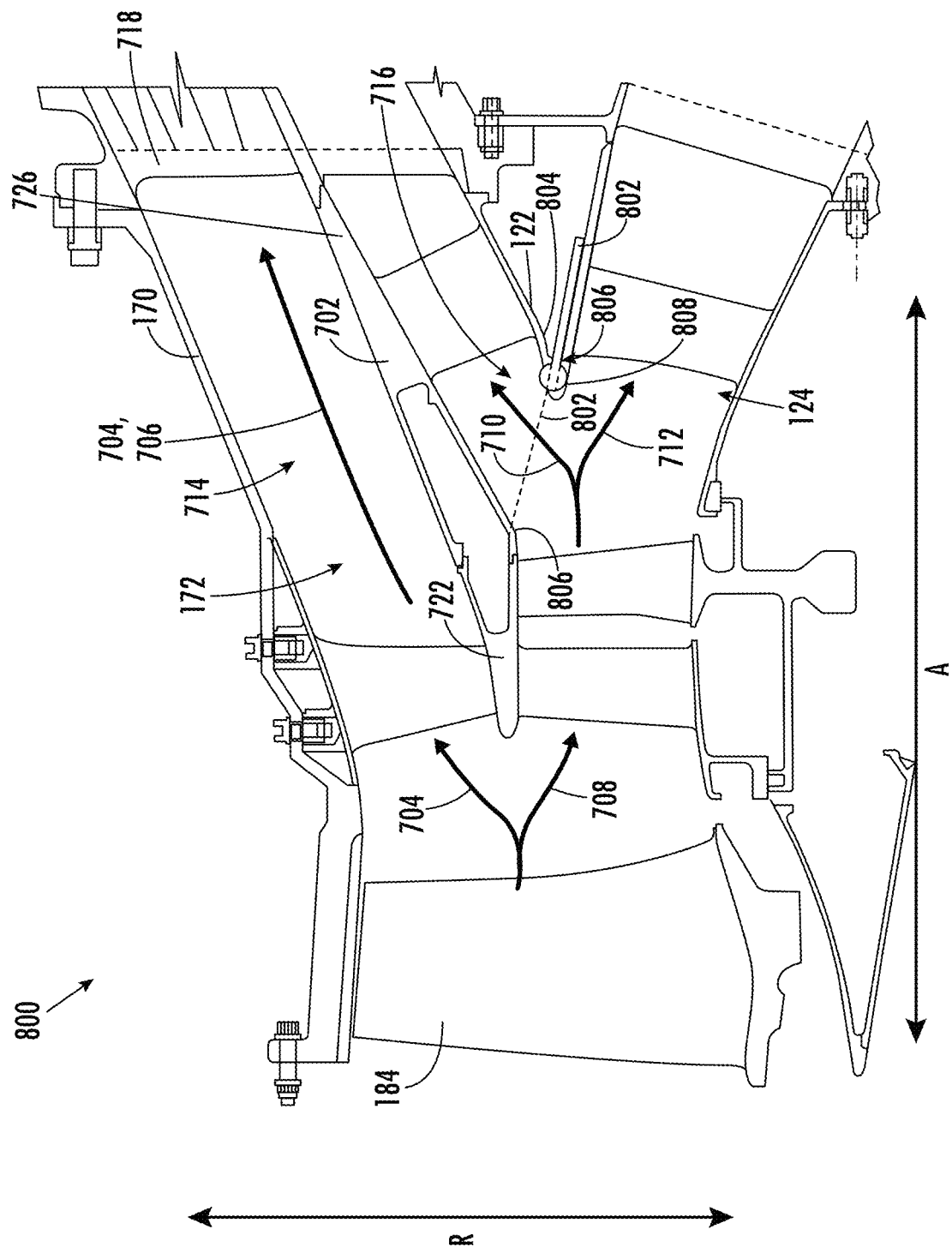
FIG. 13 is a schematic, cross-sectional view of a gas turbine engine with a booster and another flow blocker.

With reference to FIG. 13, a cross-sectional view of a gas turbine engine 800 with another flow blocker 802 is shown. It will be appreciated that components in FIG. 13 that are similar in structure or function to those of FIG. 12 will share a same numeral.

The flow blocker 802 of FIG. 13 is a door that is slidably supported by the core cowl 122. That is, the core cowl 122 defines a slot 804, and the flow blocker 802 is slidable out of the slot 804 to the booster cowl 722, blocking the lower fan duct 716. When the door is in the open position, shown in a solid outline, the flow blocker 802 is entirely within the core cowl 122 such that a forward end 806 of the door is disposed in the slot 804. An actuator 808, supported by the core cowl 122, slides the flow blocker 802 out of the slot 804 to the closed position, shown in a dashed outline, to block the second fan stream 710. The door may include a plurality of overlapping panels forming an annular door that extends across the lower fan duct 716.

Alternatively, not shown in the FIGS., the flow blocker 802 may be slidably supported by the booster cowl 722. An actuator (not shown) supported by the booster cowl 722 may extend the flow blocker 802 across the lower fan duct 716 to block the second fan stream 710.

Figure 14:
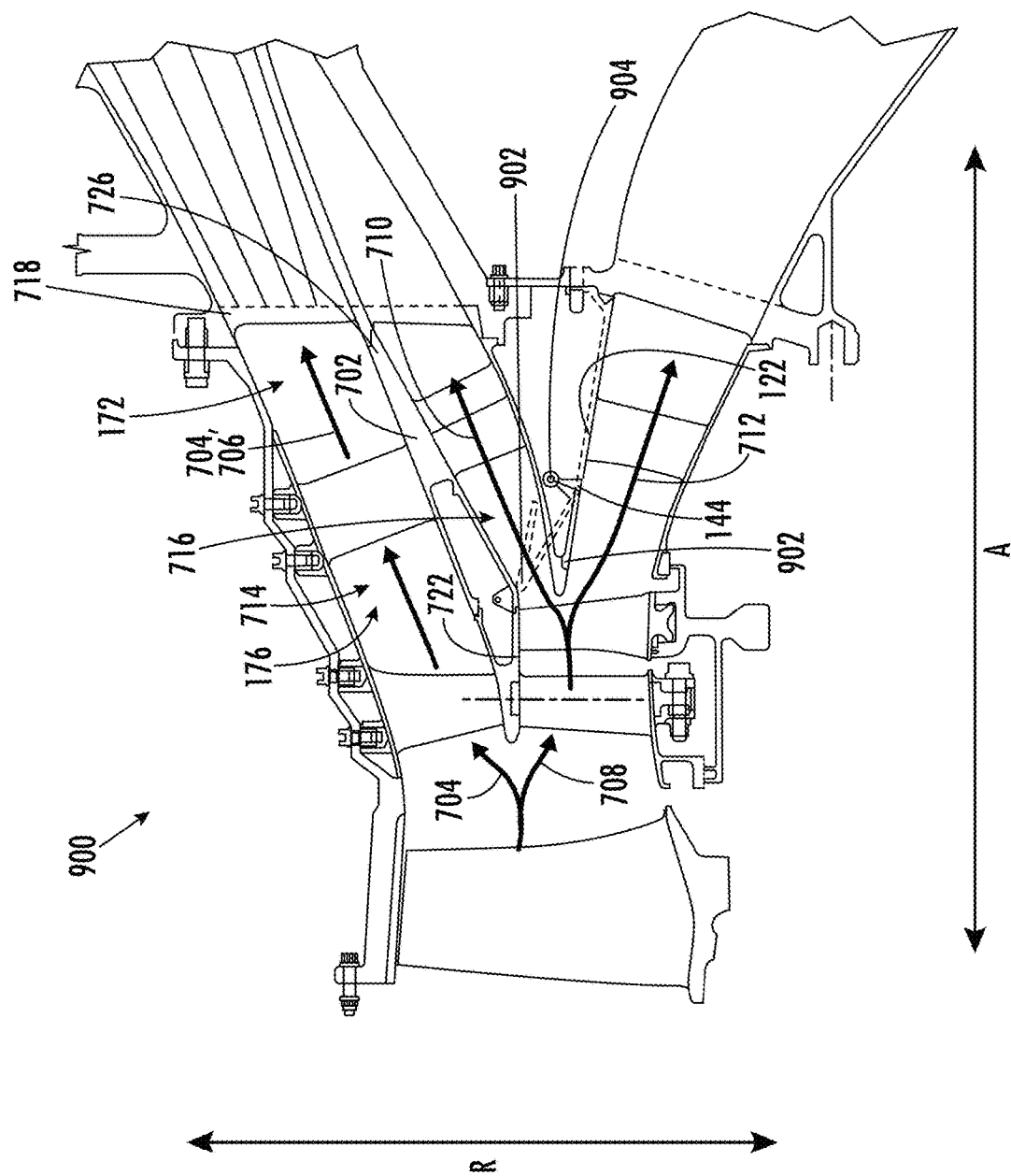
FIG. 14 is a schematic, cross-sectional view of a gas turbine engine with a booster and another flow blocker.

Now referring to FIG. 14, a cross-sectional view of a gas turbine engine 900 with a flow blocker 902 is shown. It will be appreciated that components in FIG. 14 that are similar in structure or function to those of FIGS. 12-13 will share a same numeral.

The flow blocker 902 is a core flow splitter disposed at a leading edge 144 of the core cowl 122. When the flow blocker 902 is in the open position, shown in a solid outline, the second fan stream 710 flows through the lower fan duct 716 into the fan duct 172. When the flow blocker 902 is in the closed position, the flow blocker 902 extends across the lower fan duct 716 from the leading edge 144 to a booster cowl 722 of a booster 702, closing the lower fan duct 716 and blocking the second fan stream 710. More specifically, the flow blocker 902 is rotatable such that a forward end of the flow blocker 902 contacts the booster cowl 722, closing the lower fan duct 716 of the fan duct inlet 176. An actuator 904, supported by the core cowl 122, may rotate the flow blocker 902 between the open position and the closed position.

Still referring to FIGS. 12-14, the booster cowl 722 includes an extension 726 arranged to maintain separation of the first fan stream 706 from the second fan stream 710 in the fan duct 172. In such a form, the first fan stream 706 and the second fan stream 710 remain separated through the fan duct 172, and the second fan stream 710 acts as a fourth stream for the gas turbine engine 700, 800, 900. To maintain the separation, the fan duct 172 includes the wall 718 disposed downstream from the fan duct inlet 176 and extending in the radial direction R through the fan duct 172. The extension 726 of the booster cowl 722 extends to the wall 718 to maintain the separation of the first fan stream 706 and the second fan stream 710 in the fan duct 172. Because the second fan stream 710 is boosted and the first fan stream 706 is unboosted, maintaining separation of the first fan stream 706 and the second fan stream 710 allows for specific use of either the unboosted first fan stream 706 or the boosted second fan stream 710 for operation downstream of the booster 702. That is, in certain operating conditions, the higher pressure, temperature, or both of the boosted second fan stream 710 may be useful for specific operations, and the lower pressure, temperature, or both of the unboosted first fan stream 706 may be useful for other operations.

Figure 15A:
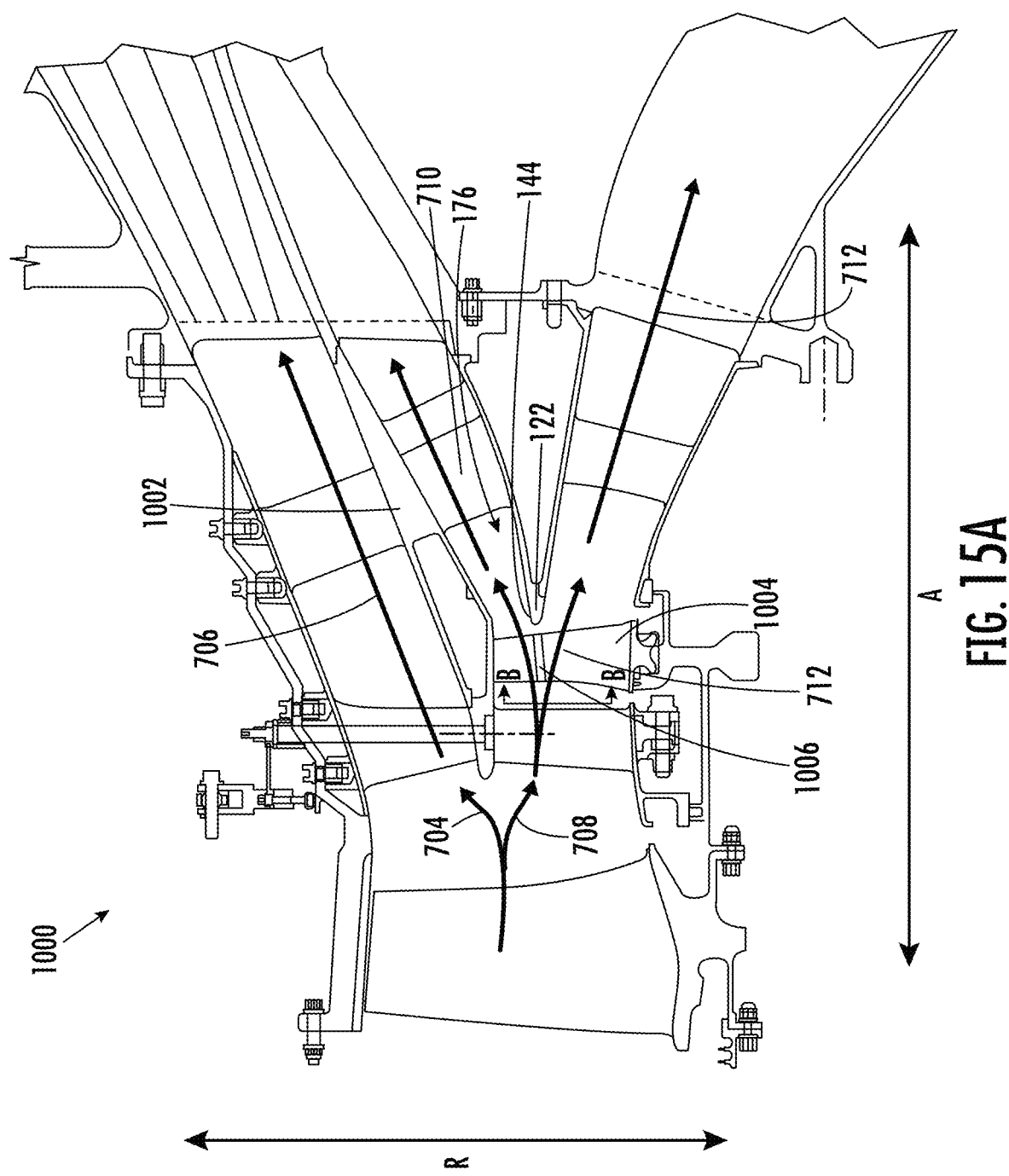
FIGS. 15A through 15C are schematic, cross-sectional views of a gas turbine engine with a booster defining a fourth stream.
Figure 15B:
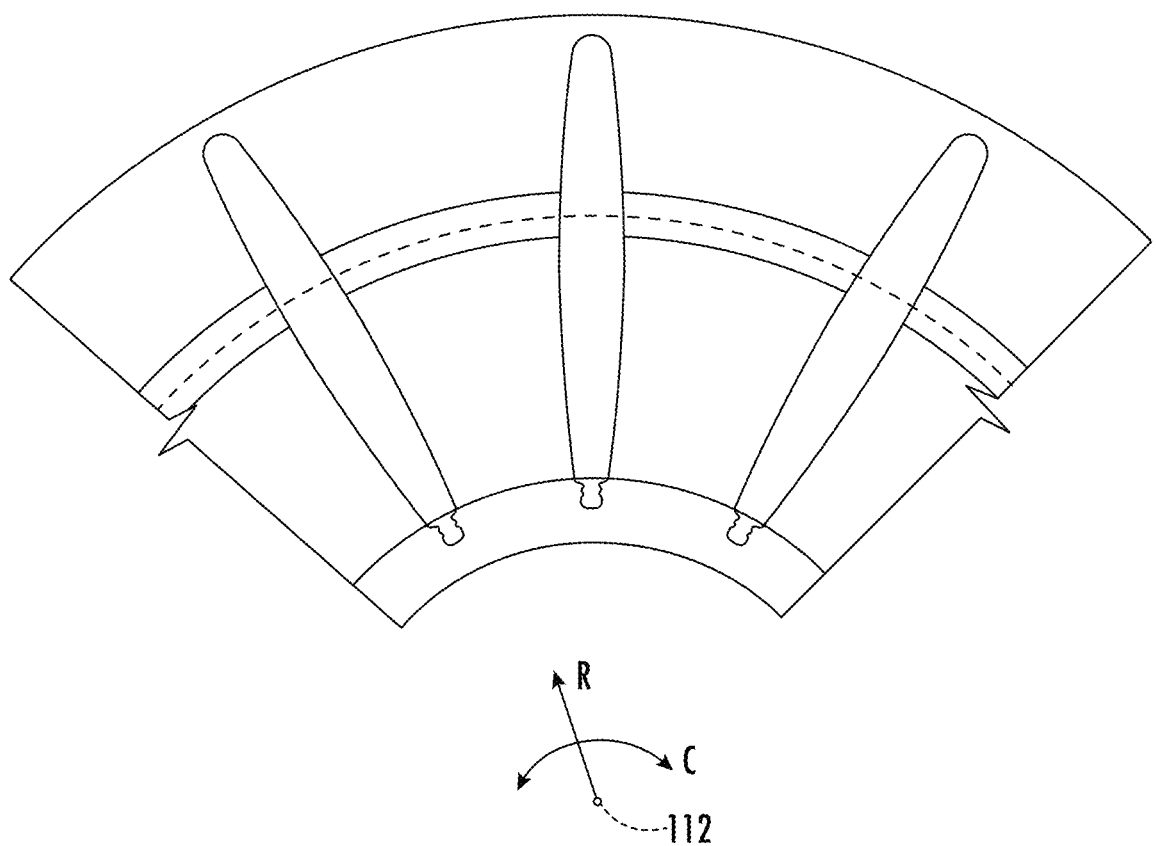
Figure 15C:
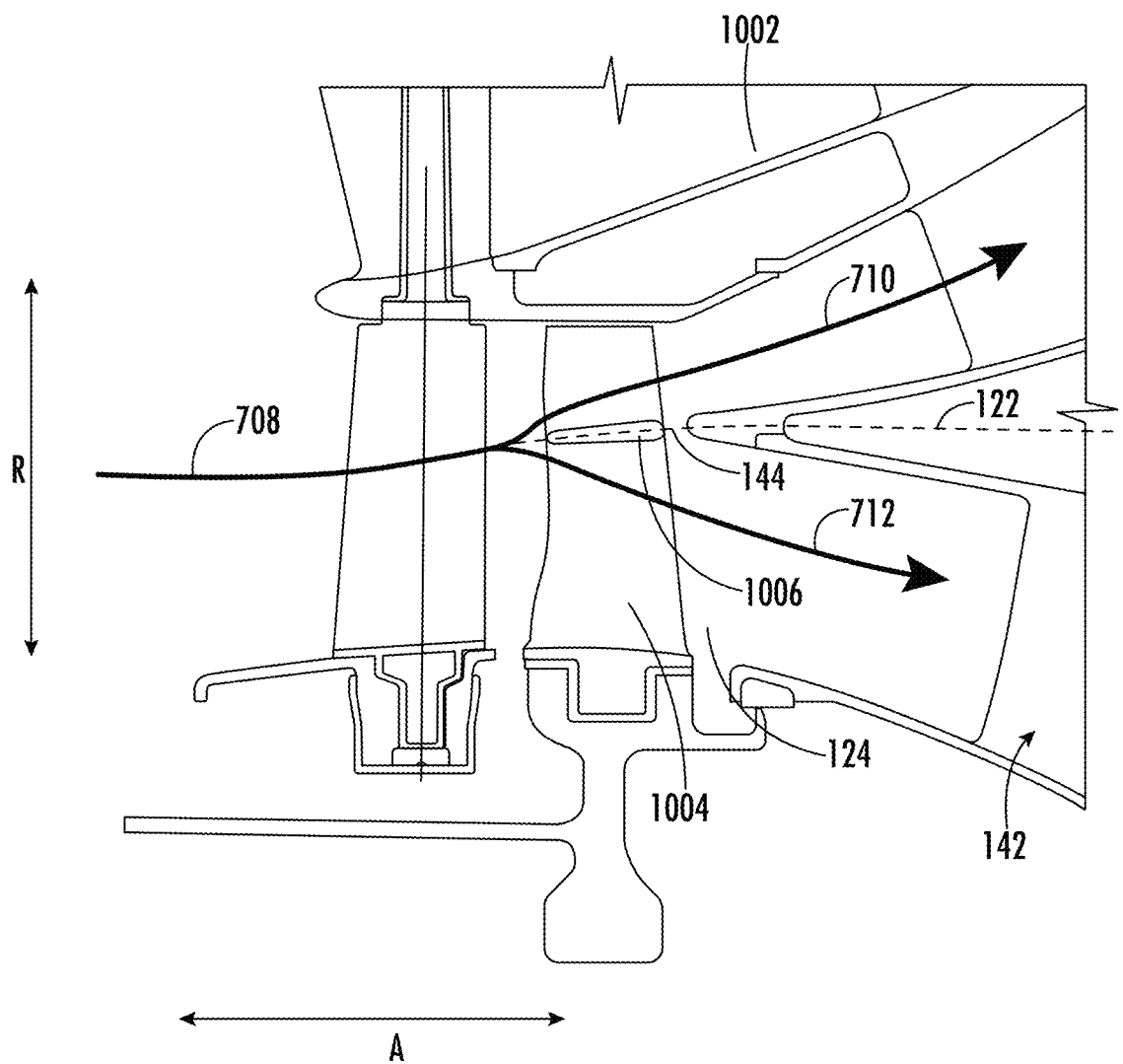

Referring to FIGS. 15A-15C, a cross-sectional view of a gas turbine engine 1000 is shown. FIG. 15A is a side cross-sectional view of the gas turbine engine 1000. FIG. 15B is a cross-sectional view along the line B-B in FIG. 15A. FIG. 15C is a magnified view of a booster of the gas turbine engine 1000.

As with FIGS. 12-14, a booster 1002 separates a stream of air into an outer stream 704 (which becomes a first fan stream 706) and an inner stream 708, and the inner stream 708 is separated into a second fan stream 710 and a core stream 712.

To separate the inner stream 708 into the second fan stream 710 and the core stream 712, a booster rotor blade 1004 of the booster 1002 includes a midspan shroud 1006. In this context, a "midspan" shroud 1006 is a shroud that is coupled to the booster rotor blade 1004 at a location greater than or equal to 20% of a span of the booster rotor blade 1004 and less than or equal to 80% of the span.

The midspan shroud 1006 is a shroud arranged substantially at a same position in the radial direction R as a leading edge 144 of the core cowl 122 to separate the inner stream 708 into the second fan stream 710 and the core stream 712. Because the midspan shroud 1006 and the leading edge 144 of the core cowl 122 are at the same radial position, the second fan stream 710 flows outward of the midspan shroud 1006 and the core cowl 122 into the fan duct inlet 176, and the core stream 712 flows inward of the midspan shroud 1006 and the core cowl 122 into a core inlet 124. The midspan shroud 1006 thus provides the second fan stream 710 as the fourth stream of the gas turbine engine 1000.

As shown in FIG. 15B, the midspan shrouds 1006 of adjacent booster rotor blades 1004 abut each other to form a substantially continuous shroud in the circumferential direction C. By forming the substantially continuous shroud, the inner stream 708 is separated continuously when flowing toward the core duct 142.

When the core cowl 122 includes the core flow splitter (FIG. 14), the core flow splitter is arranged to maintain separation of the second fan stream 710 and the core stream 712 downstream of the midspan shroud 1006 when the core flow splitter is in the open position. Specifically, as shown in FIG. 15C, the core flow splitter is at substantially a same position in the radial direction R as the midspan shroud 1006 to assist in providing the second fan stream 710 as the fourth stream for the gas turbine engine 1000. For example, the core cowl defines a leading edge having a leading edge radius, and the midspan shroud includes a trailing edge defining a trailing edge radius that may be within 10% of the leading edge radius of the leading edge of the core cowl.

Figure 16:
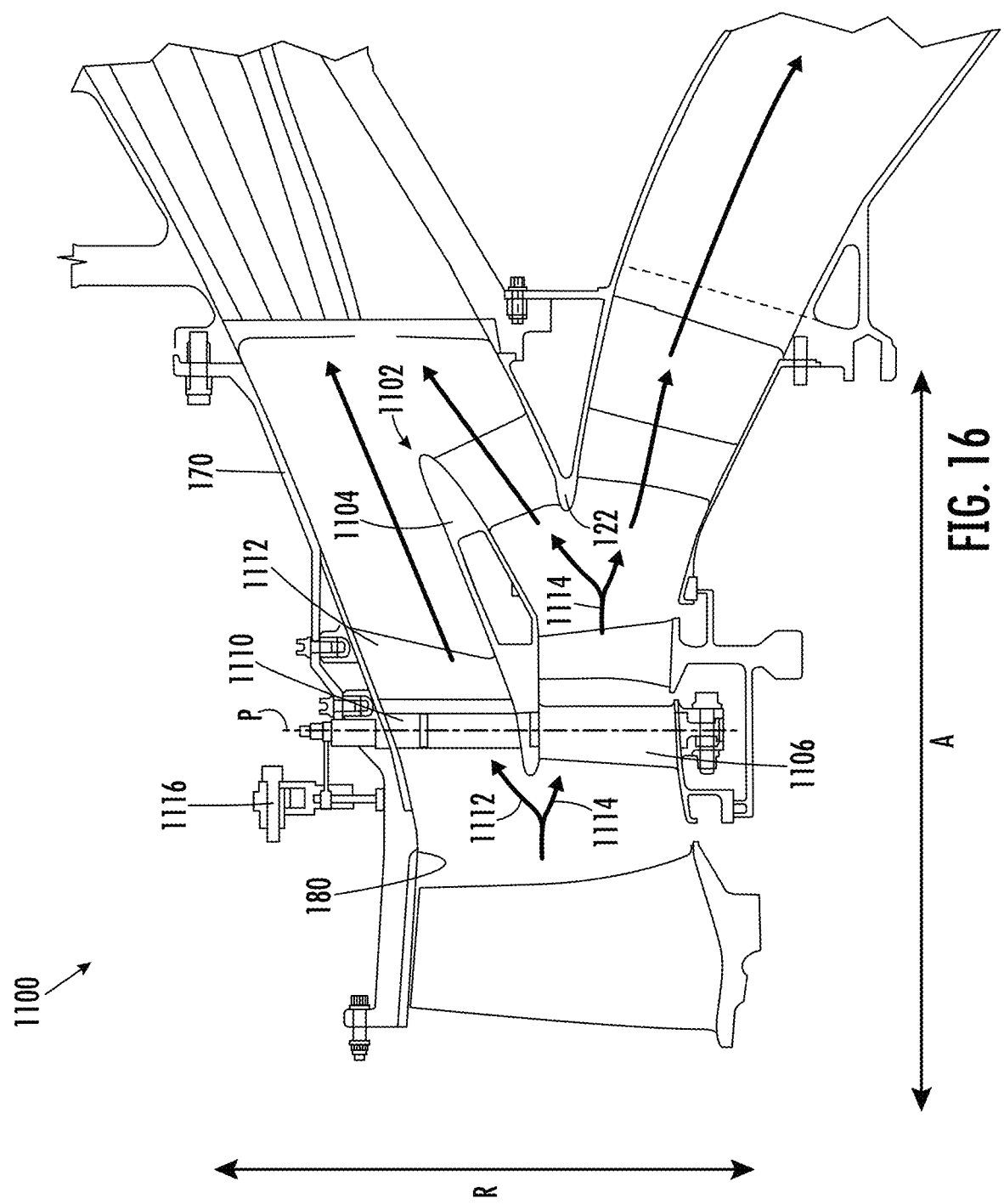
FIG. 16 is a schematic, cross-sectional view of a gas turbine engine with a booster including a stem separated from a strut.

Now referring to FIG. 16, a cross-sectional view of a gas turbine engine 1100 is shown. A booster 1102 includes a booster cowl 1104, an inlet guide vane 1106, a stem 1108, and a strut 1110. The booster 1102 separates a stream of air between an outer stream 1112 and an inner stream 1114, and the inlet guide vane 1106 guides the inner stream 1114 to a core cowl 122. The strut 1110 secures the booster cowl 1104 to a structure in an engine inlet 182, such as a fan cowl 170. The stem 1108 extends through the booster cowl 1104 to the fan cowl 170.

The stem 1108 is rotatable about a pitch axis P, and the inlet guide 1106 is rotatably fixed to the stem 1108 such that rotation of the stem 1108 rotates the inlet guide vane 1106. More specifically, the gas turbine engine 1100 further includes an actuator 1116 disposed in the fan cowl 170 that is configured to rotate the stem 1108, which rotates the inlet guide vane 1106 to a specified pitch angle. In FIG. 16, the stem 1108 is spaced upstream from the strut 1110 such that the strut 1110 and the stem 1108 are separate components.

Figure 17:
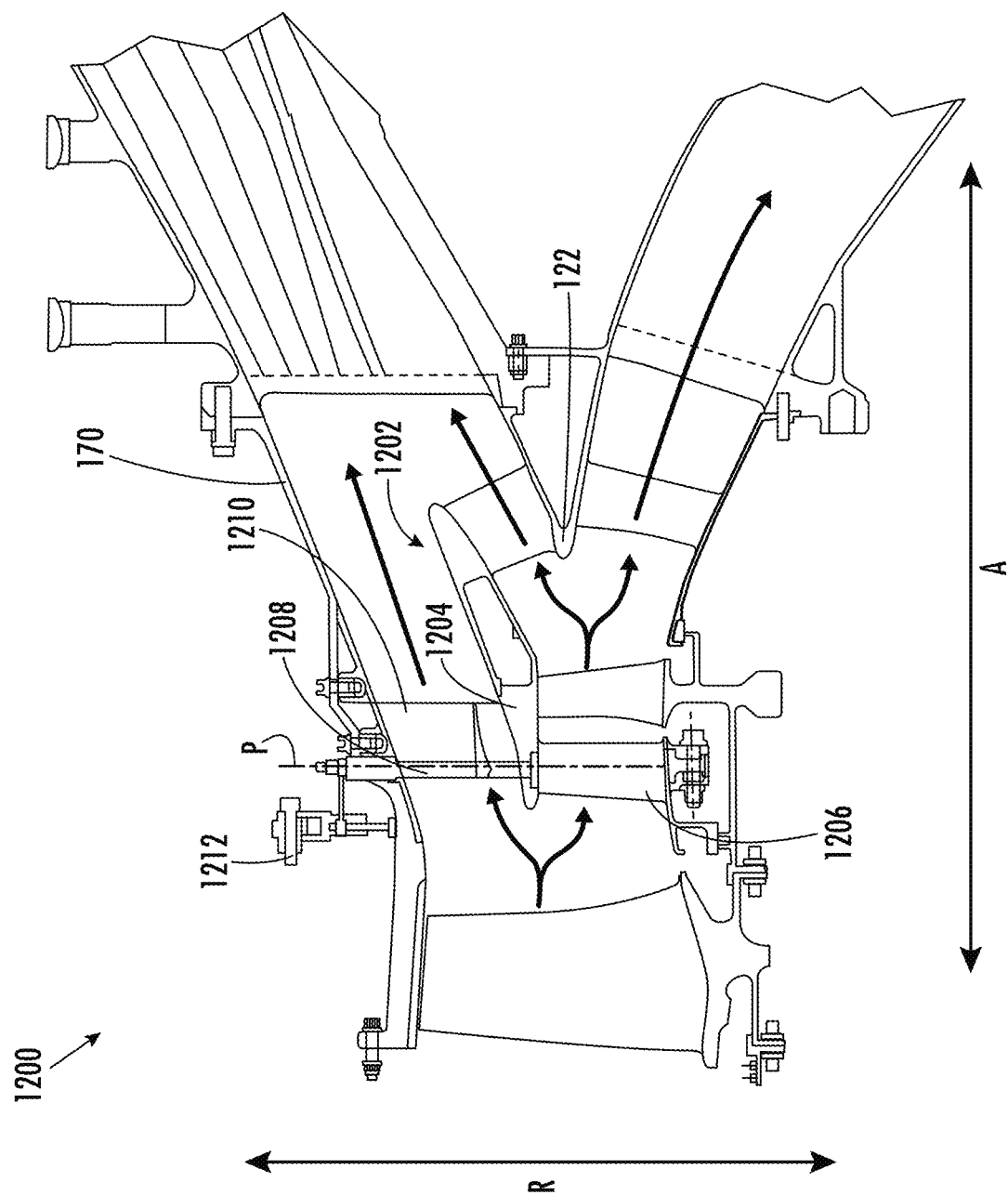
FIG. 17 is a schematic, cross-sectional view of a gas turbine engine with a booster including a stem integrated with a strut.

Now referring to FIG. 17, a cross-sectional view of a gas turbine engine 1200 is shown. The gas turbine engine 1200 includes a booster 1202 including a booster cowl 1204, an inlet guide vane 1206, a stem 1208, and a strut 1210.

In FIG. 17, the stem 1208 is integral with the strut 1210, i.e., a unitary construction. The strut 1210 fixes the booster cowl 1204 to the fan cowl 170, and the stem 1208 is rotatable about a pitch axis P. As with the stem 1108 of FIG. 16, an actuator 1212 disposed in a fan cowl 170 rotates the stem 1208, and the stem 1208 rotates the inlet guide vane 1206 to a specified pitch angle.

Figure 18:
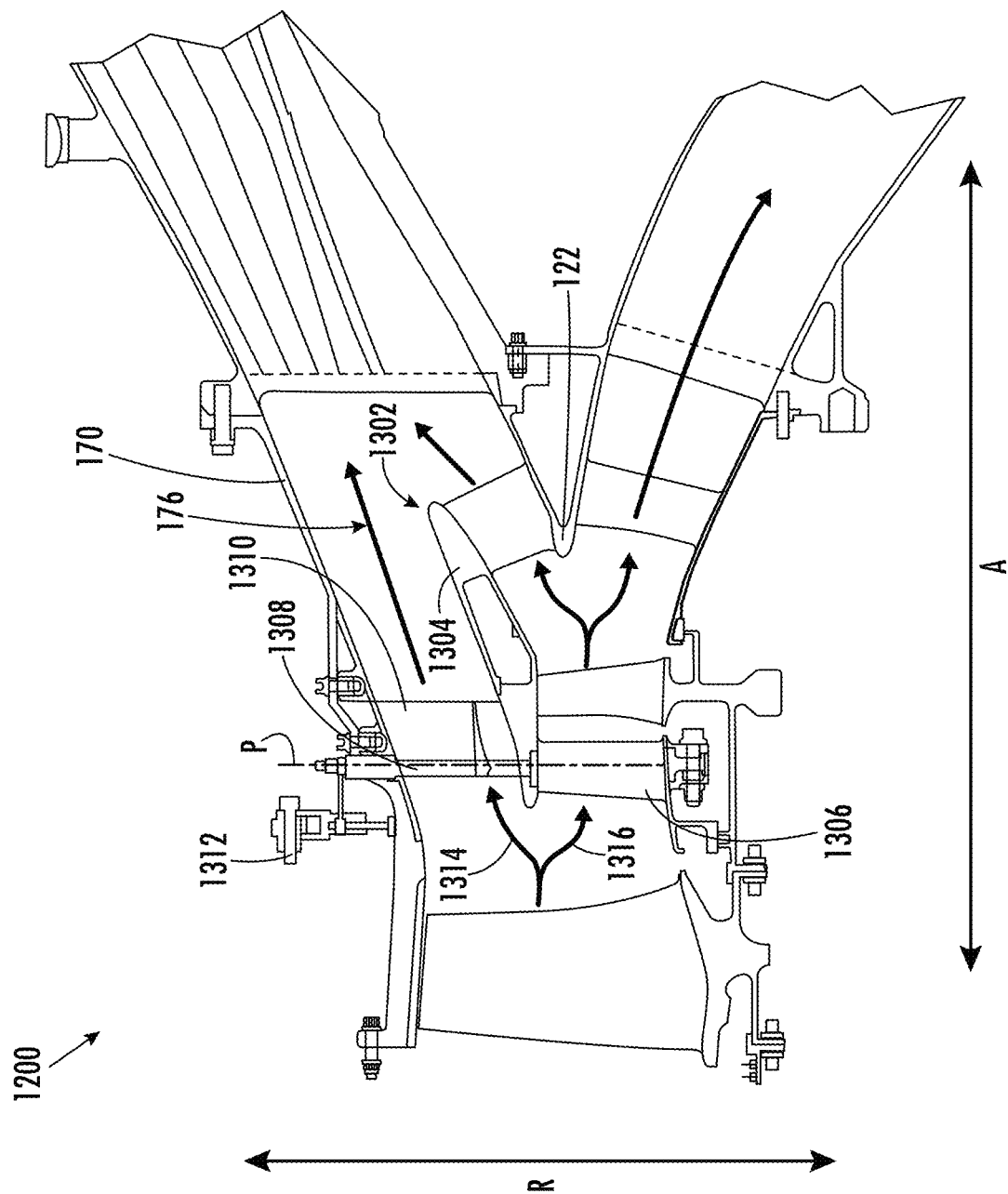
FIG. 18 is a schematic, cross-sectional view of a gas turbine engine with a booster including a stem enclosed within a strut.

Now referring to FIG. 18, a cross-sectional view of a gas turbine engine 1300 is shown. The gas turbine engine 1300 includes a booster 1302 including a booster cowl 1304, an inlet guide vane 1306, a stem 1308, a strut 1310, and an actuator 1312.

In FIG. 18, the stem 1308 is disposed inside the strut 1310. In such a form, the strut 1310 may be shaped to guide an outer stream 1314 to a fan duct inlet 176 while the inlet guide vane 1306 guides an inner stream 1316 to a core cowl 122. The stem 1308 is rotatable within the strut 1310 about a pitch axis P. As with the stems 1108, 1208 of FIGS. 16-17, the actuator 1312 rotates the stem 1308, and the stem 1308 rotates the inlet guide vane 1306 to a specified pitch angle.

Now referring to FIGS. 19A-19C, a cross-sectional view of a gas turbine engine 1400 is shown. FIG. 19A is a side cross-sectional view of the gas turbine engine 1400. FIG. 19B is a cross-sectional view of an outlet guide vane along the line B-B. FIG. 19C is a cross sectional view of an inlet guide vane along the line C-C.

The gas turbine engine 1400 includes a booster 1402 including a booster cowl 1404, an inlet guide vane 1406, a stem 1408, a strut 1410, an actuator 1412, and an outlet guide vane 1414. The outlet guide vane 1414 and the inlet guide vane 1406 are disposed upstream of the booster 1402.

In FIG. 19A, the outlet guide vane 1414 and the inlet guide vane 1406 are integral and rotatably fixed to the stem 1408. By integrating the outlet guide vane 1414 and the inlet guide vane 1406 together, the stem 1408 rotates both the outlet guide vane 1411 and the inlet guide vane 1406 about a pitch axis P to a same specified pitch angle. The outlet guide vane 1414 extends from a fan cowl 170 through an engine inlet 182, and the inlet guide vane 1406 extends from the booster cowl 1404 such that the outlet guide vane 1414 and the inlet guide vane 1406 extend entirely through the engine inlet 182 in the radial direction R.

The booster 1402 is configured to separate a stream of air into an outer stream 1416 (which becomes a first fan stream 1418) and an inner stream 1420. The outlet guide vane 1414 has a first cross-sectional area 1426 (FIG. 19B) configured to guide the first fan stream 1418, and the inlet guide vane 1406 has a second cross-sectional area 1428 (FIG. 19C) configured to guide the inner stream 1420 to a core cowl 122. The core cowl 122 separates the inner stream 1420 into a second fan stream 1422 and a core stream 1424. In the exemplary embodiment of FIGS. 19A-19C, the first cross-sectional area 1246 differs from the second cross-sectional area 1248, providing specific guiding of the first fan stream 1418 and the inner stream 1420. Alternatively, not shown in the FIGS., the first cross-sectional area may be the same as the second cross-sectional area.

Figure 20:
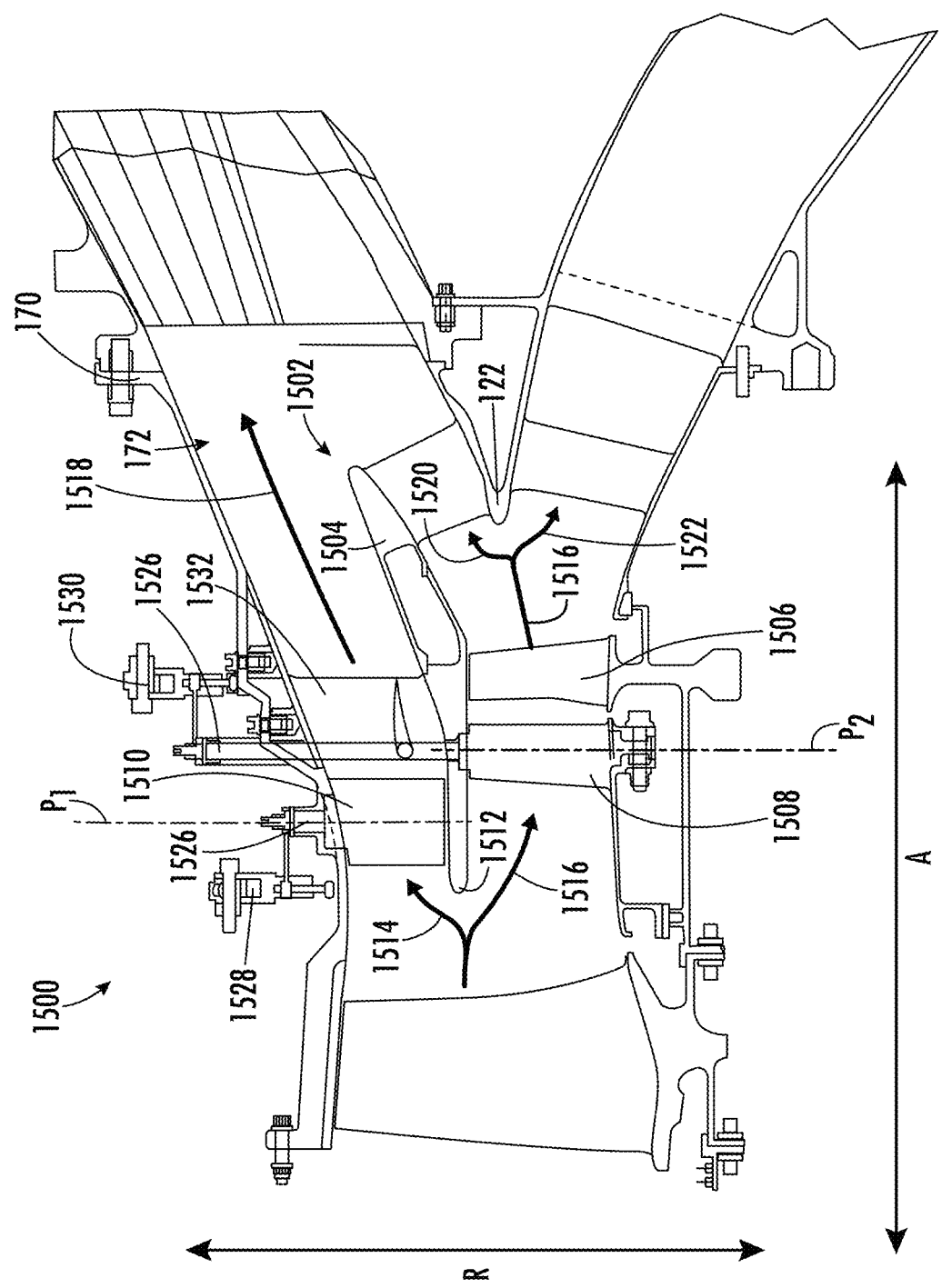
FIG. 20 is a schematic, cross-sectional view of a gas turbine engine with a booster including an outlet guide vane spaced from an inlet guide vane.

Now referring to FIG. 20, a cross-sectional view of a gas turbine engine 1500 including a booster 1502 is shown. The booster 1502 includes a booster cowl 1504, a booster rotor blade 1506, an inlet guide vane 1508 extending inward in a radial direction R from the booster cowl 1504, and an outlet guide vane 1510 extending outward in the radial direction R from the booster cowl 1504. The outlet guide vane 1510 and the inlet guide vane 1508 are both downstream of a leading edge 1512 of the booster cowl 1504. The leading edge 1512 of the booster cowl 1504 is arranged to separate a stream of air into an outer stream 1514 flowing toward the outlet guide vane 1510 and an inner stream 1516 flowing toward the inlet guide vane 1508. As described above, the outer stream 1514 becomes a first fan stream 1518, and the inner stream 1516 separates into a second fan stream 1520 and a core stream 1522 at a core cowl 122. The outlet guide vane 1510 is arranged to direct the first fan stream 1518 to a fan duct 172, and the inlet guide vane 1508 is arranged to direct the inner stream 1516 to the core cowl 122.

The outlet guide vane 1510 and the inlet guide vane 1508 are each rotatable about respective pitch axes to respective pitch angles. More specifically, the booster 1502 includes a first stem 1524 extending through the outlet guide vane 1510 and a second stem 1526 extending through the inlet guide vane 1508. The first stem 1524 extends outward in the radial direction R from the booster cowl 1504, and the second stem 1526 extends through the booster cowl 1504 in the radial direction R. The first stem 1524 and the second stem 1526 are spaced from each other in the axial direction A such that the outlet guide vane 1510 and the inlet guide vane 1508 are at different axial positions. In the exemplary embodiment of FIG. 20, the first stem 1524 is upstream of the second stem 1526. Alternatively, not shown in the FIGS., the first stem 1524 may be downstream of the second stem 1526.

The outlet guide vane 1510 and the inlet guide vane 1508 are rotatable to specified pitch angles. Specifically, a first actuator 1528 disposed in a fan cowl 170 is rotatably coupled to the first stem 1524 to rotate the outlet guide vane 1510, and a second actuator 1530 disposed in the fan cowl 170 is rotatably coupled to the second stem 1526 to rotate the inlet guide vane 1508. The first stem 1524 is rotatable about a first pitch axis $P_1$ to rotate the outlet guide vane 1510 to a first specified pitch angle, and the second stem 1526 is rotatable about a second pitch axis $P_2$ to rotate the inlet guide vane 1508 to a second specified pitch angle. The first specified pitch angle and the second specified pitch angle may differ or may be the same, as specified to guide the inner stream 1516 and the outer stream 1514.

The booster may include a strut 1532, similar to the strut 1210 shown in FIG. 17, that is integral with the second stem 1526. In such a form, the strut 1532 secures the booster cowl 1504 to the fan cowl 170, and the second stem 1526 rotates within the strut 1532. The strut 1532 may have a cross-sectional area that provides further guiding for the first fan stream 1518.

Figure 21:
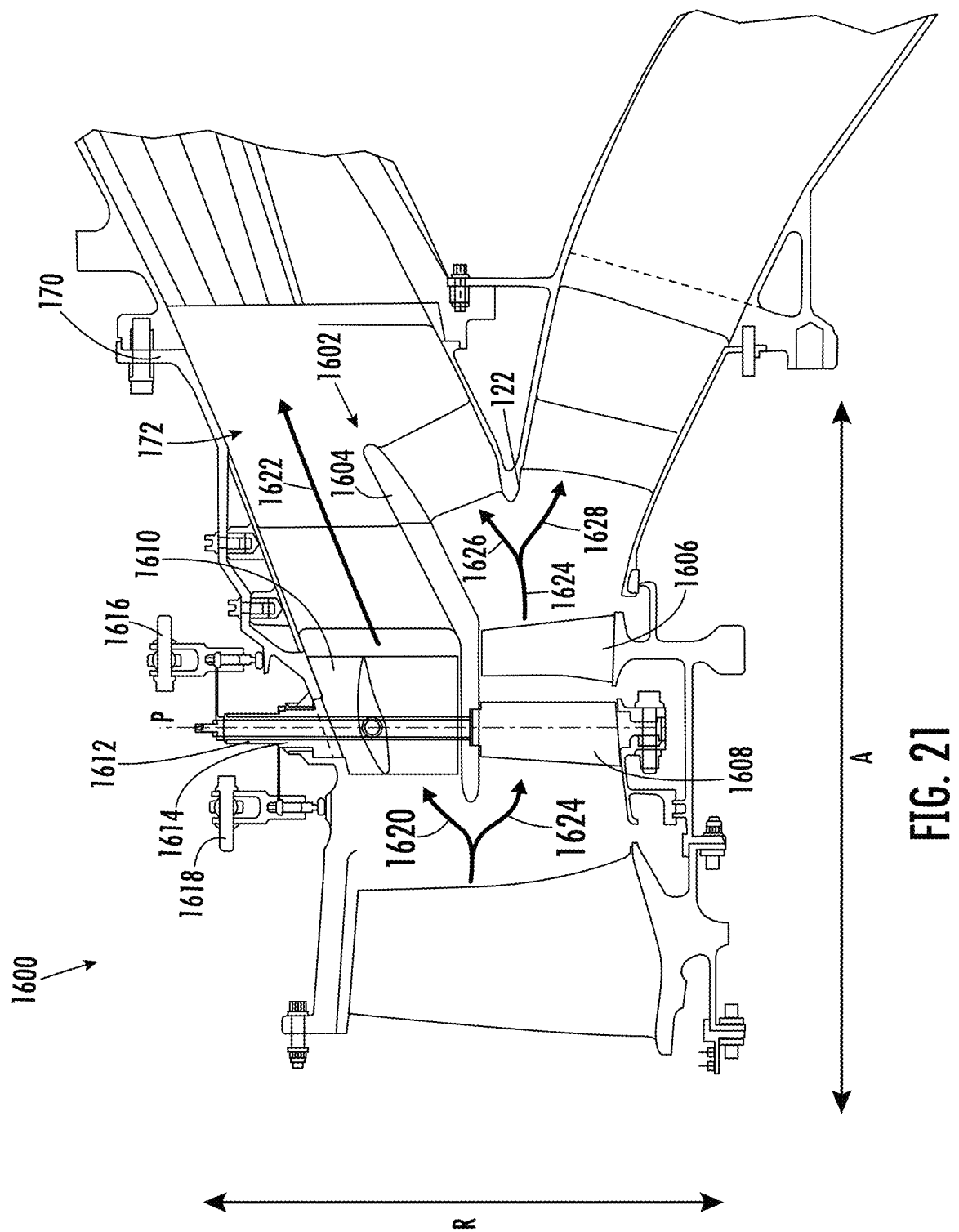
FIG. 21 is a schematic, cross-sectional view of a gas turbine engine with a booster including an outlet guide vane coaxially disposed with an inlet guide vane.

With reference to FIG. 21, a cross-sectional view of a gas turbine engine 1600 is shown. A booster 1602 includes a booster cowl 1604, a booster rotor blade 1606, an inlet guide vane 1608 extending inward in a radial direction R from the booster cowl 1604, and an outlet guide vane 1610 extending outward in the radial direction R from the booster cowl 1604. The booster 1602 includes a first stem 1612 extending through the inlet guide vane 1608 and through the outlet guide vane 1610 and a second stem 1614 disposed around the first stem 1612.

The first stem 1612 is rotatable about a pitch axis P by a first actuator 1616 to rotate the inlet guide vane 1608 to a first pitch angle, and the second stem 1614 is separately rotatable about the pitch axis P by a second actuator 1618 to rotate the outlet guide vane 1610 to respective pitch angles. That is, in FIG. 21, the outlet guide vane 1610 and the inlet guide vane 1608 are coaxial, i.e., having a same position in the axial direction A. As with the inlet guide vane 1508 and the outlet guide vane 1510 of FIG. 20, the outlet guide vane 1510 directs an outer stream 1620 toward a fan duct 172 to become a first fan stream 1622, and the inlet guide vane 1608 directs an inner stream 1624 toward a core cowl 122, which separates the inner stream 1624 into a second fan stream 1626 and a core stream 1628.

Figure 22:
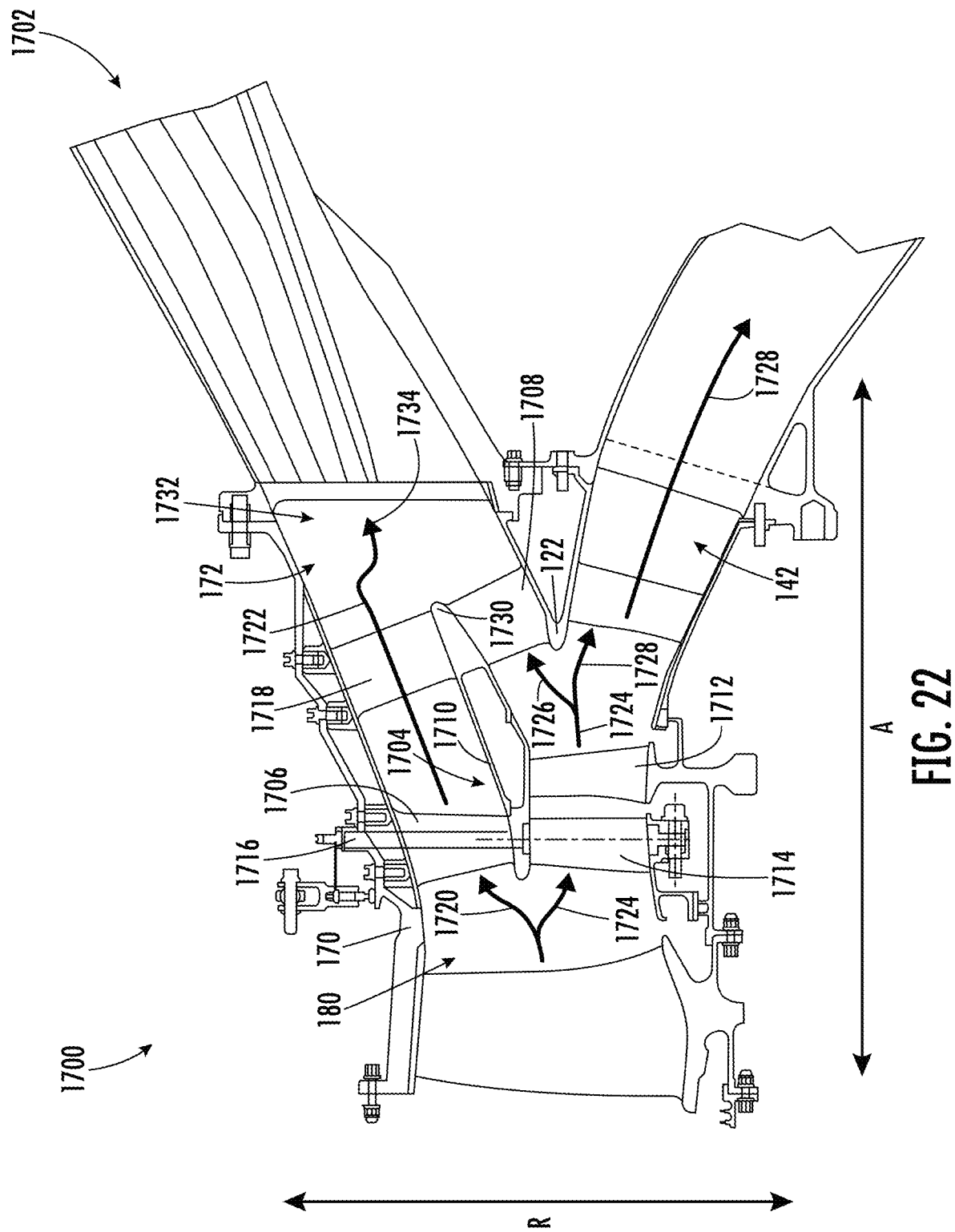
FIG. 22 is a schematic, cross-sectional view of a gas turbine engine with a booster supported by a strut.

Now referring to FIG. 22, a cross-sectional view of a gas turbine engine 1700 is shown. The gas turbine engine includes a heat exchanger 1702 disposed in a fan duct 172, a booster 1704 disposed upstream of the heat exchanger 1702, a strut 1706 securing the booster 1704 to a fan cowl 170, and a second strut 1708 disposed in the fan duct 172 securing the booster 1704 to a core cowl 122. The booster 1704 includes a booster cowl 1710, a booster rotor blade 1712, and an inlet guide vane 1714. As with the strut 1210 of FIG. 17, the strut 1706 may be integral with a stem 1716 that rotates the inlet guide vane 1714 to a specified pitch angle. The gas turbine engine 1700 may include a third strut 1718 that secures the booster 1704 to the fan cowl 170 in the fan duct 172.

As described above, the booster 1704 separates a stream of air in an inlet duct 180 into an outlet stream 1720 flowing toward the fan duct 172 that becomes a first fan stream 1722 and an inner stream 1724 flowing toward a core cowl 122. The inlet guide vane 1714 directs the inner stream 1724 toward the booster rotor blade 1712 and the core cowl 122, which separates the inner stream 1724 into a second fan stream 1726 flowing into the fan duct 172 and a core stream 1728 flowing into a core duct 142.

The first fan stream 1722 and the second fan stream 1726 may merge in the fan duct 172 upstream of the heat exchanger 1702. More specifically, the booster cowl 1710 has a trailing edge 1730 disposed in the fan duct 172 that is upstream of the heat exchanger 1702. The trailing edge 1730 defines a merging zone 1732 with the heat exchanger 1702, and the first fan stream 1722 and the second fan stream 1726 merge into a unified fan stream 1734 in the merging zone 1732. By merging the unboosted first fan stream 1722 and the boosted second fan stream 1726, the unified fan stream 1734 provides uniform heat transfer to or from a working fluid of the heat exchanger 1702.

Figure 23:
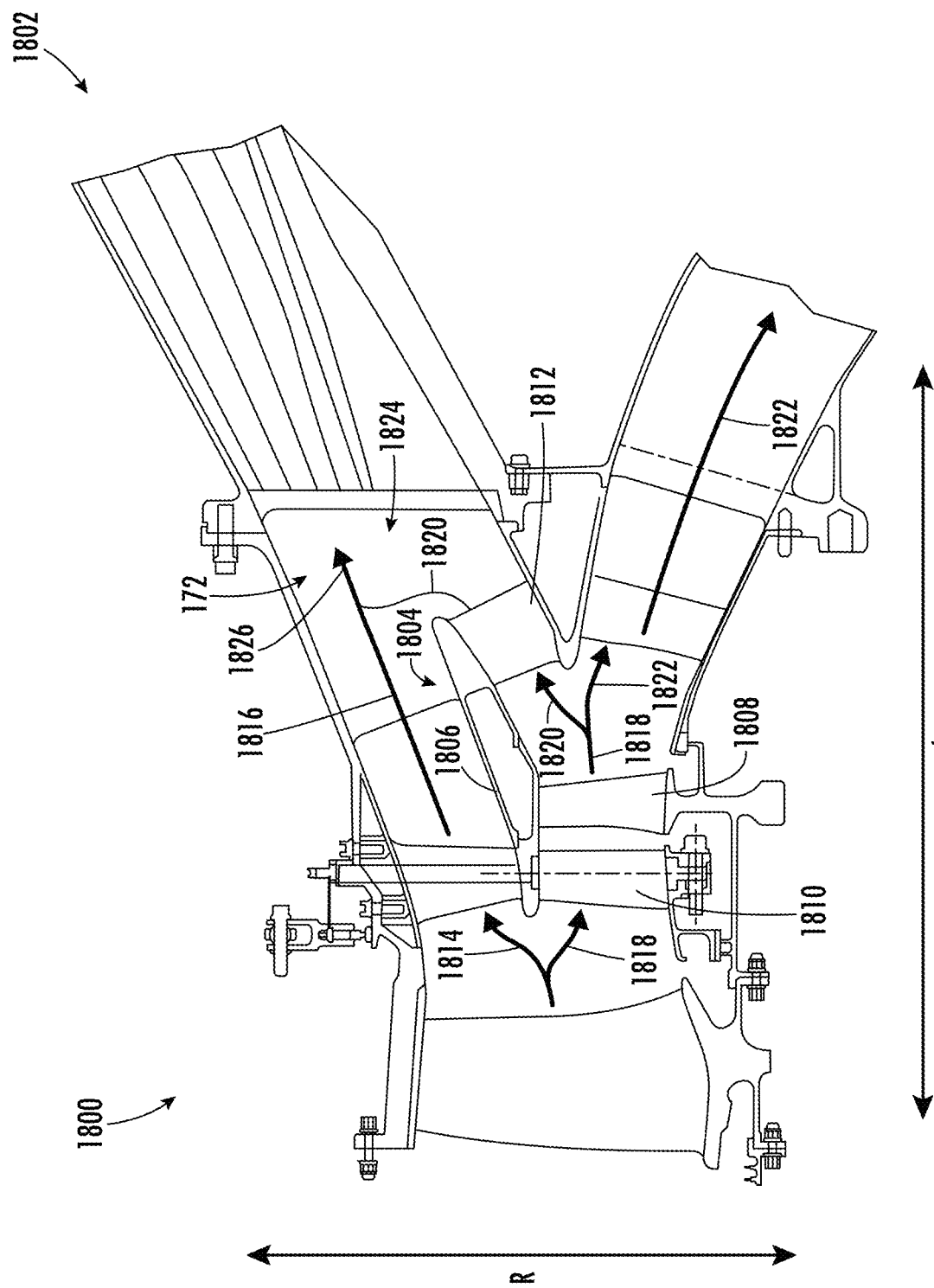
FIG. 23 is a schematic, cross-sectional view of a gas turbine engine with a booster including an outlet guide vane.

With reference to FIG. 23, a cross-sectional view of a gas turbine engine 1800 is shown. A heat exchanger 1802 disposed in a fan duct 172, and a booster 1804 is disposed upstream of the heat exchanger 1802. The booster 1804 includes a booster cowl 1806, a booster rotor blade 1808, an inlet guide vane 1810, and an outlet guide vane 1812 extending between the booster cowl 1806 and a core cowl 122. The booster 1804 separates a stream of air into an outer stream 1814 (which becomes a first fan stream 1816) and an inner stream 1818. The booster rotor blade 1808 boosts the inner stream 1818, and the core cowl 122 separates the inner stream 1818 into a second fan stream 1820 and a core stream 1822 flowing into a core duct 142.

The outlet guide vane 1812 is disposed in the fan duct 172 to direct the second fan stream 1820 into a merging zone 1824 in the fan duct 172 where the first fan stream 1816 and the second fan stream 1820 merge into a unified fan stream 1826. More specifically, the outlet guide vane 1812 is fixed to a specified pitch angle to guide the boosted second fan stream 1820 into the fan duct 172 to the merging zone 1824. The unified fan stream 1826 then flows into the heat exchanger 1802.

Figure 24:
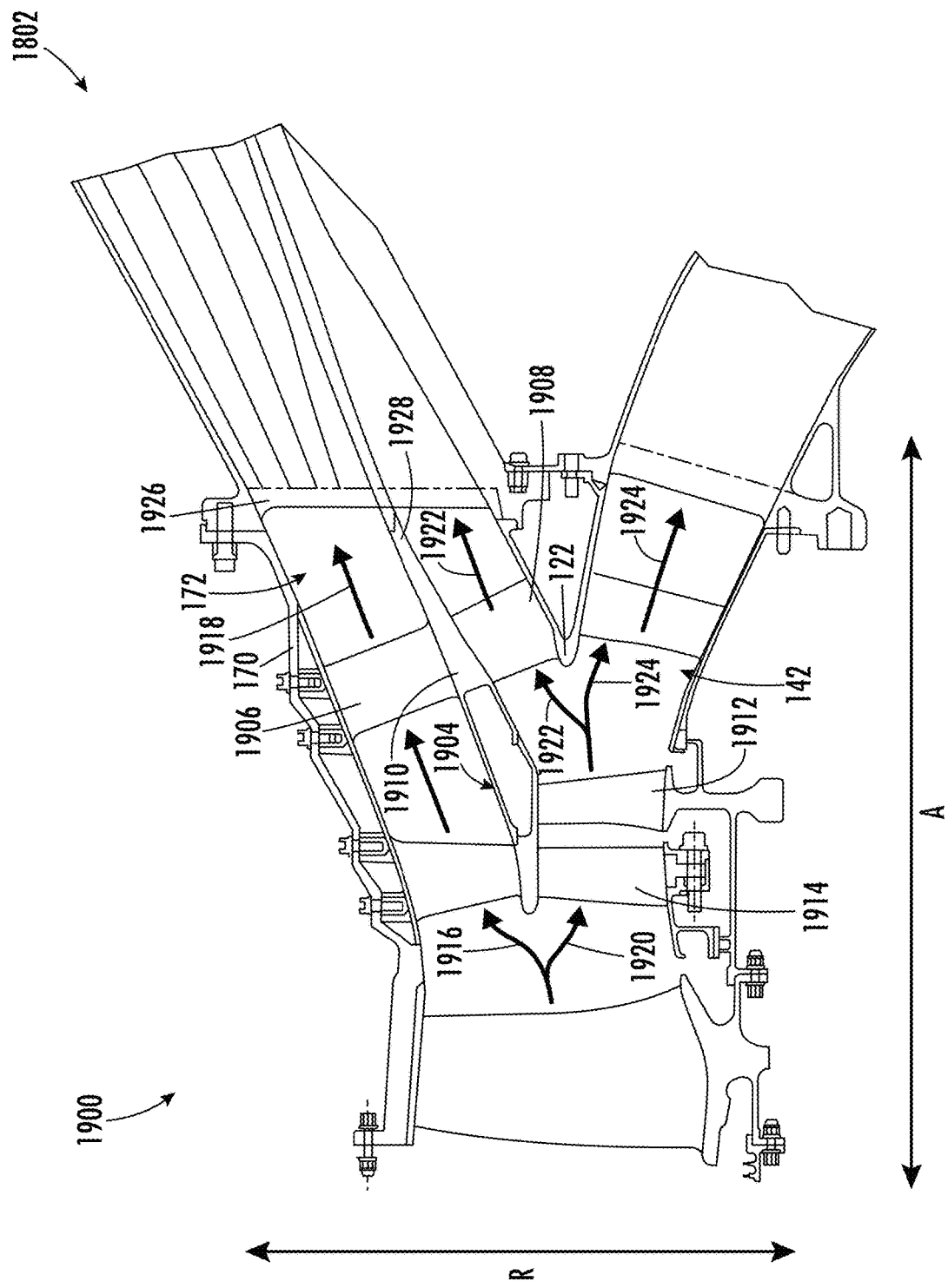
FIG. 24 is a schematic, cross-sectional view of a gas turbine engine with a booster supported by a strut and defining a fourth stream.

Now referring to FIG. 24, a cross-sectional view of a gas turbine engine 1900 is shown. The gas turbine engine 1900 includes a heat exchanger 1902 disposed in a fan duct 172, a booster 1904 disposed upstream of the heat exchanger 1902, a strut 1906 securing the booster 1904 to a fan cowl 170, and a second strut 1908 disposed in the fan duct 172 securing the booster 1904 to a core cowl 122. The booster 1904 includes a booster cowl 1910, a booster rotor blade 1912, and an inlet guide vane 1914. In FIG. 24, the inlet guide vane 1914 is fixed to a specified pitch angle.

The booster cowl 1910 separates a stream of air into an outer stream 1916 (which becomes a first fan stream 1918) from an inner stream 1920. The booster rotor blade 1912 boosts the inner stream 1920, and the core cowl 122 separates the inner stream 1920 into a second fan stream 1922 and a core stream 1924 flowing into a core duct 142. The booster cowl 1910 is arranged such that the first fan stream 1918 and the second fan stream 1922 remain separated upon reaching the heat exchanger 1902. More specifically, the heat exchanger 1902 includes an inlet 1926 extending in the radial direction R through the fan duct 172, and the booster cowl 1910 includes an extension 1928 that extends to the inlet. The extension 1928 maintains separation of the unboosted first fan stream 1918 and the boosted second fan stream 1922 in the fan duct 172 at the inlet 1926.

Figure 25:
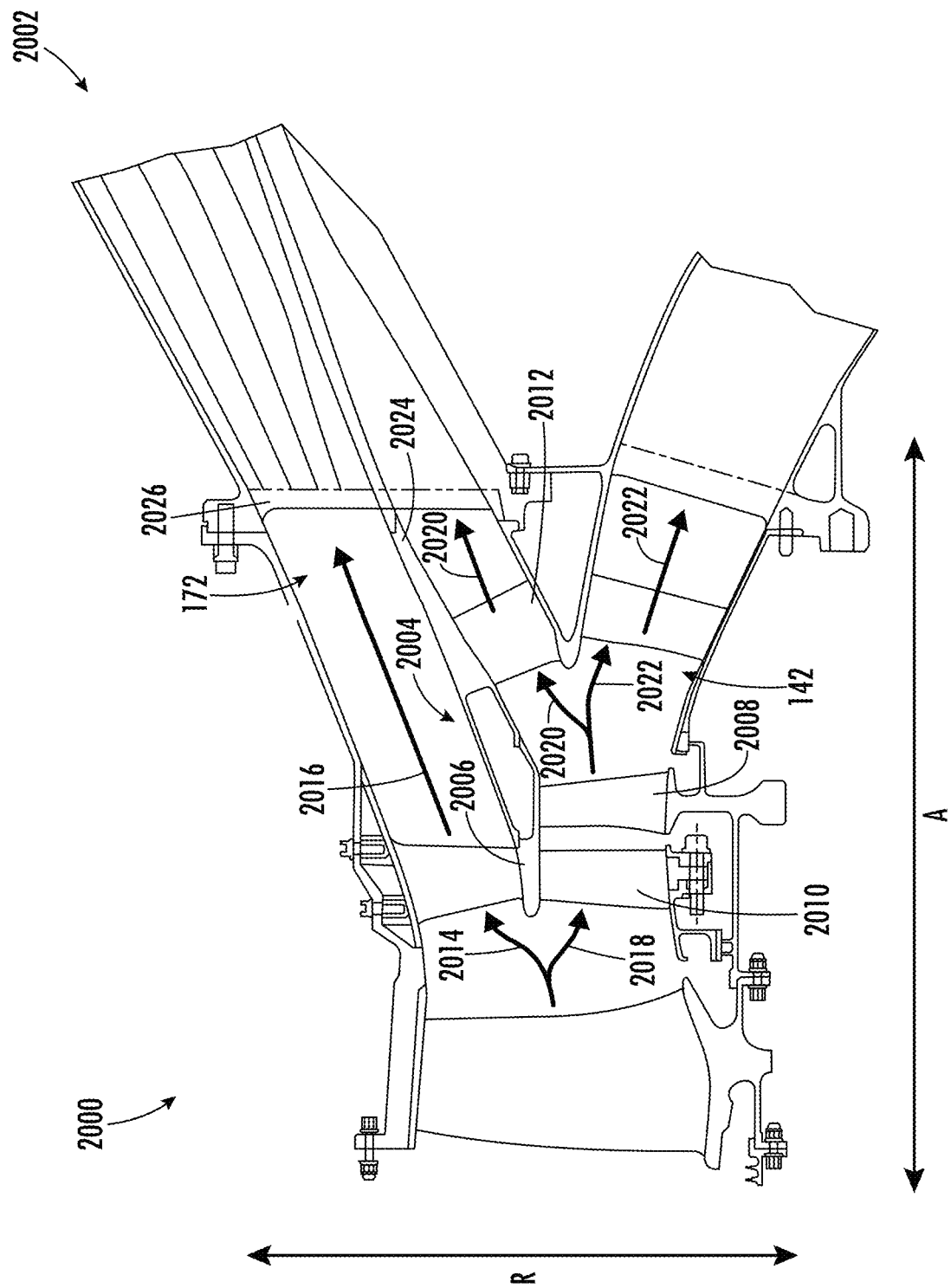
FIG. 25 is a schematic, cross-sectional view of a gas turbine engine with a booster including an outlet guide vane and defining a fourth stream.

With reference to FIG. 25, a cross-sectional view of a gas turbine engine 2000 is shown. A heat exchanger 2002 is disposed in a fan duct 172, and a booster 2004 is disposed upstream of the heat exchanger 2002. The booster 2004 includes a booster cowl 2006, a booster rotor blade 2008, an inlet guide vane 2010, and an outlet guide vane 2012 extending between the booster cowl 2006 and a core cowl 122. The booster cowl 2006 separates a stream of air into an outer stream 2014 (which becomes a first fan stream 2016) from an inner stream 2018. The inlet guide vane 2010 guides the inner stream 2018 to the booster rotor blade 2008, which boosts the inner stream 2018, and the core cowl 122 separates the inner stream 2018 into a second fan stream 2020 and a core stream 2022 flowing into a core duct 142.

The outlet guide vane 2012 is disposed in the fan duct 172 to direct the second fan stream 2020 toward the heat exchanger 2002. More specifically, the outlet guide vane 2012 is fixed to a specified pitch angle to guide the boosted second fan stream 2020 into the fan duct 172. As with the booster 1904 of FIG. 24, the booster cowl 2006 includes an extension 2024 that extends to an inlet 2026 of the heat exchanger 2002 to maintain separation of the unboosted first fan stream 2016 and the boosted second fan stream 2020.

It will be appreciated that the exemplary gas turbine engines of FIGS. 22-25 may include additional struts or outlet guide vanes as needed to secure the booster and to direct the streams to the fan duct and the core duct. For example, instead of the outlet guide vane 1812, the gas turbine engine 1800 of FIG. 23 may include a strut extending from the booster cowl 1806 to the core cowl 122.

Figure 26:
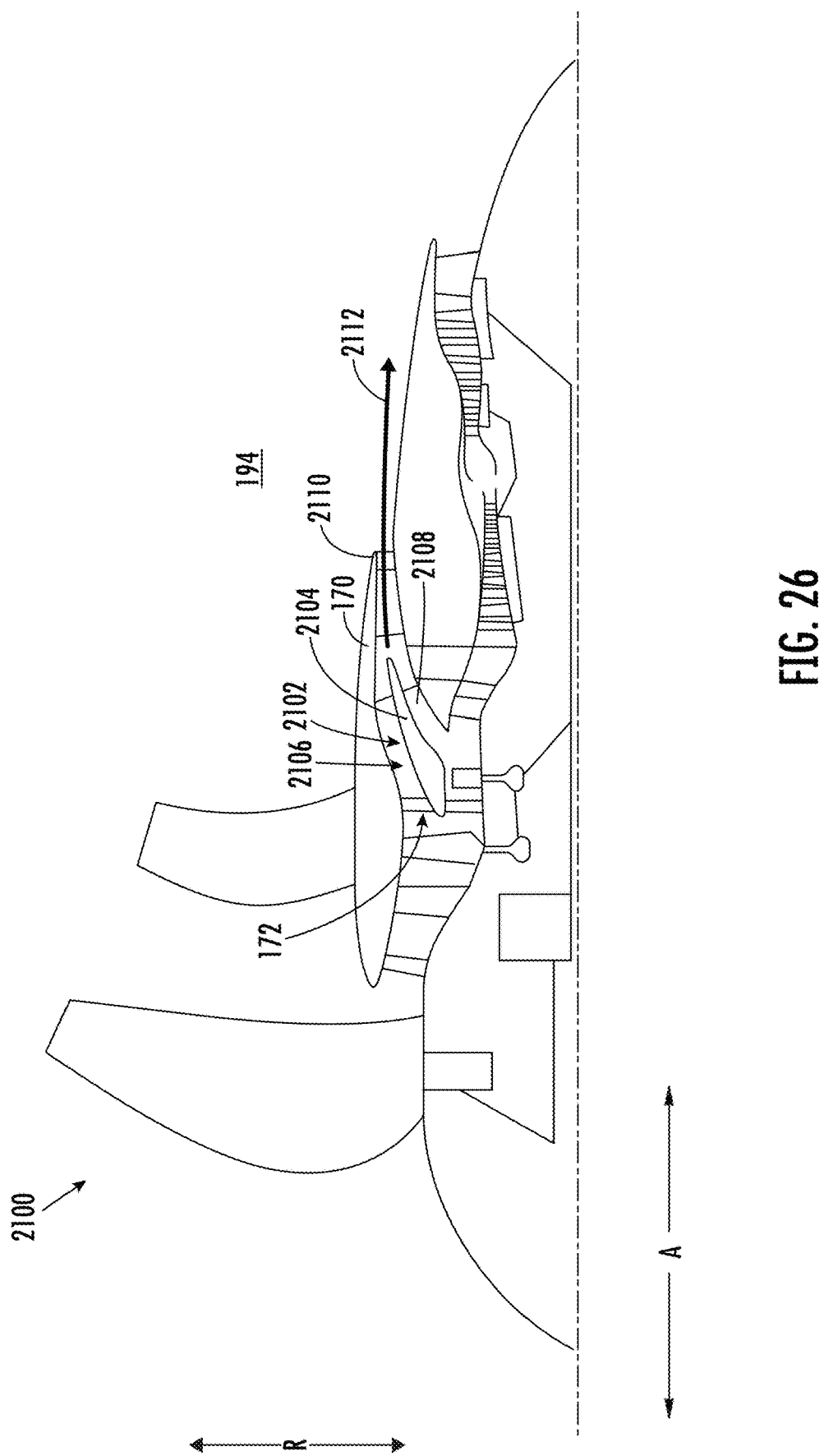
FIG. 26 is a schematic, cross-sectional view of a gas turbine engine with a booster.

With reference to FIG. 26, a cross-sectional view of a gas turbine engine 2100 is shown. The gas turbine engine 2100 includes a booster 2102 including a booster cowl 2104. The booster cowl 2104 separates a fan duct 172 into an upper fan duct 2106 and a lower fan duct 2108. The booster cowl 2104 terminates upstream of a trailing edge 2110 of a fan cowl 170 such that the booster cowl 2104 is entirely disposed inward of the fan cowl 170 in the radial direction R. In such a form, the upper fan duct 2106 merges with the lower fan duct 2108 such that a unified fan stream 2112, formed downstream of the booster 2102 but upstream of the trailing edge 2110 of the fan cowl 170, exhausts to a bypass region 194.

Figure 27C:
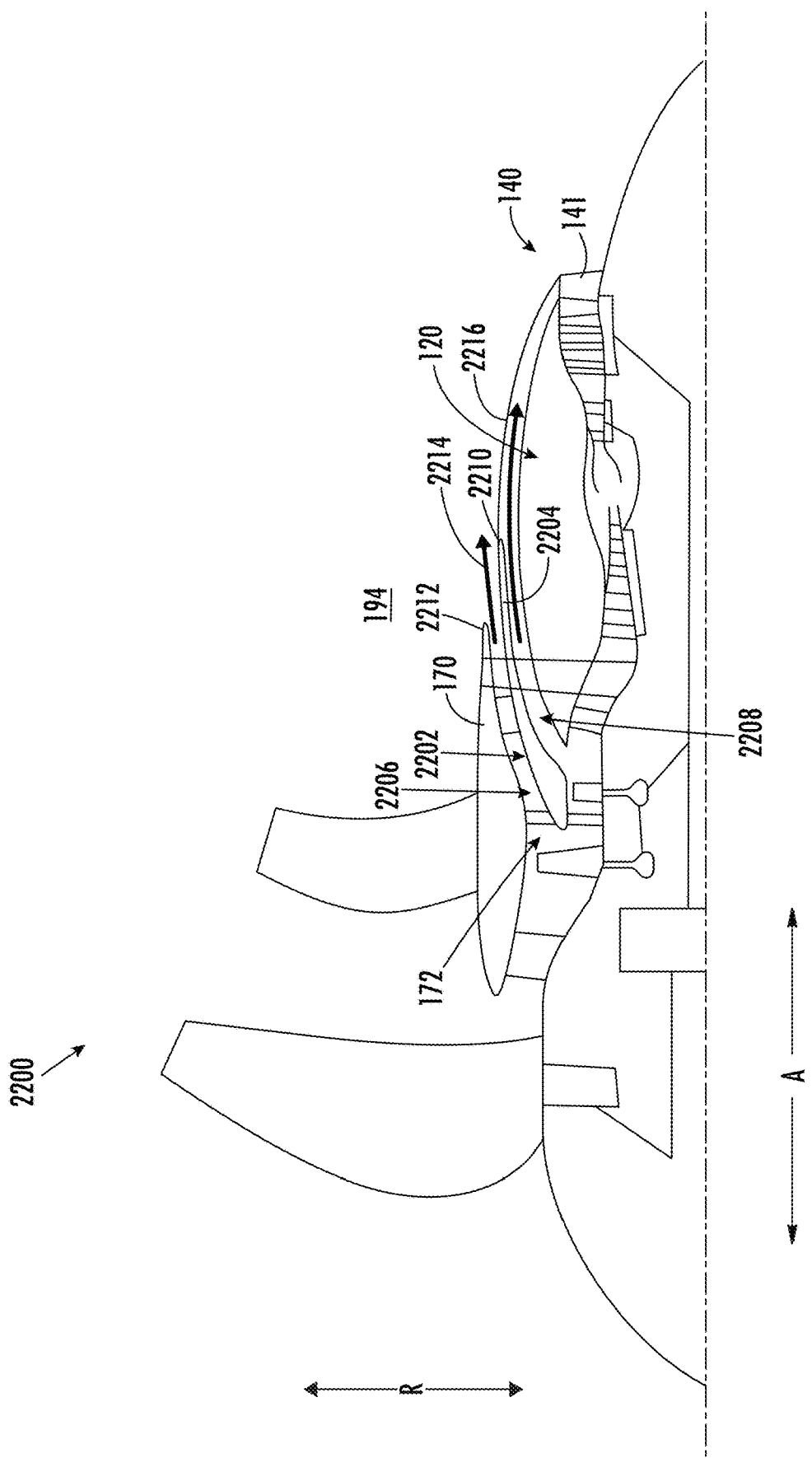

Now referring to FIGS. 27A, 27B, and 27C cross-sectional views of additional embodiments of a gas turbine engine 2200 are shown. The gas turbine engines 2200 each include a booster 2202 including a booster cowl 2204. The booster cowls 2204 separate a fan duct 172 of each gas turbine engine 2200 into an upper fan duct 2206 and a lower fan duct 2208. Each booster cowl 2204 terminates downstream of a trailing edge 2212 of a fan cowl 170. In such a form, the booster cowl 2204 maintains separation between a first fan stream 2214 in the upper fan duct 2206 and a second fan stream 2216 in the lower fan duct 2208.

Referring particularly to FIG. 27A, a trailing edge 2210 of the booster cowl 2204 terminates downstream of the trailing edge 2212 of the fan cowl 170, and upstream of an exhaust nozzle 140 of the turbomachine 120. In such a manner, the upper fan duct 2206 exhausts to a bypass region 194, and the lower fan duct 2208 exhausts to the bypass region 194 separately from the upper fan duct 2206. The second fan stream 2216 thus acts as a fourth stream for the gas turbine engine 2200.

Referring particularly to FIG. 27B, a trailing edge 2210 of the booster cowl 2204 terminates downstream of the trailing edge 2212 of the fan cowl 170, at or downstream of an exhaust nozzle 140 of the turbomachine 120. In such a manner, the upper fan duct 2206 exhausts to a bypass region 194, and the lower fan duct 2208 merges with an exhaust of the turbomachine 120. A mixer 2213 is depicted schematically to assist with the mixing of the two flows. The second fan stream 2216 thus again acts as a fourth stream for the gas turbine engine 2200.

Referring particularly to FIG. 27C, the booster cowl 2204 terminates downstream of the trailing edge 2212 of the fan cowl 170. More specifically, for the embodiment of FIG. 27C, the upper fan duct 2206 exhausts to a bypass passage 194, and the lower fan duct 2208 merges with an exhaust of the turbomachine 120 through a turbine rear frame 141 located at a turbomachine exhaust nozzle 140. In such a manner, the second fan stream 2216 in the lower fan duct 2208 is reincorporated with the exhaust of the turbomachine 120 through the turbine rear frame 141.

However, as will be appreciated from the discussion herein, for the embodiments of FIGS. 27A and 27B, the lower fan duct inlet and upper fan duct inlet are considered collectively for the purposes of determining the TPAR and CBR, as discussed elsewhere herein, despite the lower fan duct 2208 acting as a fourth stream.

Notably, in certain exemplary embodiments the lower fan duct 2208 of FIGS. 27A, 27B may be an annular passage extending continuously from the lower fan duct inlet to the trailing edge 2210. Alternatively, at least a portion of the lower fan duct 2208 may be configured as one or more discrete ducts or passages. If a plurality of ducts or passages are provided, they may be spaced along a circumferential direction of the gas turbine engine.

Figure 28:
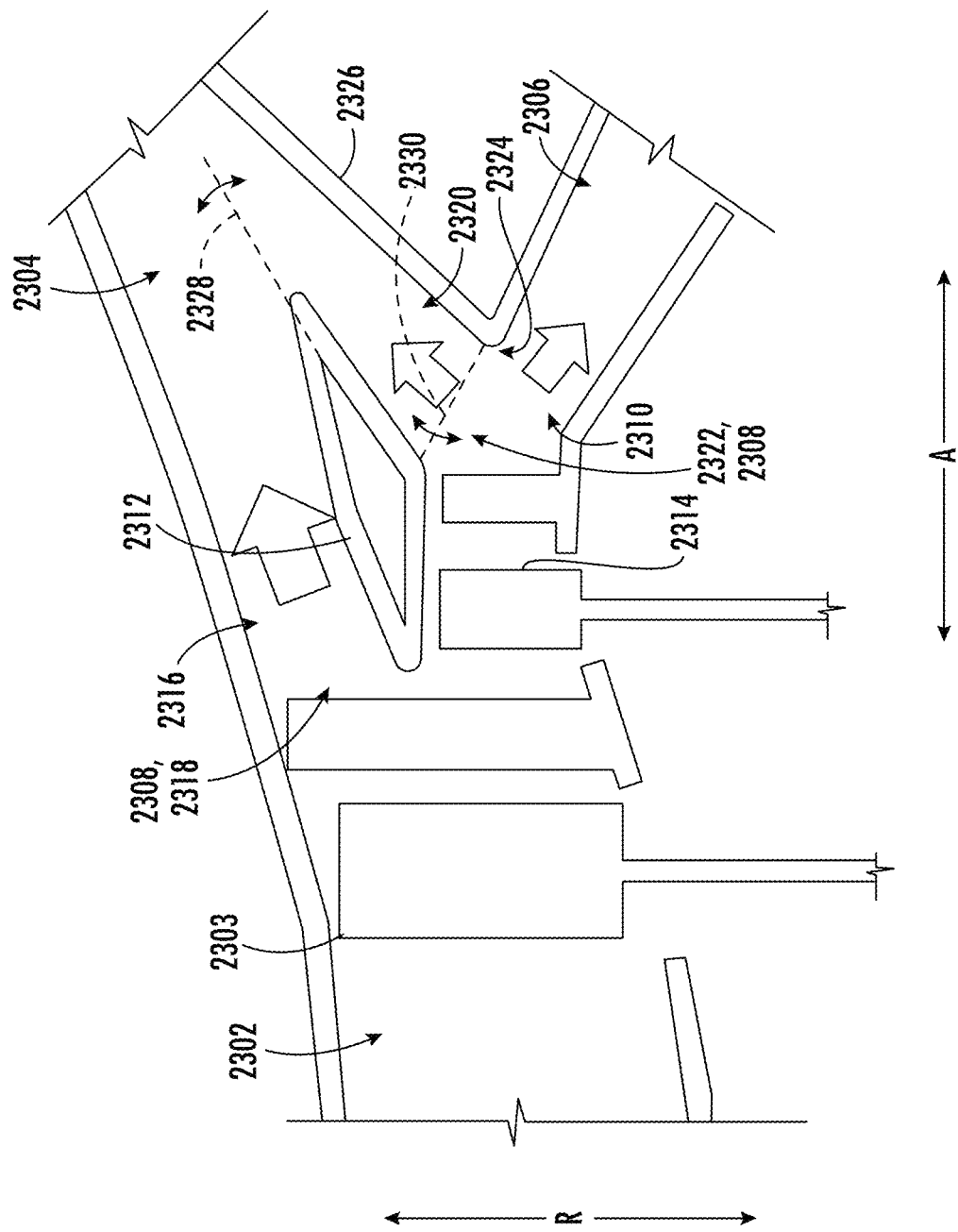
FIG. 28 is a simplified, schematic view is provided of a section of a gas turbine engine in accordance with an exemplary aspect of the present disclosure.

Referring now to FIG. 28, a simplified, schematic view is provided of a section of a gas turbine engine 2300 in accordance with an exemplary aspect of the present disclosure. In particular, FIG. 28 provides a close-up, schematic view of a section of an inlet duct 2302, a fan duct 2304, and a core duct 2306 of the gas turbine engine 2300. The exemplary gas turbine engine 2300 of FIG. 28 may be configured in a similar manner as one or more of the exemplary gas turbine engines of the present disclosure described hereinabove, such as one or more of the exemplary gas turbine engines of FIGS. 11 through 27.

For example, the gas turbine engine 2300 includes the inlet duct 2302, a ducted fan 2303 (also referred to herein as a secondary fan) positioned at least partially within the inlet duct 2302, the fan duct 2304, and the core duct 2306; and defines a fan duct inlet 2308 to the fan duct 2304 and a core duct inlet 2310 to the core duct 2306. Moreover, the exemplary gas turbine engine 2300 of FIG. 28 includes a booster having a booster cowl 2312 and a booster rotor blade 2314. The booster cowl 2312 is positioned at least partially in the fan duct 2304 and separates an upstream portion of the fan duct 2304 into an upper fan duct 2316 having an upper fan duct inlet 2318 and a lower fan duct 2320 having a lower fan duct inlet 2322. The upper fan duct inlet 2318 and lower fan duct inlet 2322 collectively form the fan duct inlet 2308.

In such a manner, it will be appreciated that the upper fan duct inlet 2318 defines an upper fan duct inlet area, $A_{FDI\_Upper}$, and a lower fan duct inlet area, $A_{FDI\_Lower}$. The upper fan duct inlet area, $A_{FDI\_Upper}$, and lower fan duct inlet area, $A_{FDI\_Lower}$, collectively form a secondary fan outer fan area, $A_{S\_Out}$. The secondary fan outer fan area, $A_{S\_Out}$, as noted above with respect to the earlier embodiments, refers to an area representing a portion of an airflow from the ducted fan 2303 that is provided to the fan duct 2304. The upper fan duct inlet area, $A_{FDI\_Upper}$, and lower fan duct inlet area, $A_{FDI\_Lower}$, can each individually be calculated in the same manner as the secondary fan outer fan area, $A_{S\_Out}$, as described above with reference to, e.g., FIG. 3 (i.e., an area defined by the formula:

$$\frac{\pi(R_{OUT}^2 - R_{IN}^2)}{\cos(\theta)},$$

where $R_{OUT}$ is an effective duct inlet outer radius along a radial direction R, $R_{IN}$ is a leading edge radius of the booster cowl 2312 or of a core cowl 2326, and θ is defined by a mean flow direction through a forward 10% of the upper fan duct 2316 or lower fan duct 2320; see FIG. 3).

Referring still to FIG. 28, the gas turbine engine 2300 further defines a secondary fan inner fan area, $A_{S\_In}$. The secondary fan inner fan area, $A_{S\_In}$, refers to an area defined by an annulus representing a portion of the ducted fan 2303 located inward of a leading edge 2324 of the core cowl 2326 (see, e.g., FIG. 2).

Moreover, while not depicted in FIG. 28, it will be appreciated that the gas turbine engine 2300 further defines a primary fan outer fan area, $A_{P\_Out}$, and a primary fan inner fan area, $A_{P\_In}$. Each of these measurements, and the secondary fan outer fan area, $A_{S\_Out}$, which again is a sum of the upper fan duct inlet area, $A_{FDI\_Upper}$, and lower fan duct inlet area, $A_{FDI\_Lower}$, may be used in defining various airflow ratios for the engine 2300. In particular, it will be appreciated that the exemplary engine 2300 of FIG. 28 further defines a thrust to power airflow ratio (TPAR) and a core bypass ratio (CBR), which as discussed herein are used to define an engine 2300 in accordance with the present disclosure. The thrust to power airflow ratio is a ratio of an airflow through a bypass passage of the engine 2300 (see, e.g., bypass passage of earlier embodiments) and through the fan duct 2304 to an airflow through the core duct 2306.

Further, the core bypass ratio is a ratio of an airflow through the fan duct 2304 to the airflow through the core duct 2306. These ratios are calculated while the engine 2300 is operating at a rated speed during standard day operating conditions, and the amounts of airflow used to calculate these ratios are each expressed as a mass flowrate in the same units (mass per unit time).

More specifically, the preferential amount of the airflow through the bypass passage is determined using a fan pressure ratio for the primary fan (see, e.g., fan 152 of earlier embodiments) while operating at the rated speed during standard day operating conditions, and the primary fan outer fan area, $A_{P\_Out}$. The amount of airflow through the inlet duct 2302 is determined using the fan pressure ratio for the primary fan while operating at the rated speed during standard day operating conditions, and the primary fan inner fan area, $A_{P\_In}$. The amount of airflow through the fan duct 2304 and the amount of airflow through the core duct 2306 is determined based on the amount of airflow through the inlet duct 2302 and the secondary fan outer fan area, $A_{S\_Out}$, and the secondary fan inner fan area, $A_{S\_In}$. Further, the amount of airflow through the lower fan duct inlet 2322 is determined based on the amount of airflow through the inlet duct 2302 and the upper fan duct inlet area, $A_{FDI\_Upper}$, the lower fan duct inlet area, $A_{FDI\_Lower}$, and the secondary fan inner fan area, $A_{S\_In}$.

Notably, in certain exemplary embodiments, the lower fan duct 2320 is a fixed flowpath lower fan duct 2320. With such an exemplary embodiment, the gas turbine engine 2300 may not include, e.g., one or more variable structures 2328, 2330 to optimize losses and modify airflow characteristics through the lower fan duct 2320 during operations of the present disclosure, e.g., to prevent flow separations over a wide range of flow ratios (see, e.g., embodiments of FIGS. 24 and 25).

Alternatively, in other exemplary embodiments, such as the exemplary embodiment of FIG. 28, the lower fan duct 2320 may be a variable flowpath lower fan duct 2320 having one or more variable structures 2328, 2330 to optimize losses and modify airflow characteristics through the lower fan duct 2320 during operations of the present disclosure, e.g., to prevent flow separations over a wide range of flow ratios. For example, as is represented by a line in phantom in FIG. 28, a first variable structure 2328 may be a flow blocker operable with the variable flowpath lower fan duct 2320 for affecting an amount of airflow through the variable flowpath lower fan duct 2320 during operation of the gas turbine engine 2300. In the embodiment shown, the flow blocker is coupled to the booster cowl 2312, at least partially integrated into the booster cowl 2312, or both. Additionally, or alternatively, as is represented by another line in phantom in FIG. 28, a second variable structure 2330 may be a blocker door coupled to a core cowl of the engine. The blocker door may be pivotably coupled to the core cowl, slidably coupled to the core cowl, etc.

It will be appreciated, however, that in other exemplary embodiments, the one or more variable structures 2328, 2330 may be configured differently. For example, in other embodiments the one or more variable structures 2328, 2330 may include an inlet guide vane positioned in the variable flowpath lower fan duct 2320, a variable guide vane located upstream of the ducted fan 2303, a variable guide vane located downstream of the ducted fan 2303, a variable guide vane located downstream of the booster rotor blade 2314 and upstream of the lower fan duct 2320, an actuator configured to rotate the inlet guide vane about a pitch axis, or a combination thereof. As alluded to earlier, the inventors of the present disclosure found, unexpectedly during the course of designing a gas turbine engine having a booster and booster cowl, with the booster cowl separating an upstream portion of a fan duct into an upper fan duct having an upper fan duct inlet and a lower fan duct having a lower fan duct inlet, a significant relationship exists between a thrust to power airflow ratio (TPAR), an airflow through the lower fan duct inlet, $A_{3S\_Lower}$, and an airflow through the core, $A_C$, of the gas turbine engine while the engine is operated at the rated speed during standard day operating conditions. The relationship can be thought of as an indicator of the ability of a gas turbine having said booster cowl to be able to provide an operability benefit to the gas turbine engine.

In particular, the inventor discovered that when operating a gas turbine engine having a fan duct, and in particular when operating a gas turbine engine having a booster and a booster cowl (with the booster cowl in the upstream portion of the fan duct), in order to achieve a desired operability, the amount of airflow needed to be provided through the lower fan duct relative to the core duct to achieve a desired operability varies with a size of the primary fan (and thus a bypass ratio and TPAR) and an operating condition of the gas turbine engine.

For example, with a larger primary fan and TPAR, an amount of heat rejection required may be increased due at least in part to a size of a reduction gearbox needed to rotate the primary fan at a desired rotational speed. In such a manner, it may be beneficial to provide an increased amount of airflow through the lower fan duct, as such airflow has been increased in pressure by the booster, and may allow for an increased pressure drop across a heat exchanger in the fan duct.

Further, with a larger primary fan and TPAR, it becomes increasingly important to match an airflow into the core of the turbomachine of the gas turbine engine at the various operating conditions. At takeoff, for example, the operability goals are generally to create as much thrust as possible. To achieve this goal, the engine wants to rotate the primary fan faster relative to a desired rotational speed of the secondary fan in the inlet duct. More specifically, the desired rotational speed of the primary fan is set by the desired thrust output, while the desired rotational speed of the secondary fan may be set by an operability line of the compressor section. By increasing an amount of airflow through the lower fan duct inlet relative to the amount of airflow into the core, the engine may allow the primary fan to rotate faster (and thus also allow the secondary fan to rotate faster) without, e.g., stalling the compressor section.

By contrast, at an operating condition more focused on efficiency, such as cruise, the engine wants to operate the primary fan at a slower rotational speed to increase efficiency. Such an operating mode correspondingly slows down the rotational speed of the secondary fan, such that less airflow is needed to be provided through the lower fan duct inlet relative to the amount of airflow into the core.

The relationship discovered, infra, can therefore identify a gas turbine engine having a booster and booster cowl, capable of achieving a desired thrust output and thermal management capacity, while avoiding a prohibitive operability penalty, and suited for a particular mission requirement, one that takes into account efficiency, weight, thermal capacity needs, complexity, reliability, and other factors influencing the optimal choice for a gas turbine engine with the booster and booster cowl.

The desired relationship providing for the improved gas turbine engine, discovered by the inventors, is a booster bleed ratio (BBR), wherein the BBR is a ratio of an airflow through the lower fan duct inlet, $A_{3S\_Lower}$, to the airflow through the core duct, $A_C$. In aspects of the present disclosure, for a gas turbine engine defining a TPAR between 3.5 and 100 and a core bypass ratio (CBR) between 0.1 and 10, designing the gas turbine engine to have a BBR less than or equal to an upper range of 0.005625×TPAR+0.2375, and greater than or equal to a lower range of 0.001125×TPAR+0.00977, allows for the gas turbine engine to provide the desired benefits discussed herein. Notably, in these relationships all measures of airflow are in the same mass per unit time measurement.

Figure 30:
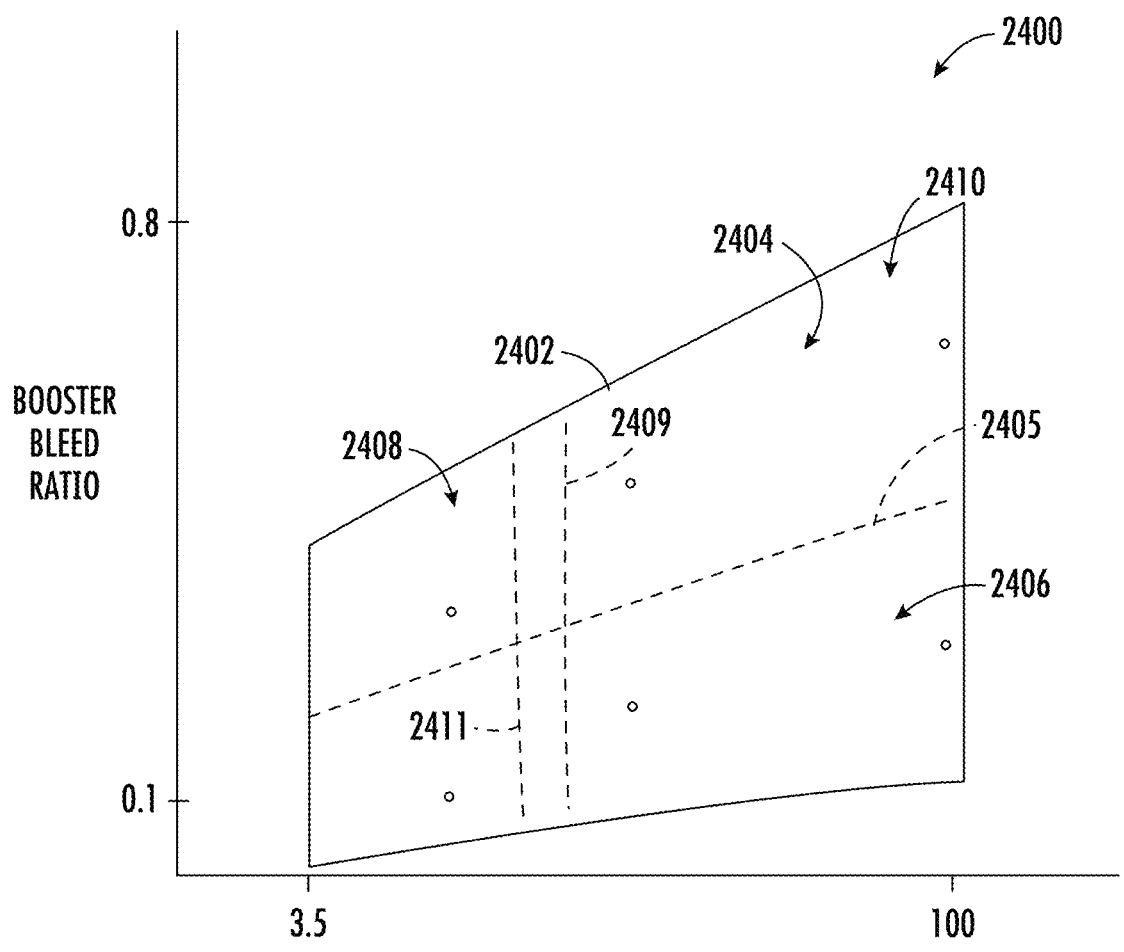
FIG. 30 is a plot of gas turbine engines in accordance with one or more exemplary embodiments of the present disclosure, showing the TPAR (Y-Axis) and the BBR (X-axis).

Referring now to FIGS. 29 and 30, the relationships between the various parameters of the BBR of the exemplary gas turbine engines are illustrated in accordance with one or more exemplary embodiments of the present disclosure. In particular, FIG. 29 provides a table including numerical values corresponding to several of the plotted gas turbine engines in FIG. 30. FIG. 30 is a plot 2400 of gas turbine engines in accordance with one or more exemplary embodiments of the present disclosure, showing the TPAR (Y-Axis) and the BBR (X-axis). The plot 240 depicts a range 2402 of gas turbine engines of the present disclosure, falling within the range of BBR described above.

Moreover, the plot 2400 in FIG. 30 further shows an upper subrange 2404 and a lower subrange 2406. The upper subrange 2404 corresponds to embodiments where the lower fan duct is a fixed flowpath lower fan duct. For this upper subrange 2404, BBR is closer to an upper range of the plot 2402 (and more specifically of the range 2402) than a lower range of the plot 204 along the X-axis (i.e., above phantom line 2405). By contrast, the lower subrange corresponds to embodiments where the lower fan duct is a variable flowpath lower fan duct. For this lower subrange 2406, BBR is closer to the lower range of the plot 2402 than the upper range of the plot 2402 along the X-axis (i.e., below phantom line 2405).

As will be appreciated, inclusion of a variable flowpath lower fan duct may not require as much airflow to the be provided through the variable flowpath lower fan duct during operation at a rated speed, as compared to during other operating conditions, as the airflow may be modulated to match a specific need to achieve a desired operability of the gas turbine engine.

Referring still to FIG. 30, the plot 2400 further shows a ducted primary fan subrange 2408 and an unducted primary fan subrange 2410. For the ducted primary fan subrange 2408, a primary fan of the gas turbine engines is ducted (i.e., surrounded at least in part by an outer nacelle), and TPAR is greater less than or equal to 40 (i.e., to the left of phantom line 2409). For the unducted primary fan subrange 2410, a primary fan of the gas turbine engines is unducted, and TPAR is greater than or equal to 30 (i.e., to the right of phantom line 2411).

Further aspects are provided by the subject matter of the following clauses:

A gas turbine engine includes a turbomachine including a compressor section, a combustion section, and a turbine section arranged in serial flow order, the turbomachine defining an engine inlet to an inlet duct, a fan duct inlet to a fan duct, and a core inlet to a core duct, a primary fan driven by the turbomachine, a secondary fan located downstream of the primary fan within the inlet duct, the gas turbine engine defining a thrust to power airflow ratio between 3.5 and 100 and a core bypass ratio between 0.1 and 10, wherein the thrust to power airflow ratio is a ratio of an airflow through a bypass passage over the turbomachine plus an airflow through the fan duct to an airflow through the core duct, and wherein the core bypass ratio is a ratio of the airflow through the fan duct to the airflow through the core duct, and a booster located downstream of the secondary fan and including a booster rotor blade, an inlet guide vane, a booster cowl, a strut, and a stem extending through the booster cowl, the booster cowl separating an upstream portion of the fan duct into an upper fan duct having an upper fan duct inlet and a lower fan duct having a lower fan duct inlet, the upper fan duct inlet and lower fan duct inlet collectively forming the fan duct inlet, the inlet guide vane located forward of the booster rotor blade, wherein the strut secures the booster cowl to the engine inlet.

The gas turbine engine of any of the preceding clauses, wherein the stem is spaced upstream from the strut.

The gas turbine engine of any of the preceding clauses, wherein the stem is integral with the strut.

The gas turbine engine of any of the preceding clauses, wherein the stem is disposed inside the strut.

The gas turbine engine of any of the preceding clauses, further including a fan cowl, wherein the stem extends from the booster cowl to the fan cowl.

The gas turbine engine of any of the preceding clauses, wherein the inlet guide vane is rotatable about a pitch axis to a specified pitch angle.

The gas turbine engine of any of the preceding clauses, further including an outlet guide vane disposed upstream of the booster, wherein the outlet guide vane is rotatable about a pitch axis to a specified pitch angle.

The gas turbine engine of any of the preceding clauses, wherein the outlet guide vane and the inlet guide vane are integral.

The gas turbine engine of any of the preceding clauses, wherein the outlet guide vane has a first cross-sectional area, the inlet guide vane has a second cross-sectional area, and the first cross-sectional area differs from the second cross-sectional area.

The gas turbine engine of any of the preceding clauses, further including a fan cowl, wherein the outlet guide vane extends from the fan cowl.

The gas turbine engine of any of the preceding clauses, further including an actuator configured to rotate the inlet guide vane about a pitch axis.

The gas turbine engine of any of the preceding clauses, wherein the inlet guide vane is rotatably fixed to the stem, the pitch axis extends through the stem, and the actuator is configured to rotate the stem.

The gas turbine engine of any of the preceding clauses, wherein the inlet guide vane extends radially inward from the booster cowl through the engine inlet.

The gas turbine engine of any of the preceding clauses, wherein the inlet guide vane is disposed inward of the booster cowl and extends inwardly from the booster cowl.

The gas turbine engine of any of the preceding clauses, wherein the booster includes a trailing edge disposed in the fan duct.

A method of operating a gas turbine engine includes operating the gas turbine engine at a rated speed, wherein operating the gas turbine engine at the rated speed includes operating the gas turbine engine to define a thrust to power airflow ratio between 3.5 and 100 and a core bypass ratio between 0.1 and 5, wherein the thrust to power airflow ratio is a ratio of an airflow through a bypass passage over a turbomachine of the gas turbine engine plus an airflow through a fan duct to an airflow through a core duct, and wherein the core bypass ratio is a ratio of the airflow through the fan duct to the airflow through the core duct, rotating an inlet guide vane of a booster to direct an inner stream of air to a core cowl, and splitting the inner stream of air at the core cowl into a fan stream flowing into the fan duct and a core stream flowing into the core duct.

The method of any of the preceding clauses, further including actuating an actuator to rotate a stem that is rotatably fixed to the inlet guide vane.

The method of any of the preceding clauses, further including rotating an outlet guide vane disposed upstream of the booster to direct a stream of air to the booster.

The method of any of the preceding clauses, further including splitting the stream of air at the booster into the inner stream of air flowing toward the core duct and an outer stream of air flowing toward the fan duct.

A gas turbine engine includes a turbomachine including a compressor section, a combustion section, and a turbine section arranged in serial flow order, the turbomachine defining an engine inlet to an inlet duct, a fan duct inlet to a fan duct, and a core inlet to a core duct, a primary fan driven by the turbomachine, a secondary fan located downstream of the primary fan within the inlet duct, and a booster located downstream of the secondary fan and including a booster rotor blade, an inlet guide vane, and booster cowl, the booster cowl separating an upstream portion of the fan duct into an upper fan duct having an upper fan duct inlet and a lower fan duct having a lower fan duct inlet, the upper fan duct inlet and lower fan duct inlet collectively forming the fan duct inlet, the inlet guide vane located forward of the booster rotor blade.

The gas turbine engine of any preceding clause, wherein the primary fan, the secondary fan, the compressor section, the combustion section, and the turbine section are arranged in serial flow order.

A gas turbine engine comprising: a turbomachine comprising a compressor section, a combustion section, and a turbine section arranged in serial flow order, the turbomachine defining an engine inlet to an inlet duct, a fan duct inlet to a fan duct, and a core inlet to a core duct; a primary fan driven by the turbomachine; a secondary fan located downstream of the primary fan within the inlet duct, the gas turbine engine defining a thrust to power airflow ratio (TPAR) between 3.5 and 100 and a core bypass ratio (CBR) between 0.1 and 10, wherein the TPAR is a ratio of an airflow through a bypass passage over the turbomachine plus an airflow through the fan duct to an airflow through the core duct, and wherein the CBR is a ratio of the airflow through the fan duct to the airflow through the core duct; and a booster located downstream of the secondary fan and comprising a booster rotor blade and a booster cowl, the booster cowl separating an upstream portion of the fan duct into an upper fan duct having an upper fan duct inlet and a lower fan duct having a lower fan duct inlet, the upper fan duct inlet and lower fan duct inlet collectively forming the fan duct inlet, the gas turbine engine defining a booster bleed ratio (BBR), wherein the BBR is a ratio of an airflow through the lower fan duct inlet to the airflow through the core duct, and wherein BBR is less than or equal to an upper range of 0.005625×TPAR+0.2375, and greater than or equal to a lower range of 0.001125×TPAR+0.00977.

The gas turbine engine of any of the preceding clauses, wherein the primary fan is an unducted fan, and wherein TPAR is greater than or equal to 30.

The gas turbine engine of any of the preceding clauses, wherein the thrust to power airflow ratio is between 35 and 50.

The gas turbine engine of any of the preceding clauses, wherein the primary fan is a ducted fan, and wherein TPAR is less than or equal to 40.

The gas turbine engine of any of the preceding clauses, wherein TPAR is less than or equal to 20.

The gas turbine engine of any of the preceding clauses, wherein the lower fan duct is a fixed flowpath lower fan duct, and wherein BBR is closer to the upper range than the lower range.

The gas turbine engine of any of the preceding clauses, wherein BBR is greater than 0.20 and less than 0.7.

The gas turbine engine of any of the preceding clauses, wherein the lower fan duct is a variable flowpath lower fan duct, and wherein BBR is closer to the lower range than the upper range.

The gas turbine engine of any of the preceding clauses, wherein BBR is greater than 0.05 and less than 0.2.

The gas turbine engine of any of the preceding clauses, further comprising: a flow blocker operable with the variable flowpath lower fan duct for affecting an amount of airflow through the variable flowpath lower fan duct during operation of the gas turbine engine.

The gas turbine engine of any of the preceding clauses, wherein the flow blocker is coupled to the booster cowl, at least partially integrated into the booster cowl, or both.

The gas turbine engine of any of the preceding clauses, further comprising: an inlet guide vane positioned in the variable flowpath lower fan duct, upstream of the secondary fan, or downstream of the booster rotor blade and upstream of the variable flowpath lower fan duct; and an actuator configured to rotate the inlet guide vane about a pitch axis.

The gas turbine engine of any of the preceding clauses, wherein the core bypass ratio is between 0.3 and 5.

The gas turbine engine of any of the preceding clauses, wherein the secondary fan is a single stage secondary fan.

The gas turbine engine of any of the preceding clauses, wherein the secondary fan is a multi-stage secondary fan.

The gas turbine engine of any of the preceding clauses, wherein the multi-stage secondary fan is a two stage secondary fan.

A method of operating a gas turbine engine, the method comprising: operating the gas turbine engine at a rated speed, wherein operating the gas turbine engine at the rated speed comprises operating the gas turbine engine to define a thrust to power airflow ratio between 3.5 and 100 and a core bypass ratio between 0.1 and 5, wherein the thrust to power airflow ratio is a ratio of an airflow through a bypass passage over a turbomachine of the gas turbine engine plus an airflow through a fan duct to an airflow through a core duct, and wherein the core bypass ratio is a ratio of the airflow through the fan duct to the airflow through the core duct, wherein operating the gas turbine engine at the rated speed further comprises operating the gas turbine engine to define a booster bleed ratio (BBR), wherein the BBR is a ratio of an airflow through a lower fan duct inlet to the airflow through the core duct, wherein the gas turbine engine comprises a booster located downstream of a secondary fan and comprising a booster rotor blade and a booster cowl, the booster cowl separating an upstream portion of the fan duct into an upper fan duct having an upper fan duct inlet and a lower fan duct having the lower fan duct inlet, the upper fan duct inlet and lower fan duct inlet collectively forming a fan duct inlet of the fan duct, and wherein BBR is less than or equal to an upper range of 0.005625×TPAR+0.2375, and greater than or equal to a lower range of 0.001125×TPAR+0.00977.

The method of any of the preceding clauses, wherein the primary fan is an unducted fan, and wherein TPAR is greater than or equal to 30.

The method of any of the preceding clauses, wherein the primary fan is a ducted fan, and wherein TPAR is less than or equal to 40.

The method of any of the preceding clauses, wherein the lower fan duct is a fixed flowpath lower fan duct, and wherein BBR is closer to the upper range than the lower range.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine comprising:
   a turbomachine comprising a compressor section, a combustion section, and a turbine section arranged in serial flow order, the turbomachine defining an engine inlet to an inlet duct, a fan duct inlet to a fan duct, and a core inlet to a core duct;
   a primary fan driven by the turbomachine;
   a secondary fan located downstream of the primary fan within the inlet duct, the gas turbine engine defining a thrust to power airflow ratio (TPAR) between 3.5 and 100 and a core bypass ratio (CBR) between 0.1 and 10, wherein the TPAR is a ratio of an airflow through a bypass passage over the turbomachine plus an airflow through the fan duct to an airflow through the core duct, and wherein the CBR is a ratio of the airflow through the fan duct to the airflow through the core duct; and
   a booster located downstream of the secondary fan and comprising a booster rotor blade and a booster cowl, the booster cowl separating an upstream portion of the fan duct into an upper fan duct having an upper fan duct inlet and a lower fan duct having a lower fan duct inlet, the upper fan duct inlet and lower fan duct inlet collectively forming the fan duct inlet, the gas turbine engine defining a booster bleed ratio (BBR), wherein the BBR is a ratio of an airflow through the lower fan duct inlet to the airflow through the core duct, and
   wherein BBR is less than or equal to an upper range of 0.005625×TPAR+0.2375, and greater than or equal to a lower range of 0.001125×TPAR+0.00977.

2. The gas turbine engine of claim 1, wherein the primary fan is an unducted fan, and wherein TPAR is greater than or equal to 30.

3. The gas turbine engine of claim 2, wherein the thrust to power airflow ratio is between 35 and 50.

4. The gas turbine engine of claim 1, wherein the primary fan is a ducted fan, and wherein TPAR is less than or equal to 40.

5. The gas turbine engine of claim 4, wherein TPAR is less than or equal to 20.

6. The gas turbine engine of claim 1, wherein the lower fan duct is a fixed flowpath lower fan duct, and wherein BBR is closer to the upper range than the lower range.

7. The gas turbine engine of claim 6, wherein BBR is greater than 0.20 and less than 0.7.

8. The gas turbine engine of claim 1, wherein the lower fan duct is a variable flowpath lower fan duct, and wherein BBR is closer to the lower range than the upper range.

9. The gas turbine engine of claim 8, wherein BBR is greater than 0.05 and less than 0.2.

10. The gas turbine engine of claim 8, further comprising:
    a flow blocker operable with the variable flowpath lower fan duct for affecting an amount of airflow through the variable flowpath lower fan duct during operation of the gas turbine engine.

11. The gas turbine engine of claim 10, wherein the flow blocker is coupled to the booster cowl, at least partially integrated into the booster cowl, or both.

12. The gas turbine engine of claim 8, further comprising:
    an inlet guide vane positioned in the variable flowpath lower fan duct, upstream of the secondary fan, or downstream of the booster rotor blade and upstream of the variable flowpath lower fan duct; and
    an actuator configured to rotate the inlet guide vane about a pitch axis.

13. The gas turbine engine of claim 1, wherein the core bypass ratio is between 0.3 and 5.

14. The gas turbine engine of claim 1, wherein the secondary fan is a single stage secondary fan.

15. The gas turbine engine of claim 1, wherein the secondary fan is a multi-stage secondary fan.

16. The gas turbine engine of claim 15, wherein the multi-stage secondary fan is a two stage secondary fan.

17. A method of operating a gas turbine engine, the method comprising:
    operating the gas turbine engine at a rated speed,
    wherein operating the gas turbine engine at the rated speed comprises operating the gas turbine engine to define a thrust to power airflow ratio between 3.5 and 100 and a core bypass ratio between 0.1 and 5, wherein the thrust to power airflow ratio is a ratio of an airflow through a bypass passage over a turbomachine of the gas turbine engine plus an airflow through a fan duct to an airflow through a core duct, and wherein the core bypass ratio is a ratio of the airflow through the fan duct to the airflow through the core duct,
    wherein operating the gas turbine engine at the rated speed further comprises operating the gas turbine engine to define a booster bleed ratio (BBR), wherein the BBR is a ratio of an airflow through a lower fan duct inlet to the airflow through the core duct, wherein the gas turbine engine comprises a booster located downstream of a secondary fan and comprising a booster rotor blade and a booster cowl, the booster cowl separating an upstream portion of the fan duct into an upper fan duct having an upper fan duct inlet and a lower fan duct having the lower fan duct inlet, the upper fan duct inlet and lower fan duct inlet collectively forming a fan duct inlet of the fan duct, and
    wherein BBR is less than or equal to an upper range of 0.005625×TPAR+0.2375, and greater than or equal to a lower range of 0.001125×TPAR+0.00977.

18. The method of claim 17, wherein the primary fan is an unducted fan, and wherein TPAR is greater than or equal to 30.

19. The method of claim 17, wherein the primary fan is a ducted fan, and wherein TPAR is less than or equal to 40.

20. The method of claim 17, wherein the lower fan duct is a fixed flowpath lower fan duct, and wherein BBR is closer to the upper range than the lower range.

* * * * *